United States Patent [19]

Becking

[11] Patent Number: 5,656,114

[45] Date of Patent: Aug. 12, 1997

[54] RIBBON OVERLAP WELDING SYSTEM

[76] Inventor: Paul Edward Becking, 13795 Vista Dorada, Salinas, Calif. 93908

[21] Appl. No.: 443,968

[22] Filed: May 18, 1995

Related U.S. Application Data

[63] Continuation of Ser. No. 846,317, Mar. 5, 1992, abandoned, which is a continuation-in-part of Ser. No. 594,865, Oct. 9, 1990, abandoned.

[51] Int. Cl.$^6$ .................... B29C 65/08; B32B 31/18; B65H 69/06; B65H 69/08
[52] U.S. Cl. .................... 156/157; 156/73.4; 156/267; 156/494; 156/502; 156/511; 156/580.1
[58] Field of Search .................... 156/73.1, 73.4, 156/157, 159, 163, 164, 267, 494, 495, 496, 502, 580.1, 511

[56] References Cited

U.S. PATENT DOCUMENTS

| | | |
|---|---|---|
| 1,858,401 | 5/1932 | Langford ..................... 83/694 |
| 3,799,826 | 3/1974 | Kron ..................... 156/379.8 |
| 3,821,048 | 6/1974 | Acker et al. . |
| 3,901,749 | 8/1975 | Howells ..................... 156/196 |
| 3,981,387 | 9/1976 | Gottschlich ..................... 156/73.4 |
| 4,062,278 | 12/1977 | Cheung ..................... 156/157 |
| 4,106,974 | 8/1978 | Hirsch ..................... 156/157 |
| 4,482,421 | 11/1984 | Gurak . |
| 4,490,199 | 12/1984 | Dunning ..................... 156/73.4 |
| 4,561,924 | 12/1985 | Hope et al. ..................... 156/361 |
| 4,609,422 | 9/1986 | Becking ..................... 156/580.1 |
| 4,629,530 | 12/1986 | Becking . |
| 4,935,081 | 6/1990 | Becking . |
| 4,952,271 | 8/1990 | Cheung et al. ..................... 156/502 |
| 5,096,524 | 3/1992 | Ohtani et al. ..................... 156/267 |
| 5,198,056 | 3/1993 | Stockli et al. ..................... 156/73.1 |
| 5,207,854 | 5/1993 | Becking ..................... 156/73.4 |
| 5,223,070 | 6/1993 | Tsubone ..................... 156/73.4 |

FOREIGN PATENT DOCUMENTS

| | | |
|---|---|---|
| 0017961 | 10/1980 | European Pat. Off. . |
| 0248295 | 12/1987 | European Pat. Off. . |
| 0391842 | 10/1990 | European Pat. Off. . |
| 0480613 | 4/1992 | European Pat. Off. . |
| 63-132031 | 6/1988 | Japan . |
| 806771 | 12/1958 | United Kingdom . |

*Primary Examiner*—Steven D. Maki
*Attorney, Agent, or Firm*—Conley, Rose & Tayon, P.C.

[57] ABSTRACT

A ribbon overlap welding system includes a means for clamping two ribbon ends in overlapping configuration, means for applying a controlled tension to the ribbon ends, means for fusing the ribbon ends, means for repositioning waste ribbon ends, and means for severing the waste ribbon ends from opposing faces of the welded ribbon loop adjacent to the weld bead.

12 Claims, 35 Drawing Sheets

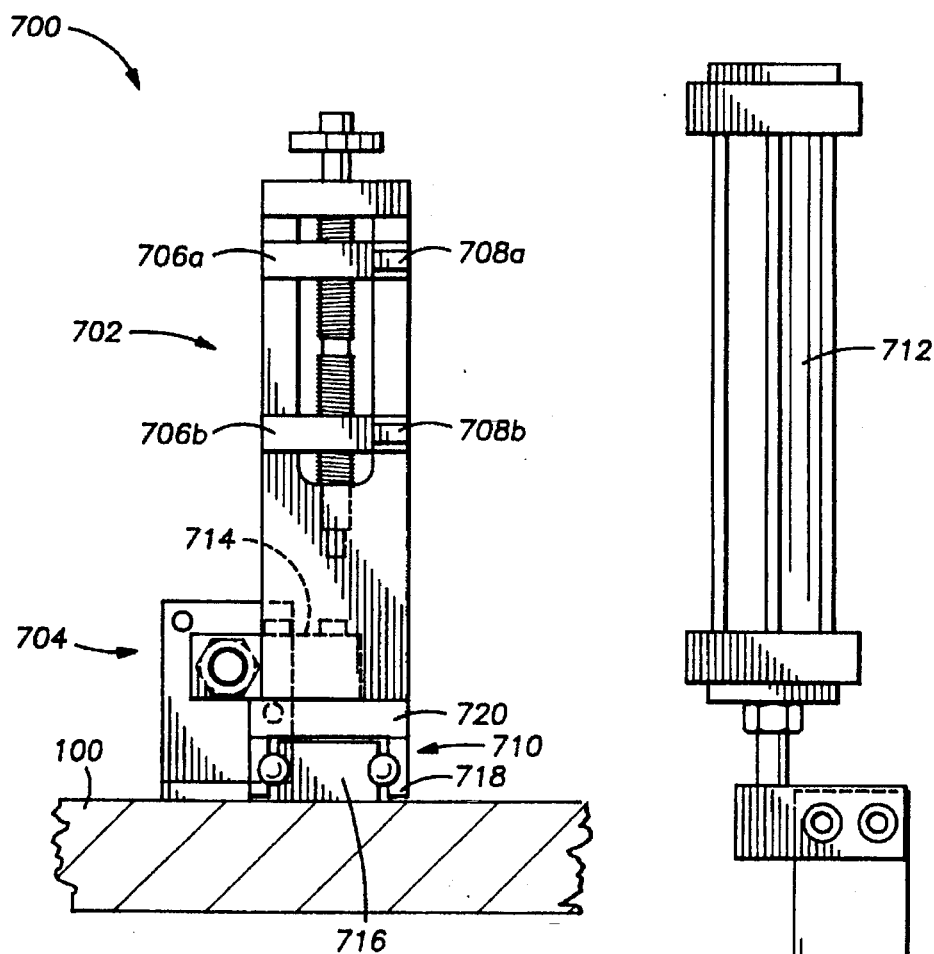
FIG. 18
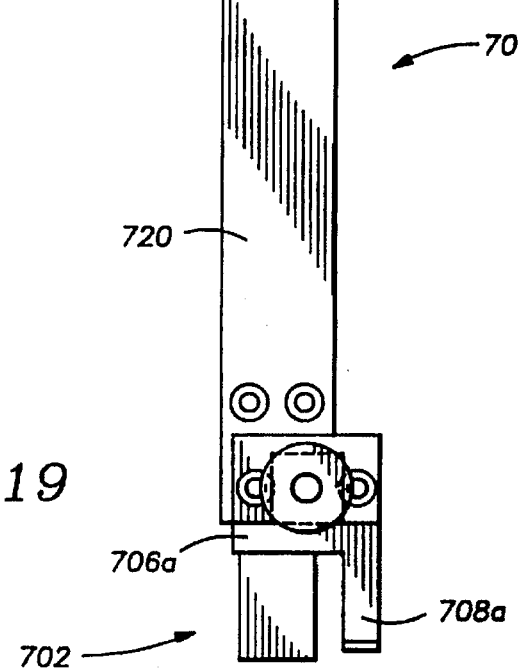
FIG. 19

RIBBON OVERLAP WELDING SYSTEM

RELATED APPLICATION

This is a continuation of application Ser. No. 07/846,317, filed Mar. 5, 1992, now abandoned which was a continuation-in-part application Ser. No. 07/594,865, filed Oct. 9, 1990 now abandoned. The present application discloses an embodiment conceived after the filing of Ser. No. 07/594,865.

BACKGROUND OF THE INVENTION

This invention relates generally to the art of manufacturing ribbon cartridges for printers used with equipment such as computers and word processors. More particularly, the present invention provides a method and apparatus for efficiently and accurately adjoining the ends of a length of ribbon so as to form a continuous ribbon loop extending through a ribbon cartridge. Still more particularly, the present invention relates to a printer ribbon welding system that joins two ribbon ends by means of an improved overlap welding and cutting method and apparatus, using either of two different cutting systems.

Continuous loop printer ribbon cartridges are in very common use throughout the world. In simple terms, they comprise a length of nylon or other fabric ribbon stuffed in serpentine fashion within a cartridge envelope and adjoined at the two ends to form a continuous loop. The weakest point along the ribbon loop, and thus the point that typically breaks soonest, is the fusion weld that joins the two ribbon ends. Thus, efforts to improve the durability of continuous loop ribbon cartridges frequently focus on improvements to the method and apparatus for forming the weld.

U.S. Pat. Nos. 4,629,530 and 4,935,081, which are expressly incorporated herein by reference, describe what is presently the most commonly used method and apparatus for joining two ribbon ends to form a continuous loop. The method and apparatus described in these patents is a substantial improvement over the "crash welding" technique previously in common use. Crash welding involves a simultaneous welding and cutting operation which imparts an excessive amount of energy into the fabric ribbon, weakening the ribbon and shortening the expected life of the cartridge.

In the improved technique described in U.S. Pat. Nos. 4,629,530 and 4,935,081, an operator clamps the two ribbon ends in criss-cross or x-pattern configuration across the top of an anvil having a narrow upper land surface (see FIG. 1 of U.S. Pat. No. 4,629,530). An ultrasonic horn moves into position above the crossed ribbon ends and the anvil and, without crushing the ribbon ends against the anvil, imparts ultrasonic energy into the ribbon ends, fusing the ribbon ends along a line defined by the adjacent land surface of the anvil.

Next, a separate cutter mechanism severs the two ends of the fused ribbon along the edge of the weld line or bead (see FIG. 2 of U.S. Pat. No. 4,629,530), and a mechanism rotates the upper ribbon 180° to give a continuous length of ribbon joined along a diagonal weld bead (see FIG. 3 of U.S. Pat. No. 4,629,530). The weld formed by this technique leaves a distinct nub (see FIG. 4A of U.S. Pat. 4,629,530) that is unacceptable in terms of ribbon cartridge performance. Consequently, this technique typically also includes a second welding operation whereby the weld bead on the unfolded ribbon ends is reheated and flattened to reduce the nub to acceptable dimensions.

A different technique for joining two ribbon ends involves overlapping the two ribbon ends, rather than placing them in an x-pattern configuration, and forming a weld in the overlapped ribbon ends. This technique has an advantage over the technique described in U.S. Pat. Nos. 4,629,530 and 4,935,081 (the "x-pattern technique") in that a properly formed overlap weld can be stronger than a properly formed weld in criss-crossed ribbon ends. The overlap weld technique has a disadvantage, however, in that the problem of trimming the waste ribbon ends is substantially more difficult than in the x-pattern technique.

The x-pattern technique requires only a single, precise cut along one edge of the weld bead to sever the waste ribbon ends; whereas, the overlap technique requires two precise cuts on opposing faces of the ribbon to sever the waste ends. In addition, because the two cuts in overlapped ribbon ends must be made substantially in the plane of the ribbon and not in a perpendicular plane, as in the case of the x-pattern technique, the two cuts in overlapped ribbon ends are substantially more difficult to accomplish than the single cut in criss-crossed ribbon ends.

As a result of the difficulty in accomplishing the cutting operation in the overlap technique, it has never been widely used in the manufacture of continuous loop printer ribbon cartridges. Occasionally, some limited manufacturers have used the overlap technique and cut the waste ribbon ends by hand. This method, however, is very labor intensive, and thus expensive, and the quality of the result is variable at best. At least one manufacturer has developed an apparatus for making an overlap weld and automatically cutting the waste ribbon ends, but the quality of the result is not satisfactory.

Japanese Pat. Application Disclosure Kokai 63-132031, published Jun. 4, 1988, discloses the contents of Japanese Pat. Application No. 61-279209, filed Nov. 21, 1986 by Seidenshadenshi Kogyo Co., Ltd. for "A Device for Fusing and Straightening Fused Ends of a Ribbon." The disclosure describes an apparatus for forming an overlap weld in a continuous loop fabric ribbon. According to the disclosure, overlapped ribbon ends are clamped across the top of a support member (anvil), beneath an ultrasonic horn, with forked projections from a guide plate straddling the support member and positioned between the overlapped ribbon ends. The ultrasonic horn then moves down against the overlapped ribbon ends, fusing the ribbon along a line perpendicular to the longitudinal axis of the ribbon.

Next, the two clamps holding the fused ribbon ends simultaneously move along a pair of guide rails toward the guide plate. As the overlapped ribbon ends move toward the stationary guide plate, the forked projections from the guide plate converge around the weld bead between the two ribbon ends, wedging the waste ends up and down, respectively, away from the continuous ribbon loop. A pair of lasers, positioned above and below the guide plate in position to project laser beams at the waste ribbon ends along a line adjacent to the weld bead, then cut the waste ends from the ribbon loop.

Although the Seidenshadenshi apparatus represents an effort to construct a practical overlap welding system, it has problems. Most notably, heat is not a suitable manner by which to sever the waste ribbon ends, whether the heat is generated by a hot wire or by a laser. Heat causes the nylon fabric to form into beads along the severed edges. The beads of material are not dispersed during a second welding operation and tend to form hardened areas adjacent to the weld bead. These hardened areas inhibit the ability of the material to retain ink and to reproduce characters when struck by a printer and sometimes distort or break the wire shafts in a dot matrix printer. In addition, the heat generated by the laser beam, which must be projected very close to the weld bead in order to be effective, tends to overheat the nylon fabric within the adjacent weld bead, unnecessarily weakening the material.

Thus, it is apparent that a practical overlap welding system must include means for cutting the two waste ribbon ends by means of cutting blades. It would be advantageous to develop a method and apparatus for an overlap welding system that employs a mechanical cutting technique to sever the waste ribbon ends from the welded ribbon loop.

SUMMARY OF THE INVENTION

Accordingly, the present invention provides an apparatus for forming a continuous ribbon loop by means of an overlap weld, including means for clamping two ribbon ends in an overlap configuration, means for fusing the two ribbon ends from edge to edge along a narrow weld bead to form a continuous ribbon loop and two waste ends, and means for cutting the waste ends from the continuous ribbon loop near the weld bead.

In one embodiment of the invention, the cutting means includes two sets of inner and outer cutting blades oriented so as to receive the weld bead between the two inner blades and so that each waste ribbon end extends through one set of inner and outer cutting blades. The cutting means also includes means for engaging each waste ribbon end and pulling the weld bead on the continuous ribbon loop against the inner cutting blade, so as to sever the waste ribbon ends between the inner and outer blades immediately adjacent to the weld bead.

In another embodiment, the cutting means includes a pair of rotary cutter blades and lands positioned to receive the weld bead between them so that each waste ribbon end extends to a cutting position laterally from the cutting means. This embodiment also includes means for engaging each waste ribbon end and pulling it to position the weld bead for severing the waste ribbon ends immediately adjacent to the weld bead.

More particularly, the ribbon overlap welding system ("ROWS") of the present invention includes left and right arm mechanisms and left and right tensioner mechanisms for clamping, tensioning, and manipulating the two ends of a length of ribbon. The ROWS also includes a ribbon alignment guide mechanism for insuring precise positioning of the two overlapped ribbon ends, an anvil mechanism and ultrasonic welder mechanism for fusing the two ribbon ends along a narrow weld bead, and the cutter mechanism for severing the waste ribbon ends near the weld bead on the continuous ribbon loop. The ROWS may also include left and right transvector mechanisms for vacuuming the severed waste ribbon ends to a disposal point.

The present invention provides an efficient overlap welding system that overcomes the problems of prior art apparatus. First, because it is an overlap welding system, it produces welds that are stronger than welds made by apparatus employing the x-pattern configuration. Second, it provides a precise, mechanically operated cutter mechanism that severs the waste ribbon ends within approximately ten thousandths of an inch from the weld bead, without the use of heat. Precise cutting at close tolerances is essential to successful use of an overlap welding system. Third, it includes means for applying carefully controlled tension to the ribbon both at the time the two ribbon ends are fused and at the time the waste ribbon ends are cut. Controlled tension helps to improve the strength of the weld.

These and various other objects and advantages of the present invention will become readily apparent to those skilled in the art upon reading the following detailed description and claims and by referring to the accompanying drawings.

BRIEF DESCRIPTION OF THE DRAWINGS

For a detailed description of the preferred embodiment of the invention, reference now will be made to the accompanying drawings, wherein:

FIG. 18 depicts a front elevation of the alignment guide mechanism shown in FIG. 17;

FIG. 19 depicts a top view of the alignment guide mechanism shown in FIG. 17;

DESCRIPTION OF THE PREFERRED EMBODIMENTS

The present invention is directed to a method and apparatus for forming a continuous printer ribbon loop by means of an overlap weld. It is known that overlap welds, under ideal conditions, are stronger than welds made on apparatus in which the ribbon is positioned in a criss-cross or "x pattern." The cutting operation in an x-pattern weld is easier to accomplish than the cutting operation in an overlap weld. An x-pattern weld requires only a single cut generally perpendicular to the face of the ribbon along one edge of the weld bead to liberate both waste ribbon ends. An overlap weld requires two separate cuts, on opposite faces of the ribbon, generally parallel to the face of the ribbon, to sever the waste ribbon ends.

As a consequence of the difficulties in accomplishing an overlap weld, the x-pattern technique is in common use throughout the ribbon cartridge manufacturing industry. From time to time, manufacturers have made continuous loop ribbons with overlap welds by trimming the waste ribbon ends by hand. Such a process, however, is labor intensive and expensive. At least one manufacturer has designed an apparatus for performing overlap welds automatically, using two laser beams to cut the waste ribbon ends. Severing the waste ends by means of heat, however, yields undesirable beads formed by melting the fabric material along the edge of the cut. These problems are overcome by the present invention.

Overview of the ROWS

Figure 1:
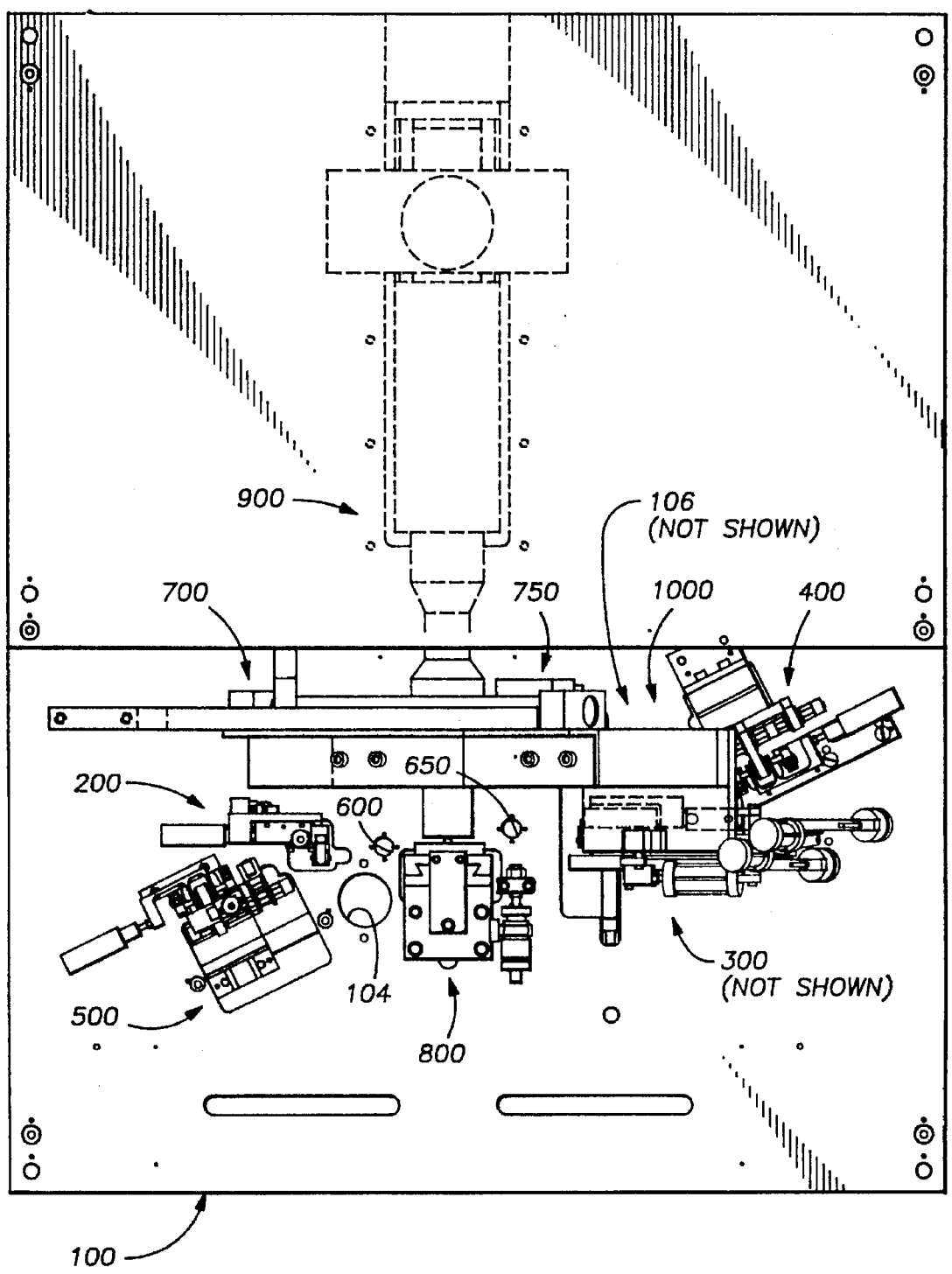
FIG. 1 shows an overview of one embodiment of the ROWS apparatus in top view.
Figure 2:
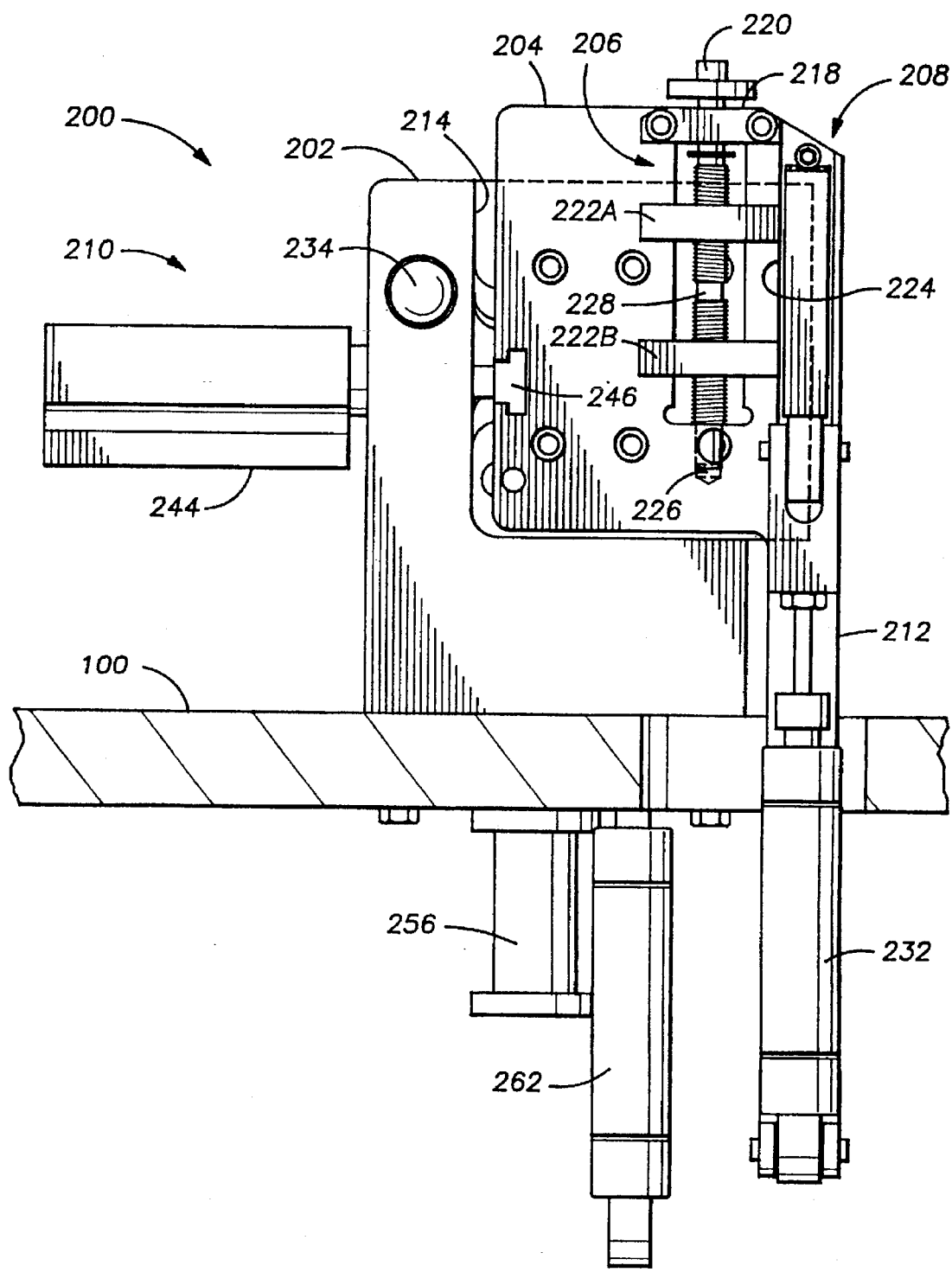
FIG. 2 depicts a front elevation of the left tensioner mechanism of the ROWS shown in FIG. 1.
Figure 3:
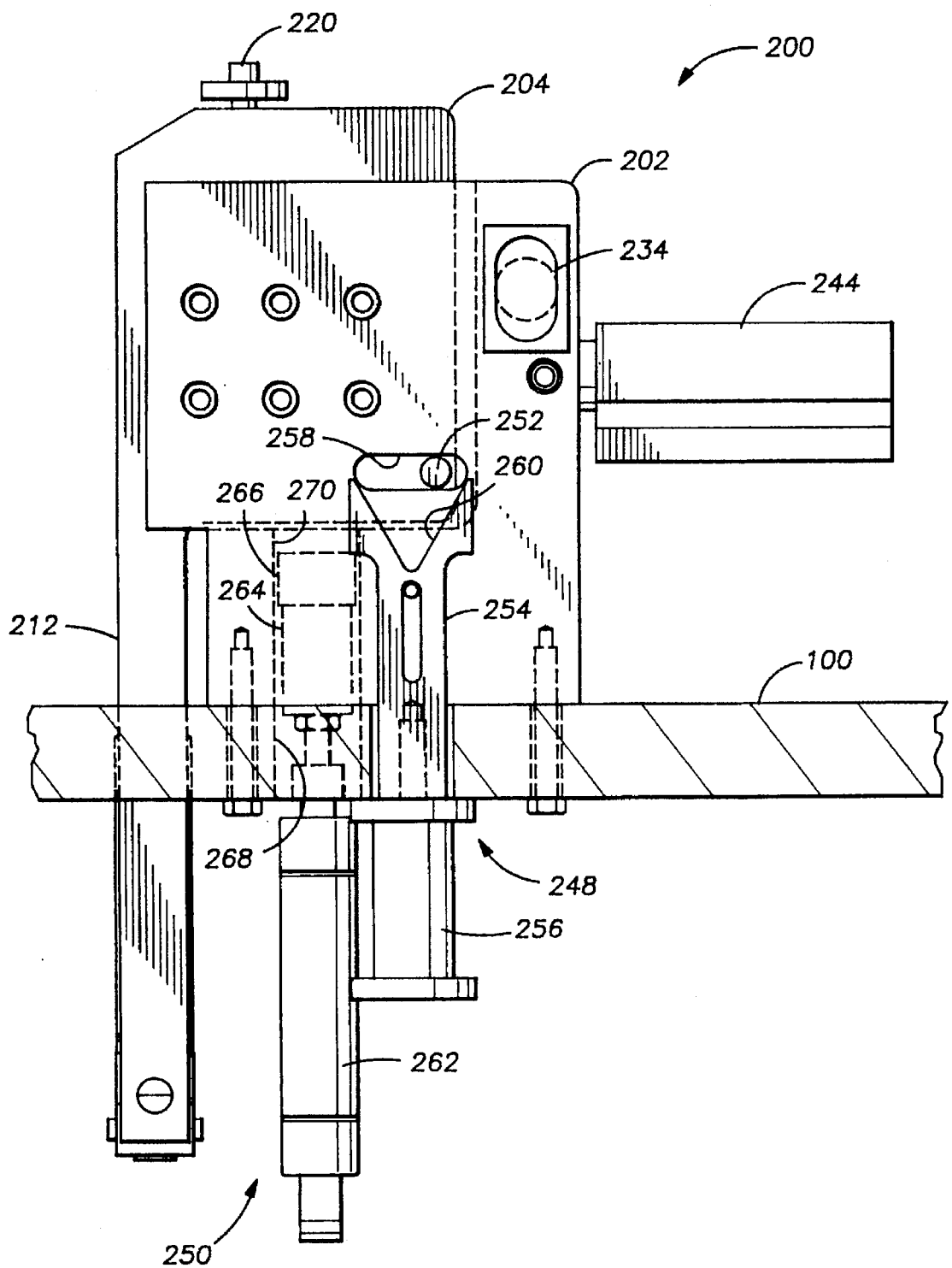
FIG. 3 depicts a rear elevation of the left tensioner mechanism shown in FIG. 2.
Figure 4:
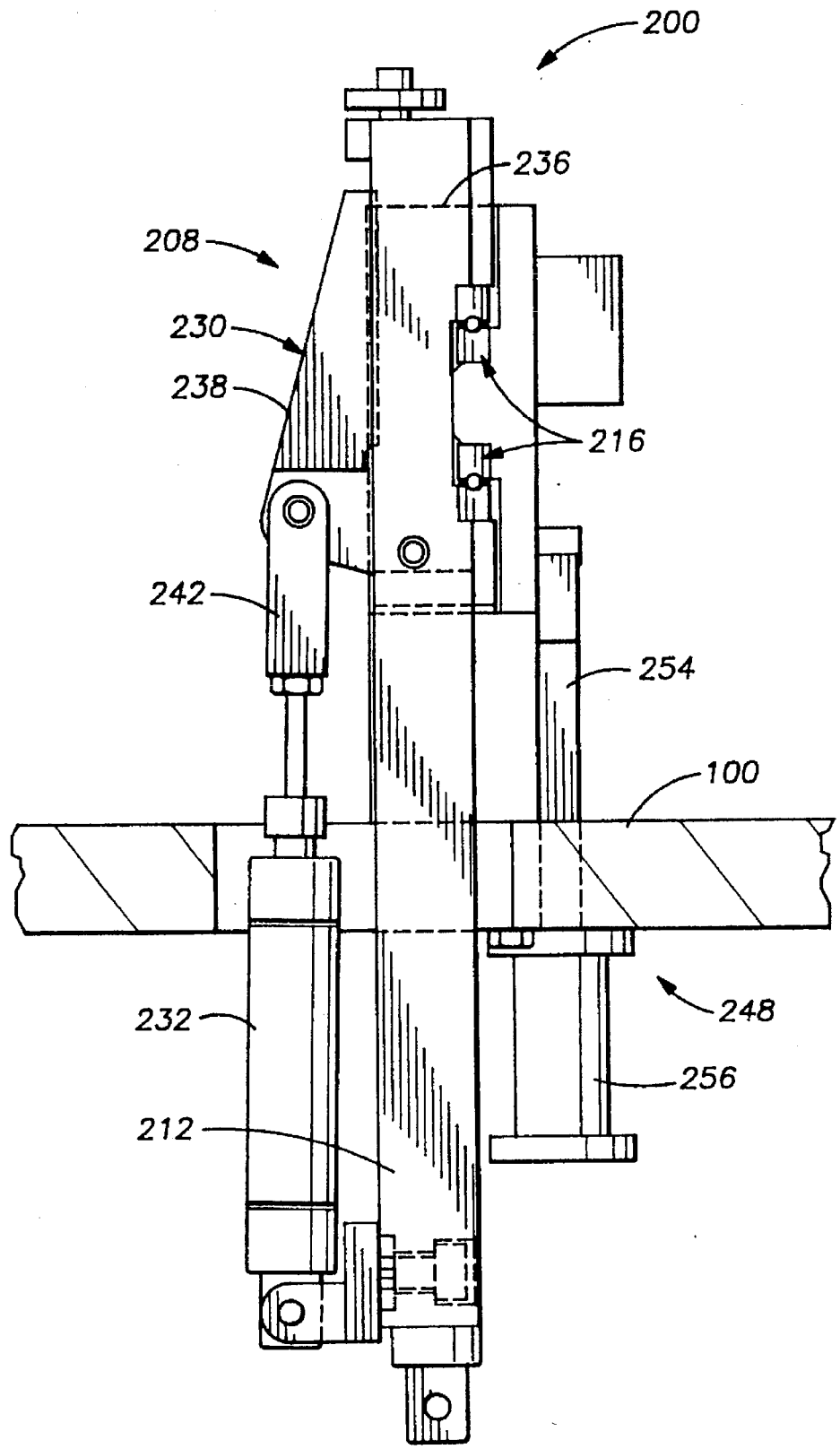
FIG. 4 depicts a right side elevation of the left tensioner mechanism shown in FIG. 2.
Figure 5:
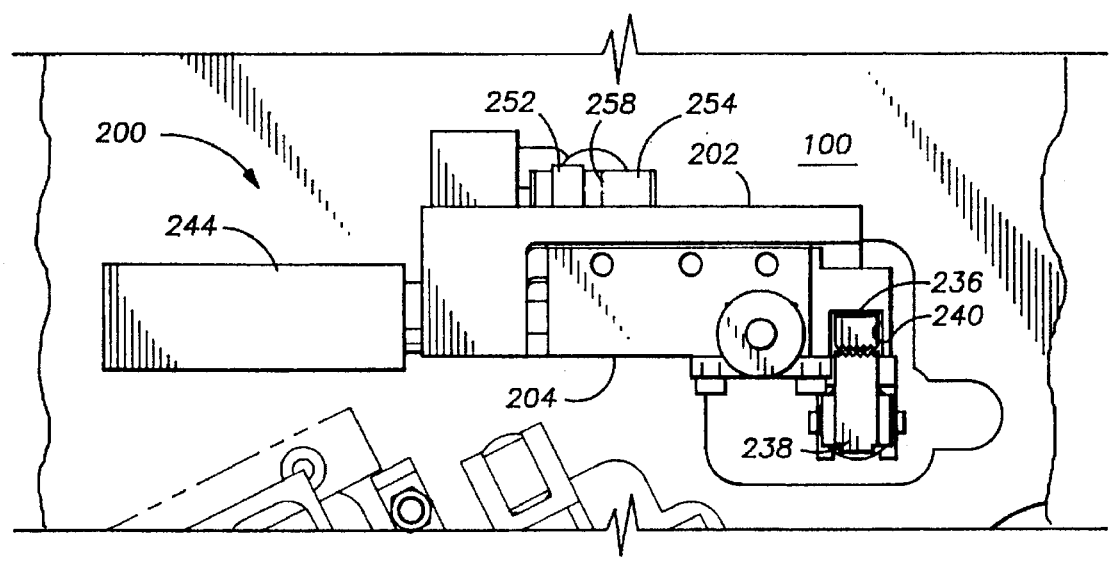
FIG. 5 depicts a top view of the left tensioner mechanism shown in FIG. 2.
Figure 6:
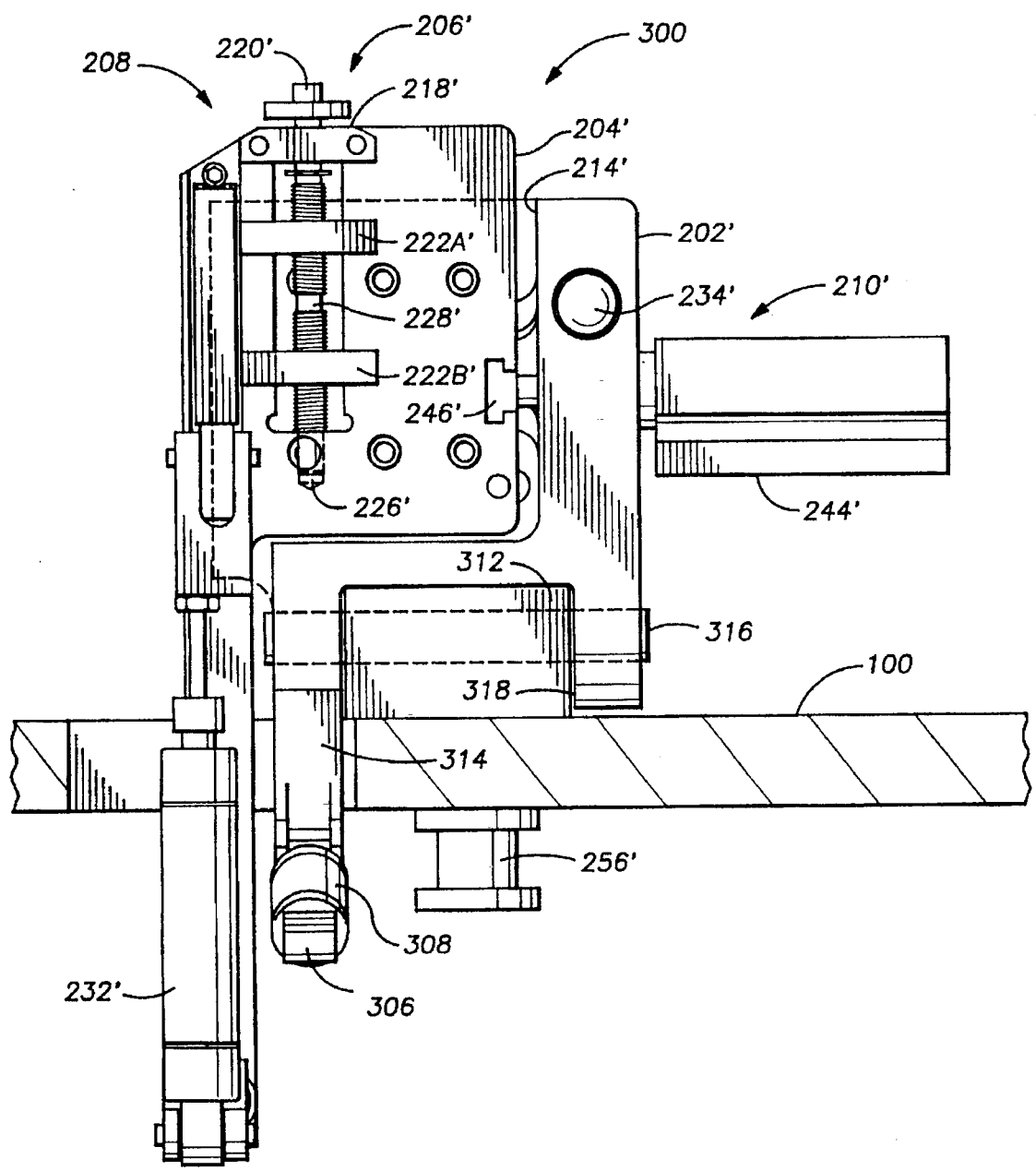
FIG. 6 depicts a front elevation of the right tensioner mechanism of the ROWS shown in FIG. 1.
Figure 7:
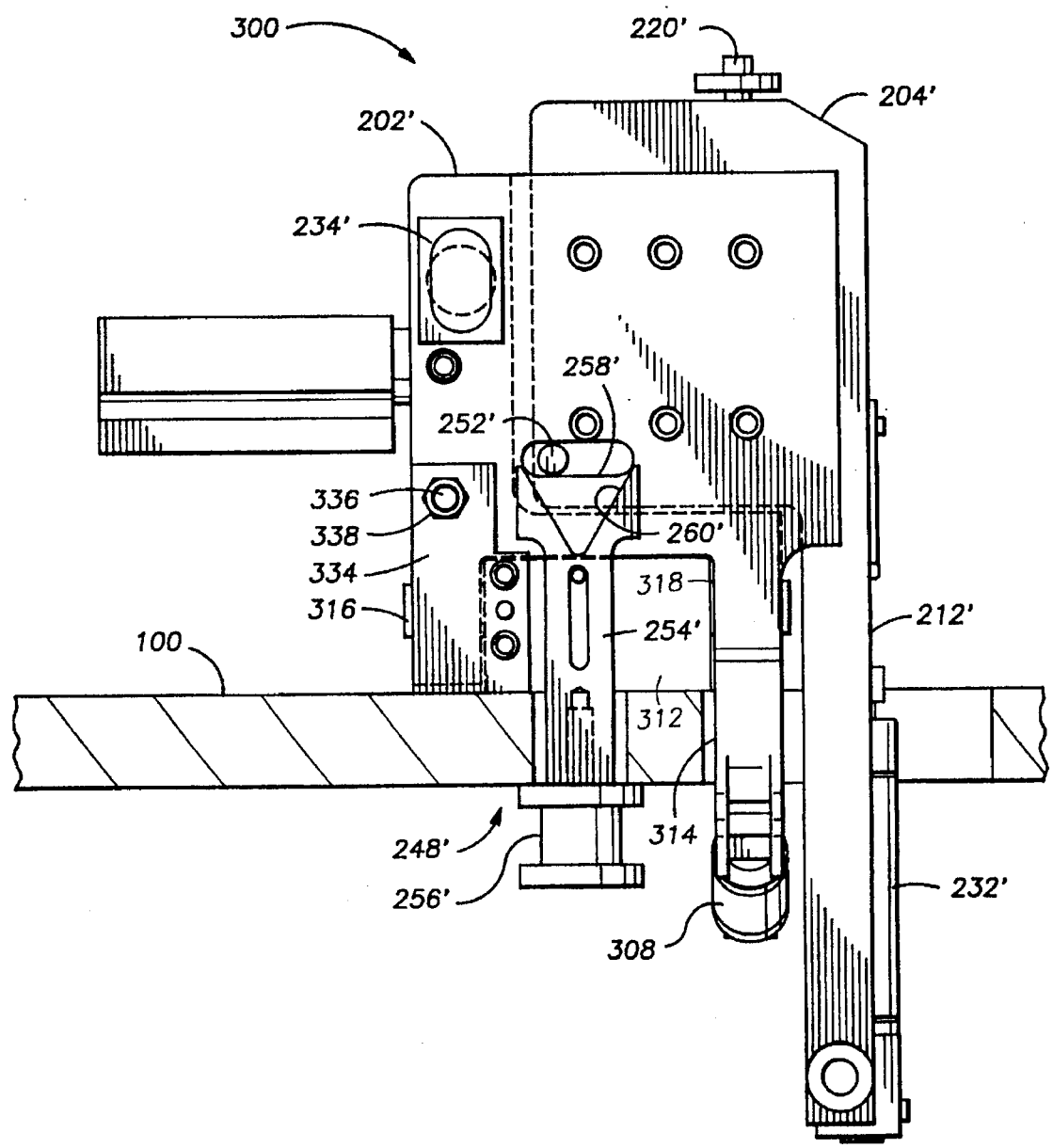
FIG. 7 depicts a rear elevation of the right tensioner mechanism shown in FIG. 6.
Figure 8:
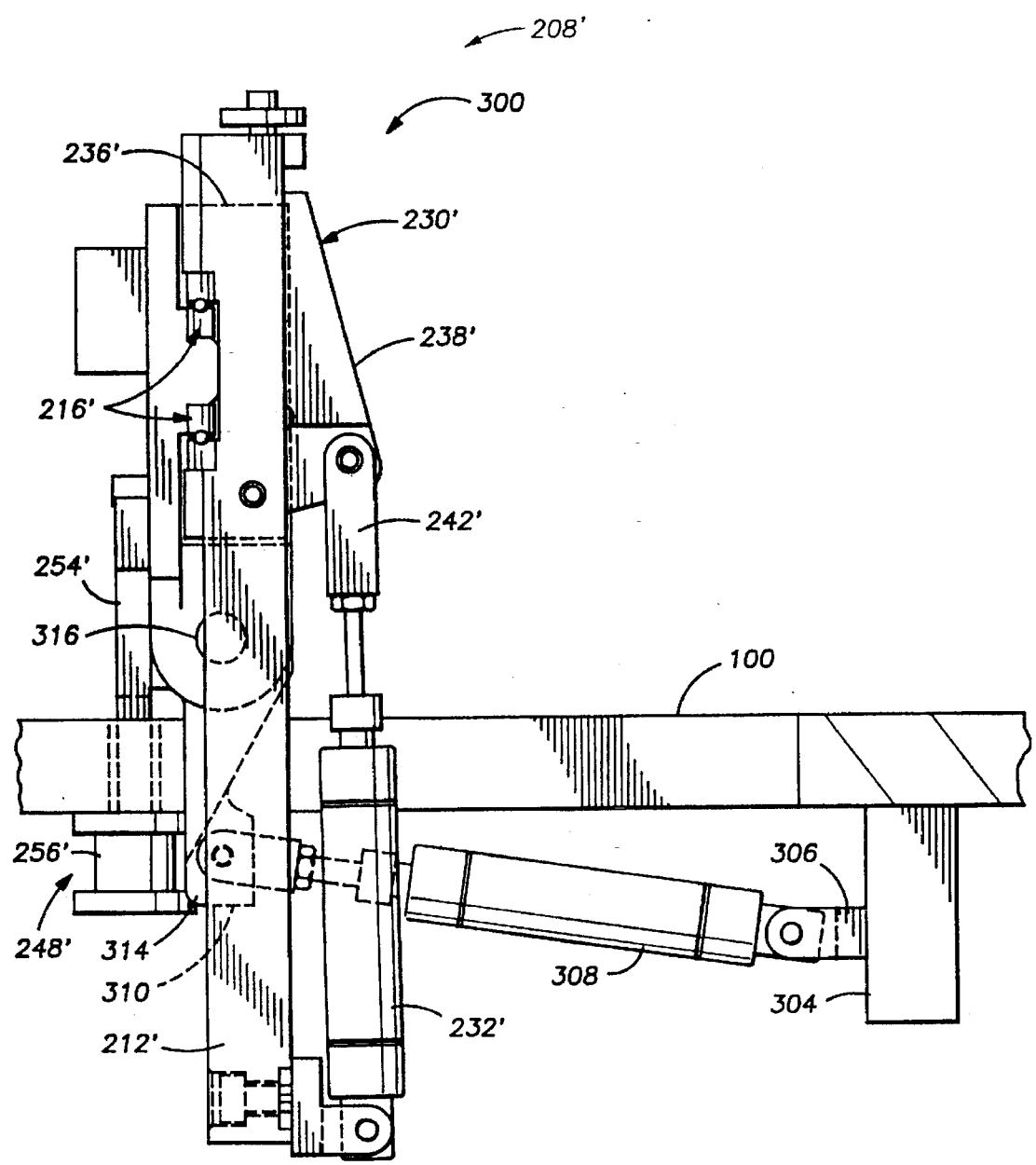
FIG. 8 depicts a left side elevation of the right tensioner mechanism shown in FIG. 6.
Figure 9:
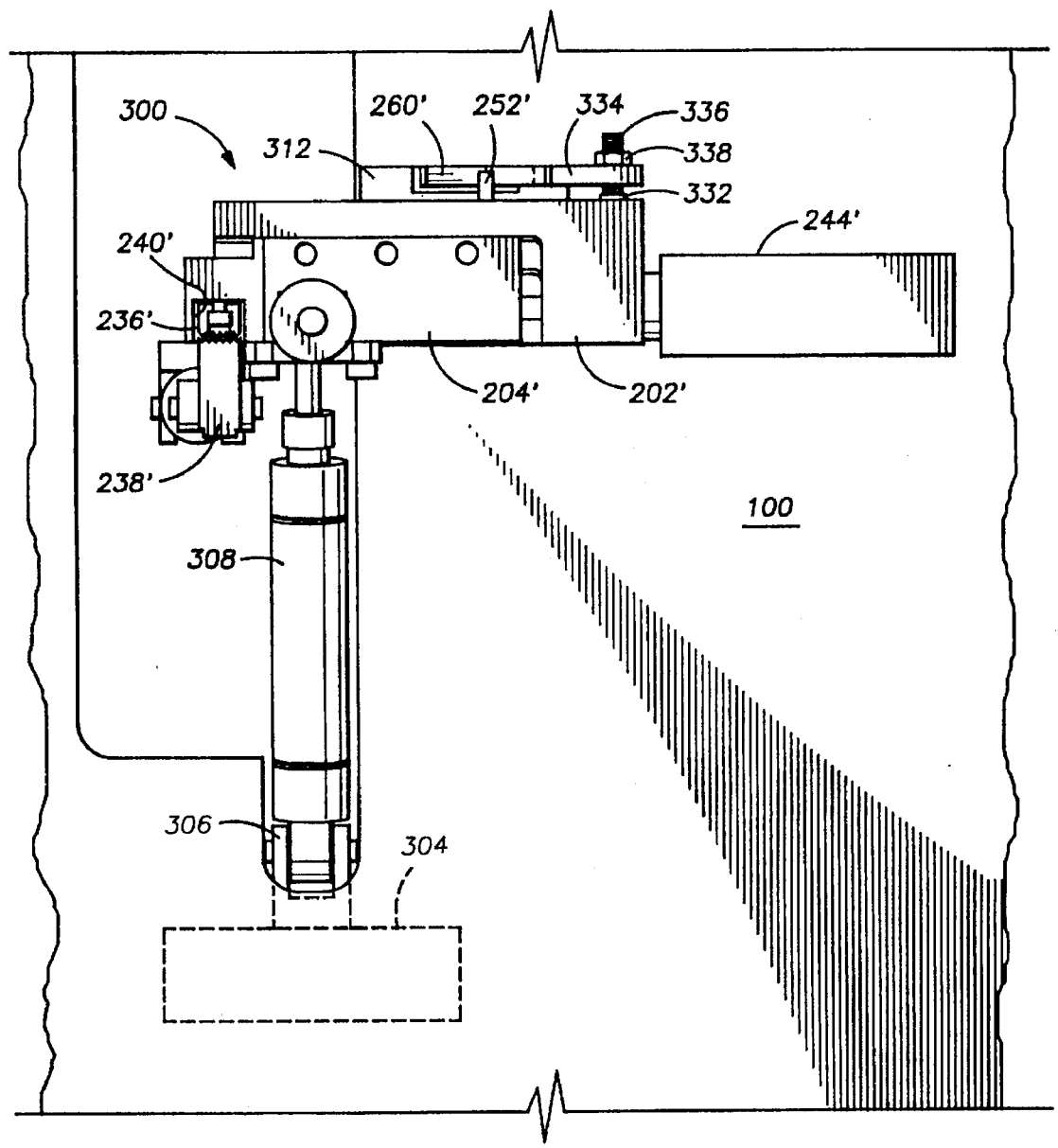
FIG. 9 depicts a top view of the right tensioner mechanism shown in FIG. 6.

FIG. 1 depicts a ribbon overlap welding system ("ROWS") constructed in accordance with the principles of the present invention. The ROWS preferably comprises a mounting plate 100, left and right tensioner mechanisms 200,300, right and left arm mechanisms 400,500, left and right guide pin mechanisms 600,650, left and right ribbon alignment guide mechanisms 700,750, an anvil mechanism 800, a welder mechanism 900, a cutter mechanism 1000, and a microprocessor-based control system (not shown). The left and right tensioner mechanisms 200,300 each include a clamp assembly for gripping a ribbon end and a tensioner assembly for applying a controlled, predetermined tension to the ribbon. The right and left arm mechanisms 400,500 each include a clamp assembly for gripping a ribbon end and arm rotation and translation assemblies for repositioning the ribbon end in preparation for a cutting operation.

The left and right guide pin mechanisms 600,650 act as guides for orienting the two ribbon ends adjacent to one another in preparation for a welding operation. The left and right ribbon alignment guide mechanisms 700,750 aid in aligning the edges of the two ribbon ends also in preparation for the welding operation. The anvil mechanism 800 and the welder mechanism 900 cooperate to fuse the two ribbon ends ultrasonically along a narrow weld bead conforming generally to a surface of the anvil mechanism 800. Finally, the cutter mechanism 1000 performs two cutting operations to sever two waste ribbon ends from a continuous ribbon loop.

All operations are controlled, and in some instances monitored, by the microprocessor-based control system. As will be evident from a review of the disclosure as a whole, most operations are carried out by a plurality of pneumatic cylinders. Actuation of the cylinders is controlled by solenoid-actuated or precision digital control valves, with the solenoid or digital controller being connected to or controlled by the microprocessor.

In operation, a first ribbon end from the left side of a ribbon cartridge, as viewed from the perspective of an operator facing the ROWS, is clamped between the left tensioner mechanism 200 and, at the outer end of the ribbon end, the right arm mechanism 400, with the ribbon end pivoted around the front of the right guide pin mechanism 650. A second ribbon end, from the right side of the ribbon cartridge, then is clamped between the right tensioner mechanism 300 and, at the outer end of the ribbon end, the left arm mechanism 500, with the ribbon end pivoted around the rear of the left guide pin mechanism 600. This positions the two ribbon ends adjacent to one another in the area between the two pin guide mechanisms 600,650.

Next, the left and right ribbon alignment guide mechanisms 700,750 move into position around the edges of the ribbon ends between the guide pin mechanisms 600,650. Releasing and then reengaging the tension on the ribbon ends while the alignment guide mechanisms 700,750 are in place insures that the edges of the ribbon ends are precisely aligned. Next, an anvil block on the anvil mechanism 800 shifts into place adjacent to the aligned ribbon ends. An ultrasonic horn on the welder mechanism 900 then moves up against the ribbon ends, opposite the anvil mechanism 800, and fuses the ribbon ends by means of ultrasonic energy. The welding operation leaves a continuous ribbon loop held in place by the left and right tensioner mechanisms 200,300 and two waste ribbon ends gripped by the right and left arm mechanisms 400,500.

After the anvil mechanism 800 and the welder mechanism 900 retract, the guide pin mechanisms 600,650 retract, the ribbon alignment guides 700,750 retract, and the left and right arm mechanisms 400,500 rotate and translate so as to reposition the waste ribbon ends generally perpendicular to the continuous ribbon loop along the line of the weld bead. Next, the cutter mechanism 1000 moves over and around the continuous ribbon loop at the weld bead, with the two waste ribbon ends extending through left and right cutting blade assemblies.

Each waste ribbon end then is clamped and tensioned by a cutter tension assembly and severed immediately adjacent to the weld bead, preferably within approximately 0.010" to 0.015", by the corresponding cutting blade assembly. As each waste ribbon end is severed from the continuous ribbon loop, it is released from the corresponding cutter tension assembly and arm mechanism and then transported away for disposal by a vacuum-actuated transvector mechanism. At this point, a second weld may be performed, if required.

Upon completion of the cutting operation, or the second welding operation, if one is performed, the continuous ribbon loop is released from the ROWS, and the system resets for another sequence. This completes a general overview of the operation of the ROWS. What follows is a detailed description of the structure and operation of each mechanism comprising the ROWS.

In the following description, reference is made to the direction of movement of certain parts relative to other parts and to particular sides or faces of certain parts. "Forward" or "forwardly" describes movement toward the front of the ROWS or that portion of a part that faces the front of the ROWS. "Rearward" describes movement toward or surfaces facing the rear of the ROWS. "Inward" describes movement toward or surfaces facing the center of the ROWS. "Outward" describes movement toward or surfaces facing away from the center and toward the right or left side of the ROWS, as viewed by an operator standing in front of the ROWS.

Left Tensioner Mechanism

Referring now to FIGS. 2–5, the left tensioner mechanism 200 comprises a support plate 202, a slide plate 204, a ribbon guide assembly 206, a ribbon clamp assembly 208, and a tensioner assembly 210. The support plate 202 comprises a generally rectangular-shaped metal block machined to include various throughbores and cutouts as shown in the drawings and described hereafter. The support plate 202 is fixedly attached to the mounting plate 100. The slide plate 204 comprises a second, generally rectangular metal block machined to include a generally narrow cylinder support arm 212 extending downward from the right or inside end thereof. The slide plate 204 is slidably affixed within a rectangular-shaped cutout 214 in the front, upper, inner corner of the support plate 202 by means of a linear slide roller bearing assembly 216, such as a Deltron slide roller, Part No. NB2-045.

The ribbon guide assembly 206 is the means by which a ribbon end (not shown) is aligned in proper position on the left tensioner mechanism 200 for subsequent clamping and welding. The right tensioner mechanism 300 and the right and left arm mechanisms 400,500 each include a ribbon guide assembly substantially identical in construction to the ribbon guide assembly 206 described here and shown in U.S. Pat. 4,629,530 (see col. 11, lines 6–26), the entire disclosure of which is expressly incorporated herein by reference. The ribbon guide assembly 206 comprises a support housing 218, a right and left threaded shaft 220, and a pair of ribbon guide bars 222a,b.

The support housing 218 rotatably supports the upper end of the shaft 220 within a rectangular-shaped shaft bore 224 in the front face of the slide plate 204. The lower end of the shaft 220 rotates within a cylindrical bore 226 in the lower end of the shaft bore 224. The guide bars 222a,b are threaded onto the shaft 220 and are equally spaced about a centerpoint 228 on the shaft 220. As a consequence of the opposed right and left threads on the shaft 220, rotation of the shaft 220 causes the guide bars 222a,b to move in opposite directions toward or away from the centerpoint 228 on the shaft 220, always maintaining the same centerpoint between the guide bars 222a,b. In this manner, the ROWS may be quickly adjusted to accommodate various ribbon widths.

Referring still to FIGS. 2–5, the ribbon clamp assembly 208 holds a ribbon end in place once it is properly aligned within the ribbon guide assembly 206. The ribbon clamp assembly 208 includes a ribbon clamp 230, a clamp cylinder 232, and a clamp actuating switch 234. The ribbon clamp 230 comprises a floating jaw 236 and a rotating jaw 238. The floating jaw 236 is affixed within a cutout 240 in the slide plate 204 whereby the outer face of the floating jaw 236 is mounted slightly forwardly of the front face of the slide plate 204. The rotating jaw 238 is pivotally secured to the slide plate 204 at the lower end of the floating jaw 236 and pivotally secured to a cylinder shaft coupling 242 affixed to the end of the shaft on the clamp cylinder 232, whereby extension and retraction of the cylinder shaft causes the rotating jaw 238 to close and open, respectively, relative to the floating jaw 236. Both the floating and the rotating jaws 236,238 have grooved surfaces on their engaging faces to enhance their ability to grip the ribbon end.

The clamp cylinder 232 preferably is a pneumatic, double acting cylinder, such as a Bimba cylinder, Part No. MRS-020.5-DXP, having electrical means, such as an inductively coupled switch, for example, a Reed switch or a hall-effect sensor, for indicating the position of the piston within the cylinder. All of the cylinders described in connection with the ROWS preferably are pneumatic cylinders. Each such cylinder preferably includes the position indicating means as described in connection with the clamp cylinder 232, or a comparable sensor. Such position indicating means can be connected to the control system for the ROWS to enable the microprocessor-based control system to confirm that the cylinder has performed according to control system commands.

The clamp cylinder 232 is pivotally attached to the lower end of the front face of the cylinder support arm 212 on the slide plate 204 and projects upward along the support arm 212 to the rotating jaw 238. The clamp actuating switch 234 preferably is a push-button actuated electrical switch, such as an Augat Part No. 12F1200, connected to the ROWS control system. In response to an electrical signal from the clamp actuating switch 234, the control system actuates a solenoid-controlled pneumatic valve (not shown), which in turn actuates the clamp cylinder 232 to cause the shaft on the cylinder 232 to extend, thereby closing the rotating jaw 238.

Referring still to FIGS. 2–5, the tensioner assembly 210 provides the means by which a precise, controlled amount of tension is applied to the ribbon end for the welding and cutting operations. It comprises a tensioner cylinder 244, a T-bar 246, a centering guide assembly 248, and a tension stop assembly 250. The tensioner cylinder 244 is attached to the outer side of the support plate 202, with the cylinder shaft projecting through a cylindrical bore in the support plate 202, the axis of the bore lying in a plane that is generally parallel to the plane of the ribbon end as it is clamped to the face of the slide plate 206. The T-bar 246 is attached to the end of the shaft of the tensioner cylinder 244 and received within a T-shaped groove within the outer face of the slide plate 204, whereby extension and retraction of the tensioner cylinder shaft causes outward and inward movement, respectively, of the slide plate 204 relative to the support plate 202.

The tensioner cylinder 244 preferably is a specially manufactured frictionless cylinder having air bearings to enable precise, frictionless control of the tension applied to the ribbon end. A suitable frictionless cylinder may be manufactured from a conventional, double-acting pneumatic cylinder, such as an SMC cylinder, Part No. NCJPB10-075D, modified to exclude the rubber seals and to include a piston with a clearance to the inside wall of the cylinder of approximately 0.001" or less, whereby air flow around the piston acts as a frictionless bearing.

The pressure applied to the frictionless tensioner cylinder 244 is preset by means of a precision digital regulator (not shown) to impart a predetermined tension to the ribbon. The setting of the digital regulator is controlled by means of an analog voltage derived from the microprocessor-based control system, thus enabling the cylinder pressure to be varied in accordance with the tension desired on the ribbon. The tension that gives the greatest weld strength varies from ribbon to ribbon according to the type of fabric and weave, the width of the ribbon, and the type of ink absorbed within the ribbon fabric.

After the operator clamps the ribbon end into place, the preset pneumatic pressure is applied to the tensioner cylinder 244, and the tensioner mechanism 200 adjusts the ribbon tension to the preset level. If the operator places too much tension on the ribbon by stretching the ribbon during the clamping step, then the tensioner mechanism 200 eases the tension down to the desired level. If the operator places too little tension on the ribbon, then the tensioner mechanism 200 increases the tension to the desired level. In this manner, one can optimize ribbon tension for improved weld strength and insure repeatability of the tension applied on each weld. In addition, as will become evident on reading the disclosure as a whole, the tension on the same ribbon can be adjusted to a different optimum value by the microprocessor-based control system for a second welding operation, if desired.

Referring still to FIGS. 2–5, the centering guide assembly 248 centers the slide plate 204 relative to the support plate 202 prior to clamping the ribbon end to the slide plate 204, whereby the slide plate 204 can move outwardly or inwardly in response to force applied by the tensioner cylinder 244 to achieve the desired tension on the ribbon. The centering guide assembly 248 comprises a centering pin 252 on the rear face of the slide plate 204, a centering guide 254, and a centering guide cylinder 256.

The centering pin 252 projects generally perpendicularly from the rear face of the slide plate 204 through a slot 258 in the rear of the support plate 202. The centering guide cylinder 256 is a pneumatic cylinder, such as a Bimba "pancake" type cylinder, Part No. FO-02-0.5-M. It is attached to the lower surface of the mounting plate 100, rearward of the support plate 202 and aligned with the slot 258 in the slide plate 204, with the cylinder shaft projecting upwardly through a generally cylindrical bore in the mounting plate 100. The centering guide 254, affixed to the end of the cylinder shaft, comprises at its upper end a generally V-shaped member 260, whereby extension of the cylinder shaft causes the centering guide 254 to engage the centering pin 252 and move it to the approximate center of the slot in the support plate 202.

The tension stop assembly 250 provides a means for locking the position of the slide plate 204 relative to the support plate 202 after the welding operation to fix the position of the weld relative to the mounting plate 100 for the cutting operation. The right tensioner mechanism 300 does not include a tension stop assembly, as a single tension stop assembly is sufficient to insure that the weld bead does not move out of position relative to the mounting plate 100.

The tension stop assembly 250 comprises a tension stop cylinder 262, a stop cylinder shaft coupling 264, and a rubber stop pad 266. The tension stop cylinder 262 is a pneumatic cylinder, such as a Bimba cylinder, Part No. MRS-02-0.5-DXP, affixed to the mounting plate 100 beneath the support plate 202. stop cylinder 262 projects though a generally cylindrical bore 268 in the mounting plate 100 and a coaxial bore 270 in the support plate 202 toward the lower surface of the slide plate 204. The stop cylinder shaft coupling 264 is attached to the end of the cylinder shaft, with the rubber stop pad 266 affixed to the upper end of the shaft coupling, whereby extension of the shaft brings the stop pad 266 into contact with the slide plate 204 to arrest its movement relative to the support plate 202.

Right Tensioner Mechanism

Referring now to FIGS. 6–9, the right tensioner mechanism 300 is constructed substantially as a mirror image of the left tensioner mechanism 200, except that the right tensioner mechanism 300 includes minor modifications and additional apparatus necessary to enable it to pivot forward from the upright position and the right tensioner mechanism does not include a tension stop assembly 250. The right tensioner mechanism 300 is maintained in the downward, pivoted position while the operator clamps the ribbon end from the left side of a ribbon cartridge between the left tensioner mechanism 200 and the right arm mechanism 400. Pivoting the right tensioner mechanism 300 forward gives the operator ready access to the right arm mechanism 400.

Parts of the right tensioner mechanism 300 that correspond to parts of the left tensioner mechanism 200 described above will be identified herein by the same reference character with the addition of a prime mark. In addition to the apparatus described in connection with the left tensioner mechanism 200, the right tensioner mechanism 300 comprises a rotation assembly 302 to enable the mechanism to pivot forward from the upright position. The rotation assembly 302 comprises a kick plate 304, a cylinder support block 306, a rotation cylinder 308, a cylinder shaft coupling 310, a rotation stop assembly 330, and forming a part of the support plate 202', a rotation block 312 and a rotation extension 314. The rotation block 312 comprises a generally rectangular metal block affixed to the mounting plate 100 and having a shaft 316 extending lengthwise therethrough. The support plate 202' has a cutout 318 machined in its base substantially in the configuration of the rotation block 312. The shaft 316 extending through the rotation block 312 protrudes from each end and is received within corresponding cylindrical bores in the support plate 202', whereby the support plate 202' can pivot on the shaft relative to the rotation block 312.

The rotation extension 314 comprises a generally narrow extension on the inner side of the support plate 202' protruding downward through a cutout in the mounting plate. The kick plate 304 is a generally rectangular metal plate affixed to the lower surface of the mounting plate 100, forwardly of the support plate 202'. The rotation cylinder 308, a double-acting pneumatic cylinder such as a Bimba cylinder, Part No. MRS-022-DXP, extends below the mounting plate 100 between the kick plate 304 and the rotation extension 314, with the cylinder support block 306 pivotally securing the end of the cylinder 308 to the kick plate 304 and the shaft coupling 310 pivotally connecting the end of the cylinder shaft to the rotation extension 314. Thus, when the rotation cylinder shaft is retracted, the right tensioner mechanism 300 is in the fully upright position and when the cylinder shaft is extended, the right tensioner mechanism 300 is pivoted forward in the downward position.

Finally, the rotation stop assembly 330 comprises a stop block 332 affixed to the lower rear face of the support plate 202', a stop plate 334, a set screw 336, and a lock nut 338. The stop plate 334 is affixed to the rear face of the rotation block 312 and extends outwardly from the rotation block 312 to a point immediately rearwardly of the support plate 202'. The set screw 336 is received through a threaded bore in the stop plate 334, in alignment with the stop block 332 when the right tensioner mechanism 300 is in the upright position. Thus, the set screw can be adjusted to fine tune the desired upright position of the right tensioner mechanism 300.

Right Arm Mechanism

Figure 10:
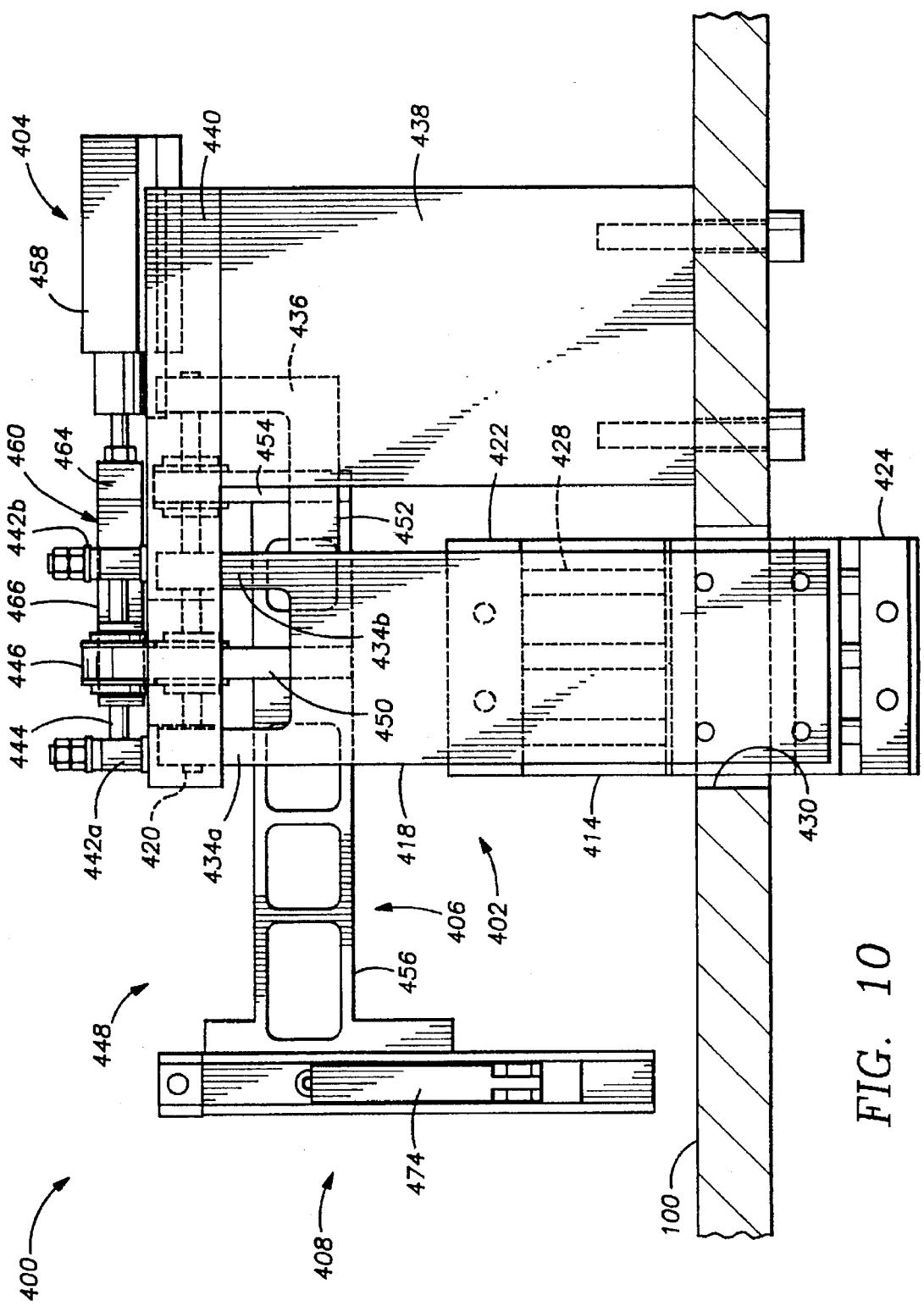
FIG. 10 depicts a front elevation of the right arm mechanism of the ROWS shown in FIG. 1.
Figure 11:
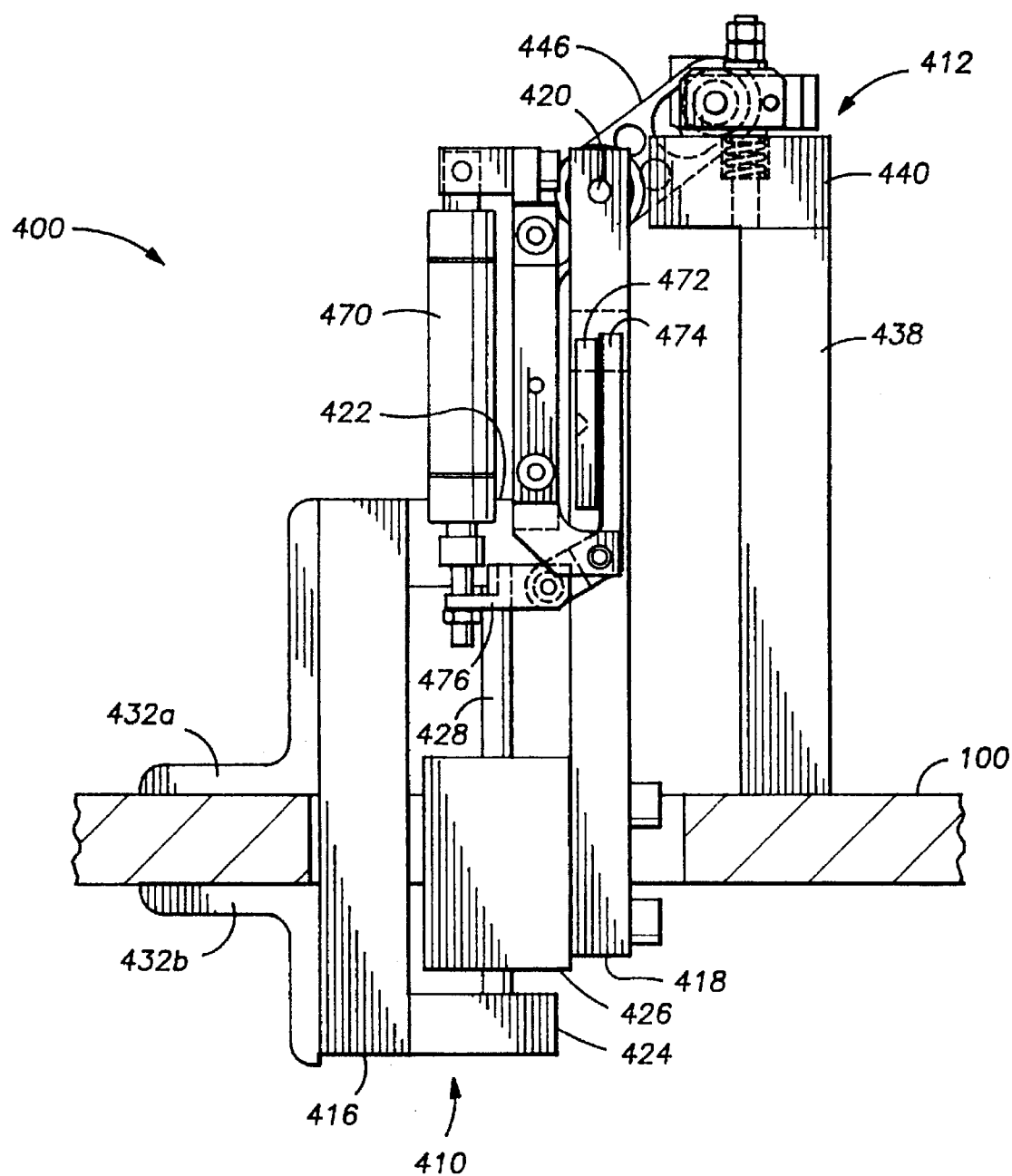
FIG. 11 depicts a left side elevation of the right arm mechanism shown in FIG. 10.
Figure 12:
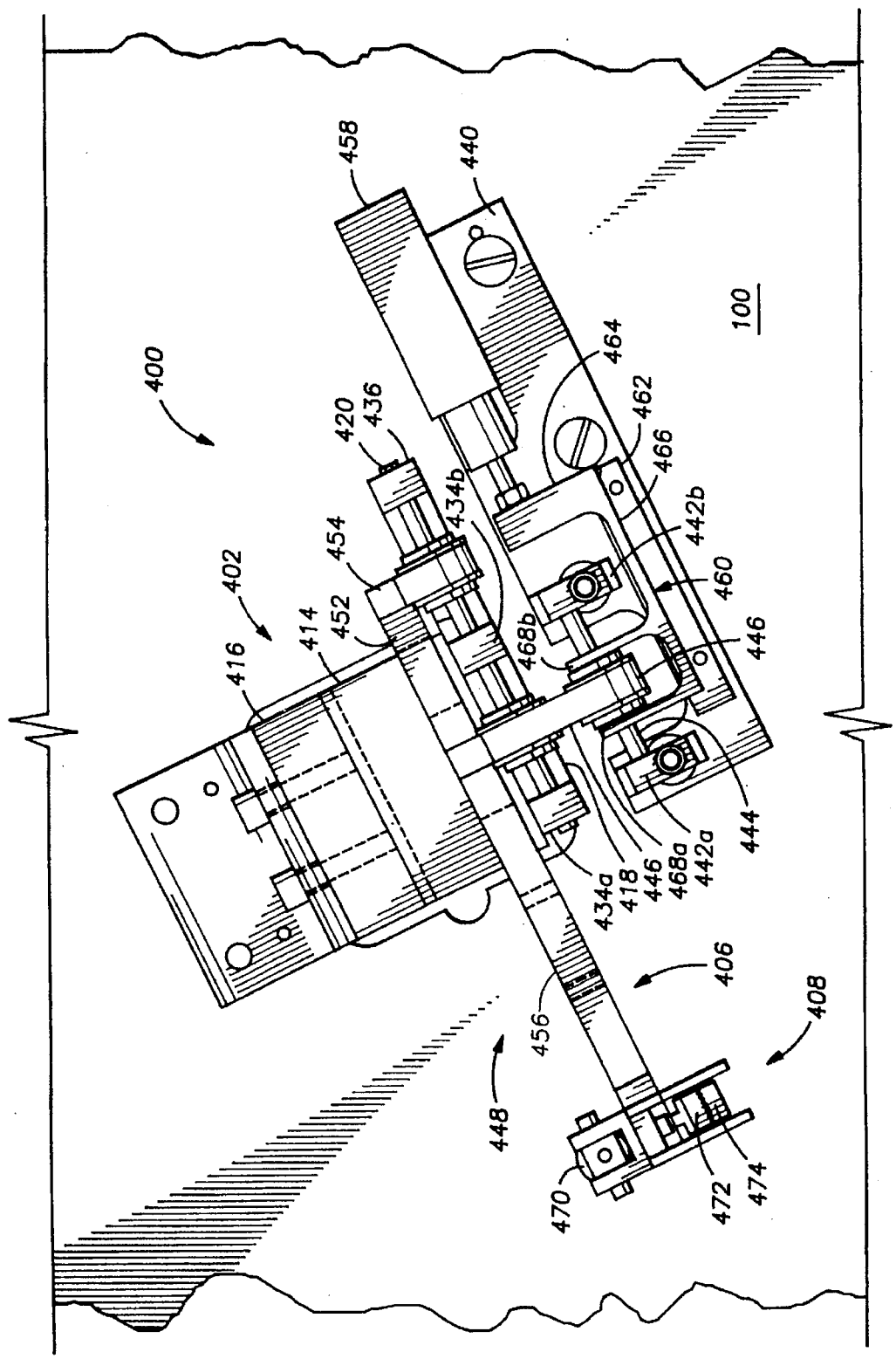
FIG. 12 depicts a top view of the right arm mechanism shown in FIG. 10.

Referring now to FIGS. 10–12, the right arm mechanism 400 includes means for clamping the outermost portion of the ribbon end extending from the left side of a ribbon cartridge and means for repositioning the ribbon end after the welding operation in preparation for the cutting operation. The right arm mechanism 400 comprises an arm rotation assembly 402, an arm translation assembly 404, a ribbon guide assembly 406, and a ribbon clamp assembly 408.

The arm rotation assembly 402 provides the means by which the arm mechanism 400 pivots rearwardly and upwardly from the upright position in which the left ribbon end initially is clamped. The arm rotation assembly 402 comprises a cylinder assembly 410 and an arm assembly 412. The cylinder assembly 410 comprises a rodless pneumatic rotation cylinder 414, such as an SMC slide cylinder, Part No. NCDY1S10-0150, a cylinder mounting block 416, a yoke plate 418 with shaft support 436, and a yoke shaft 420.

The cylinder 414 comprises an upper end plate 422, a lower end plate 424, and a piston 426 arranged to slide on columns 428 extending between the two end plates 422,424. One side of the cylinder mounting block 416 is attached at each end thereof to a cylinder end plate 422,424. The cylinder 414 and the mounting block 416 are received through a cutout 430 in the mounting plate 100, and the mounting block 416 is attached to the mounting plate 100 by means of upper and lower mounting brackets 432*a,b*, as shown in FIG. 11. The precise position of the cylinder 414 relative to the mounting plate 100 may be selected to accommodate the desired starting and ending rotational position of the arm assembly 412, as will become evident from a careful review of this disclosure.

Referring still to FIGS. 10–12, the yoke plate 418 is affixed at its lower end to the rotation cylinder piston, whereby the yoke plate 418 will move up and down in response to pneumatically inspired motion of the cylinder piston. The yoke plate 418 includes at its upper end a pair of generally vertical projections 434*a,b*, one on each side of the yoke plate 418, as well as an L-shaped shaft support 436 projecting generally horizontally and vertically from the upper, outer face of the yoke plate 418. The yoke plate 418 thus has the appearance at its upper end of a three-pronged fork. The yoke shaft 420 extends generally horizontally between the two outer, upright projections 434*a*,436 and through the middle projection 434*b*. Actuation of the rotation cylinder 414 causes the yoke shaft 420 to move vertically up or down.

The arm assembly 412 comprises a platform stand 438, a platform block 440, a shaft stand 442, a fixed shaft 444, a rotation block 446, and an arm 448. The platform stand 438 is an elongated metal plate mounted on its end to the mounting plate 100 forwardly and outwardly of the cylinder assembly 410. The platform stand 438 projects vertically from the mounting plate 100 and supports at its upper end the platform block 440. The platform block 440 is a metal bar of generally square cross section affixed to the platform stand 438 and projecting inwardly from the platform stand 438. The platform stand 438 and platform block 440 lie in a plane generally parallel to the plane of the yoke plate 418. The platform block 440 supports on its upper face at the inward end the shaft stand 442 and the fixed shaft 444. The shaft stand 442 comprises a pair of metal blocks 442*a,b* spaced by the length of the fixed shaft 444 to receive therebetween in opposed cylindrical bores the fixed shaft 444.

The rotation block 446 pivotally connects the fixed shaft 444 and the yoke shaft 418 and supports the arm 448 rearwardly of the yoke shaft 418. The rotation block 446 is pivitally and slidably attached to the fixed shaft 444 at its forward end and is pivotally connected to the yoke shaft 420 at an intermediate point on the block 446. With the rotation cylinder 414 in its downward position, the position of the fixed shaft 444 relative to the yoke shaft 420 is such that the rotation block 446 slopes downward from the fixed shaft 444 to the yoke shaft 420 at an angle of approximately 45°. Rearwardly of the yoke shaft 420, the rotation block 446 comprises an extension 450 that supports the arm 448. With the cylinder in the downward position, the arm support extension 450 on the rotation block 446 projects generally vertically downward.

Referring still to FIGS. 10–12, the arm 448 supports at its inward end the ribbon clamp assembly 408. The ribbon guide assembly 406, which is attached to the mounting plate 100, has been excluded from FIGS. 10–12 in order to facilitate an understanding of the other structures depicted therein. The arm 448 comprises a spacer block 452, a bearing block 454, and an extension plate 456.

The bearing block 454, which is pivotally attached to the yoke shaft 420 outwardly of the rotation block 446, forms the outward end of the arm 448. The bearing block 454 is connected to the outward face of the rotation block 446 by means of the spacer block 452. The extension plate 456 connects to the inward face of the rotation block 446 and projects inwardly of the rotation block 446. The extension plate 456 supports the ribbon clamp assembly 408 at its inward end. The length of the extension plate 456 should be selected to position the clamp assembly 408 in the optimum position, as will become evident from reading this entire disclosure.

Thus, when the rotation cylinder 414 is in the downward position, the arm 448 is in its downward position for receiving a ribbon end within the clamp assembly 408 prior to the welding operation. After the welding operation, the rotation cylinder 414 moves to its upward position, causing the arm 448 to pivot rearward and upward to reposition the ribbon end for the cutting operation. In addition to the pivoting motion imparted by the rotation assembly 402, the arm 448 also is repositioned inwardly by linear translation imparted by the arm translation assembly 404.

Referring still to FIGS. 10–12, the arm translation assembly 404 comprises a translation cylinder 458, a translation fork 460, and a slip plate 462. The translation cylinder 458 is a pneumatic cylinder, such as an SMC cylinder, Part No. NCDJPB10-075D-90L, positioned on the outward end of the platform block 440, with the cylinder shaft projecting inwardly along the longitudinal axis of the block 440. The translation fork 460 is affixed to the end of the cylinder shaft. The translation fork 460 comprises a forward projection 464, extending generally perpendicularly of the cylinder shaft, intersecting an inward projection 466, extending along a line generally parallel to the cylinder shaft to a point near the innermost end of the fixed shaft 444, when the cylinder shaft is in the extended position.

The translation fork 460 further includes a pair of rearward "fork" projections 468*a,b* extending generally perpendicularly from the inward projection 466 of the translation fork 460 and slidably engaging the fixed shaft 444 on opposing sides of the rotation block 446, whereby extension and retraction of the translation cylinder shaft causes the rotation block 446 and attached arm 448 to translate inward and outward, respectively, relative to the platform stand 438 and cylinder assembly 410. Finally, the slip plate 462 comprises a relatively thin metal plate positioned on the platform block 440 beneath the translation fork 460. The upper surface of the slip plate 462 has a specially hardened finish to act as a bearing surface so as to facilitate motion of the translation fork 460.

The ribbon guide assembly 406 is constructed substantially as shown and described in connection with the left tensioner assembly 200. It is affixed to the mounting plate 100 forwardly of the arm 448 in the area indicated generally by the reference character 406. The ribbon guide assembly is positioned such that when the right arm mechanism 400 is in the downward position, the guide assembly 400 is generally coplanar with the ribbon clamp assembly 408.

The ribbon clamp assembly 408 also is constructed substantially as shown and described in connection with the left tensioner assembly 200, except that the clamp cylinder 470 is mounted behind, rather than below, the jaws 472,474. In order to accommodate this difference in configuration, as shown in FIG. 11, a clamp cylinder shaft coupling 476 projects perpendicularly from the cylinder shaft to a pivotable and slidable engagement with the rotating jaw 474. The clamp actuating switch (not shown), as shown and described in connection with the left tensioner mechanism 200, is affixed to the outward face of the ribbon guide assembly 406, along the centerline of ribbon guide assembly 406.

Left Arm Mechanism

Figure 13:
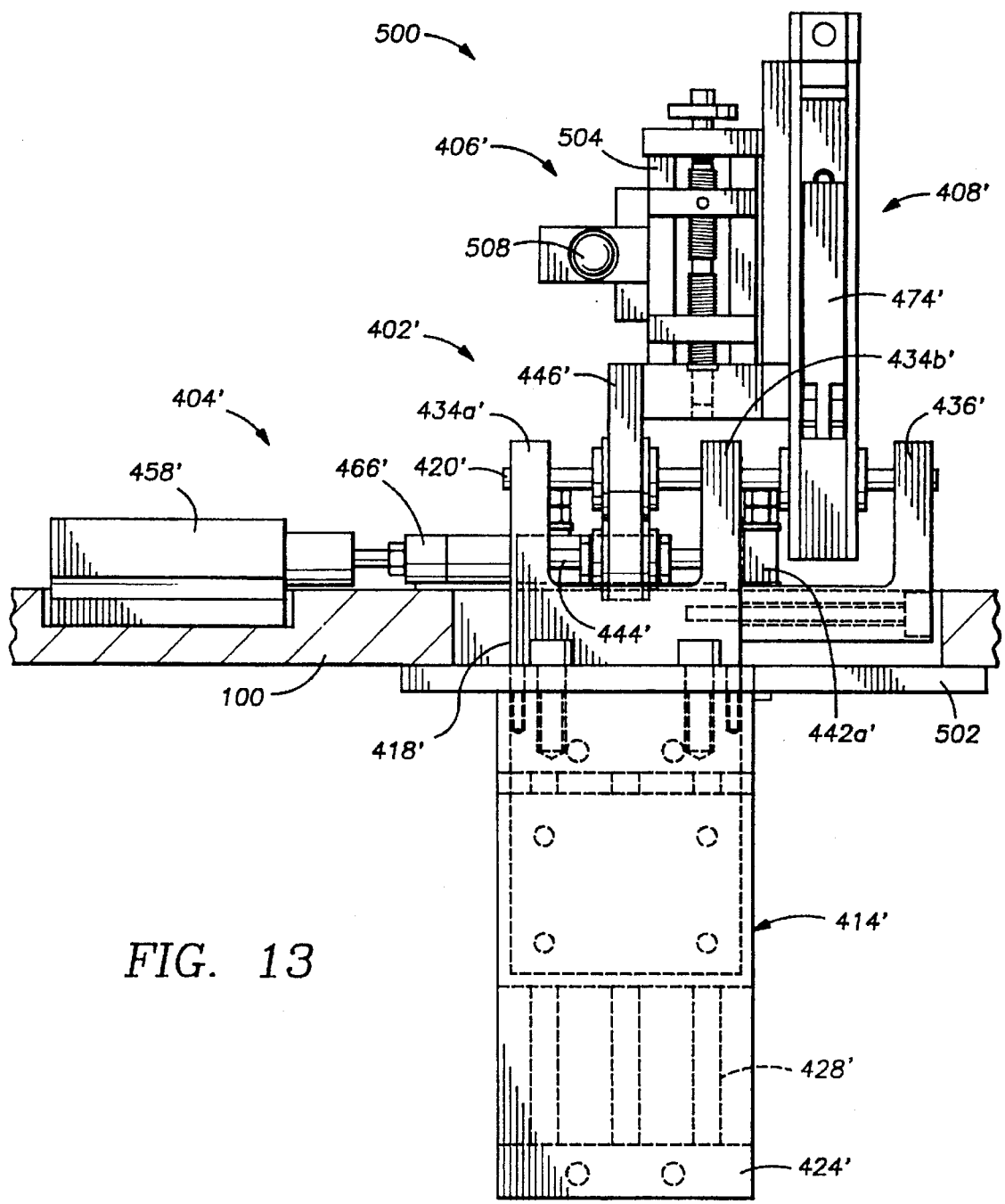
FIG. 13 depicts a front elevation of the left arm mechanism of the ROWS shown in FIG. 1.
Figure 14:
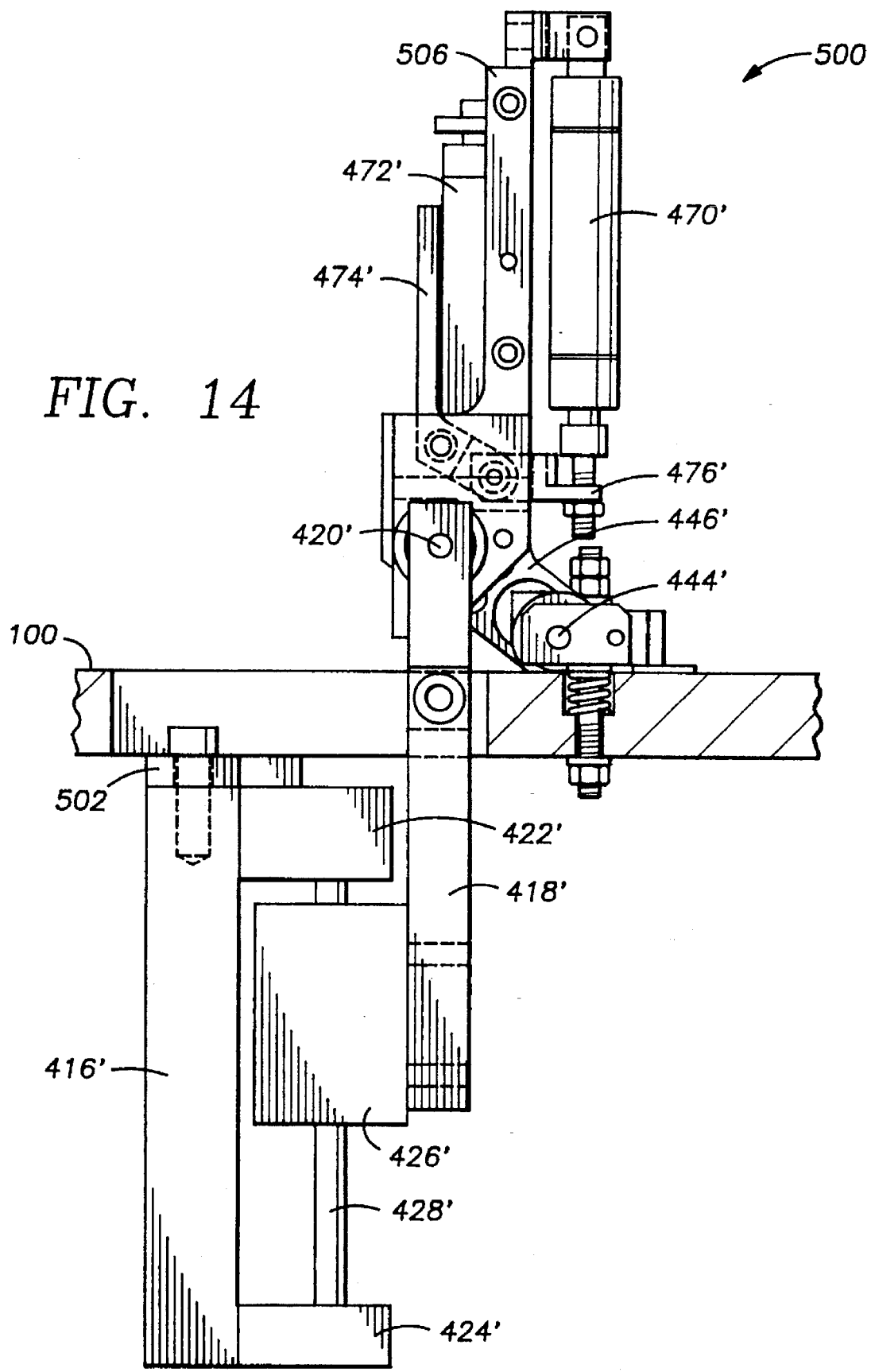
FIG. 14 depicts a left side elevation of the left arm mechanism shown in FIG. 10.
Figure 15:
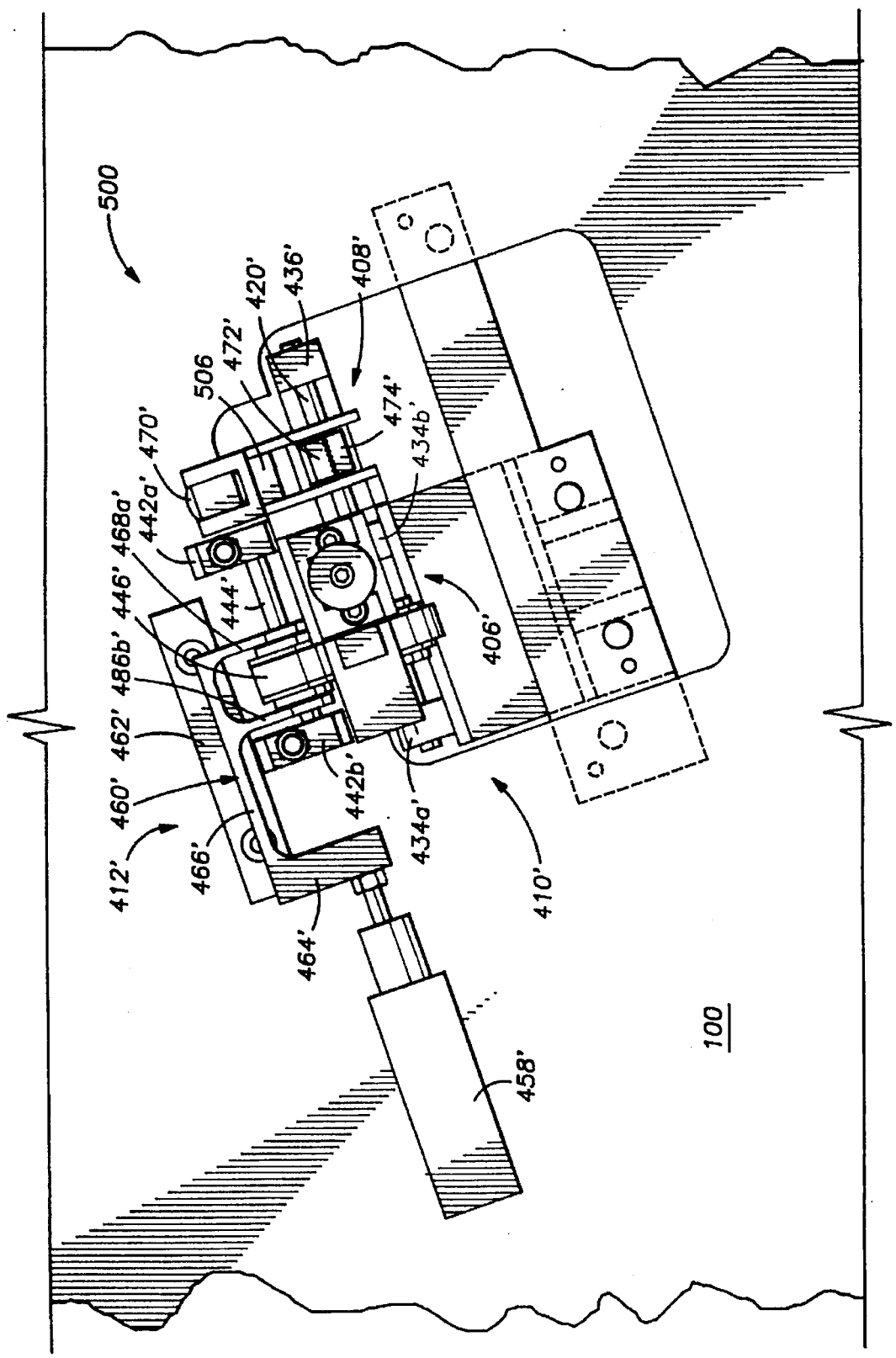
FIG. 15 depicts a top view of the left arm mechanism shown in FIG. 10.

Referring now to FIGS. 13–15, the left arm mechanism 500 includes means for clamping the outermost portion of the ribbon end extending from the right side of a ribbon cartridge and means for repositioning the ribbon end after the welding operation in preparation for the cutting operation. As with respect to the description of the right tensioner mechanism 300, parts of the left arm mechanism 500 that correspond to parts of the right arm mechanism 400 described above will be identified herein by the same reference character with the addition of a prime mark. Like the right arm mechanism 400, the left arm mechanism 500 comprises an arm rotation assembly 402', an arm translation assembly 404', a ribbon guide assembly 406', and a ribbon clamp assembly 408'.

The arm rotation assembly 402' provides the means by which the left arm mechanism 500 pivots forwardly and downwardly from the upright position in which the right ribbon end initially is clamped. Like that of the right arm mechanism 400, the arm rotation assembly 402' of the left arm mechanism 500 comprises a cylinder assembly 410' and an arm assembly 412'. The cylinder assembly 410' of the left arm mechanism 500 is constructed as a mirror image of that of the right arm mechanism 400, except that in the left arm mechanism 500 the cylinder mounting block 416' is secured to the underside of a T-block 502, which is mounted entirely beneath a cutout in the mounting plate 100. When the rotation cylinder 414' is in the downward position, the yoke plate 418' extends into the cutout to position the yoke shaft 420' approximately within the thickness of the mounting plate 100. Actuation of the rotation cylinder 410' causes the yoke shaft 420' to move upward, above the mounting plate 100.

The arm assembly 412' of the arm rotation assembly 402' of the left arm mechanism 500 operates similarly in theory to the arm assembly 412 of the right arm mechanism 400, but the structure is slightly different to account for the difference in final position of the arms preparatory to the cutting operation. The arm assemblies 412,412' are mirror images of one another about the centerline of the overlapped ribbon ends.

Thus, the arm assembly 412' of the left arm mechanism 500 comprises a shaft stand 442', a fixed shaft 444', and a rotation block 446'. The shaft stand 442' and fixed shaft 444' are constructed substantially as mirror images of the same parts in the right arm mechanism 400, except that the shaft stand 442' is attached to the upper face of the mounting plate 100 rather than the upper face of the platform block 440. As in the case of the right arm assembly 400, the fixed shaft 444' is generally parallel to the yoke shaft 420', but is spaced rearwardly rather than forwardly of the yoke shaft 420'.

The rotation block 446' is pivotally and slidably attached to the fixed shaft 444' and pivotally attached to the yoke shaft 420'. With the rotation cylinder 414' in its extended position, the rotation block 446' slopes forwardly and upwardly from the fixed shaft 444' to the yoke shaft 420' at approximately 45°. From the yoke shaft 420', the rotation block 446' extends generally vertically a short distance for support of the ribbon guide assembly 406' and the ribbon clamp assembly 408'.

The arm translation assembly 404', like that of the right arm mechanism 400, comprises a translation cylinder 458', a translation fork 460', and a slip plate 462'. The arm translation assembly 404' of the left arm mechanism 500 is constructed as a mirror image of that of the right arm mechanism 400, except that the arm translation assembly 404' of the left arm mechanism 500 is affixed to the mounting plate 100 rather than to the upper surface of the platform block 440. Thus, extension and retraction of the translation cylinder shaft causes the rotation block 446' to move inwardly and outwardly, respectively, relative to the rotation cylinder assembly 410'.

The ribbon guide assembly 406' and the ribbon clamp assembly 408' are constructed as mirror images of the same structures on the right arm mechanism 400. A frame 504 for the ribbon guide assembly 408' is affixed to the upper end of the rotation block 446' on the inward side, and a block 506 supporting the ribbon clamp assembly 408' is pivotally supported on the yoke shaft 420' and affixed to the inward side of the ribbon guide assembly frame 504. A clamp actuating switch 508 for the ribbon clamp assembly 408' is attached to the outward face of the frame of the ribbon guide assembly 406', above the rotation block 446', along the centerline of the ribbon guide assembly 406'.

Left and Right Guide Pin Mechanisms

Figure 16:
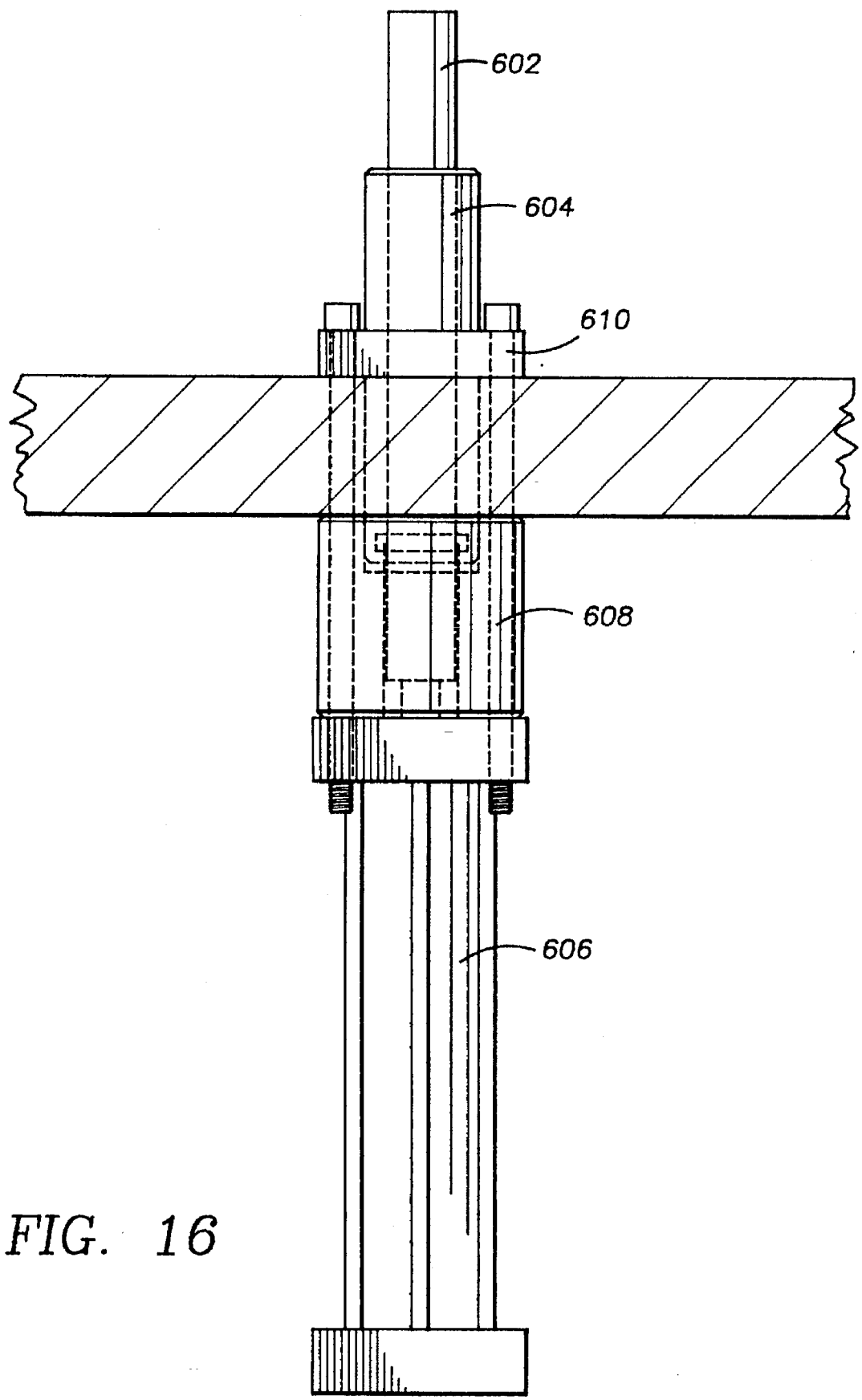
FIG. 16 depicts a side elevation of a guide pin mechanism of the ROWS shown in FIG. 1.

The left guide pin mechanism 600 and the right guide pin mechanism 650 are identical in structure. Referring now to FIG. 16, each comprises a cylindrical metal guide pin 602, a support grommet 604, a guide pin cylinder 606, and a cylinder support coupling 608. The support grommet 604 comprises a cylindrical metal pipe having an axial bore slightly greater in inner diameter than the outer diameter of the cylindrical guide pin 602. The support grommet 604 is received within a cylindrical bore in the mounting plate 100, with a flange 610 that extends radially from the outer surface of the grommet being bolted to the cylinder support coupling 608 on the lower side of the mounting plate 100.

The cylindrical guide pin 602 is received within the bore in the support grommet 604 and arranged for sliding movement up and down, as described below. The guide pin cylinder 606 is a pneumatic cylinder, such as a Bimba cylinder, Part No. FO-02-1.750-MT-M, affixed to the underside of the mounting plate 100 by means of the cylinder support coupling 608, with its shaft extending upward aligned coaxially with and affixed to the lower end of the cylindrical guide pin 602.

Thus, extension and retraction of the shaft on the guide pin cylinder 606 causes the guide pin 602 to extend and retract, respectively. The left and right guide pin mechanisms 600,650 provide surfaces around which the right and left ribbon ends, respectively, are pivoted at the time they are clamped in initial position preparatory to the welding operation, as further described below.

Left and Right Ribbon Alignment Guide Mechanisms

Figure 17:
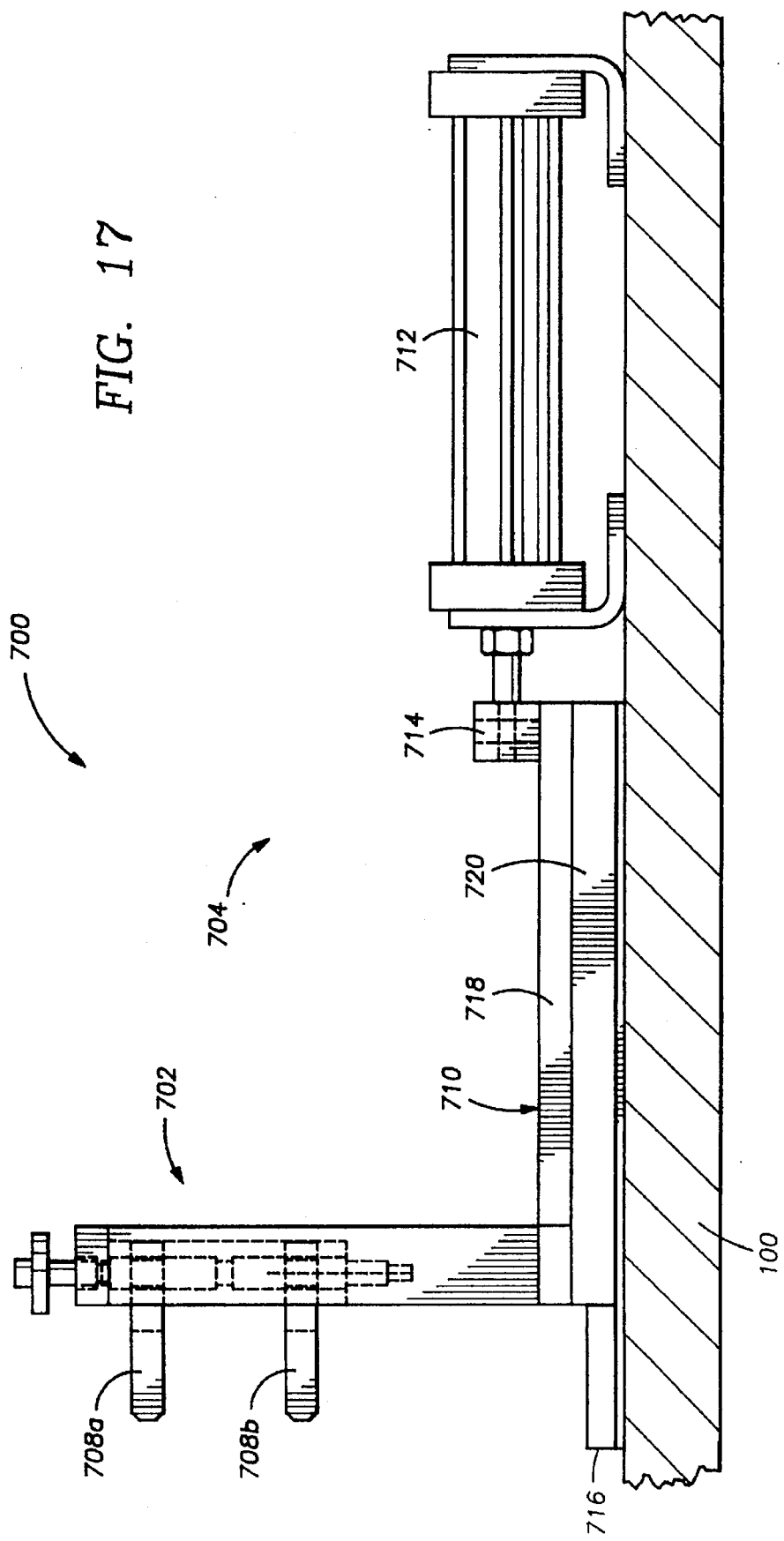
FIG. 17 depicts a left side elevation of an alignment guide mechanism shown in FIG. 1.
Figure 20:
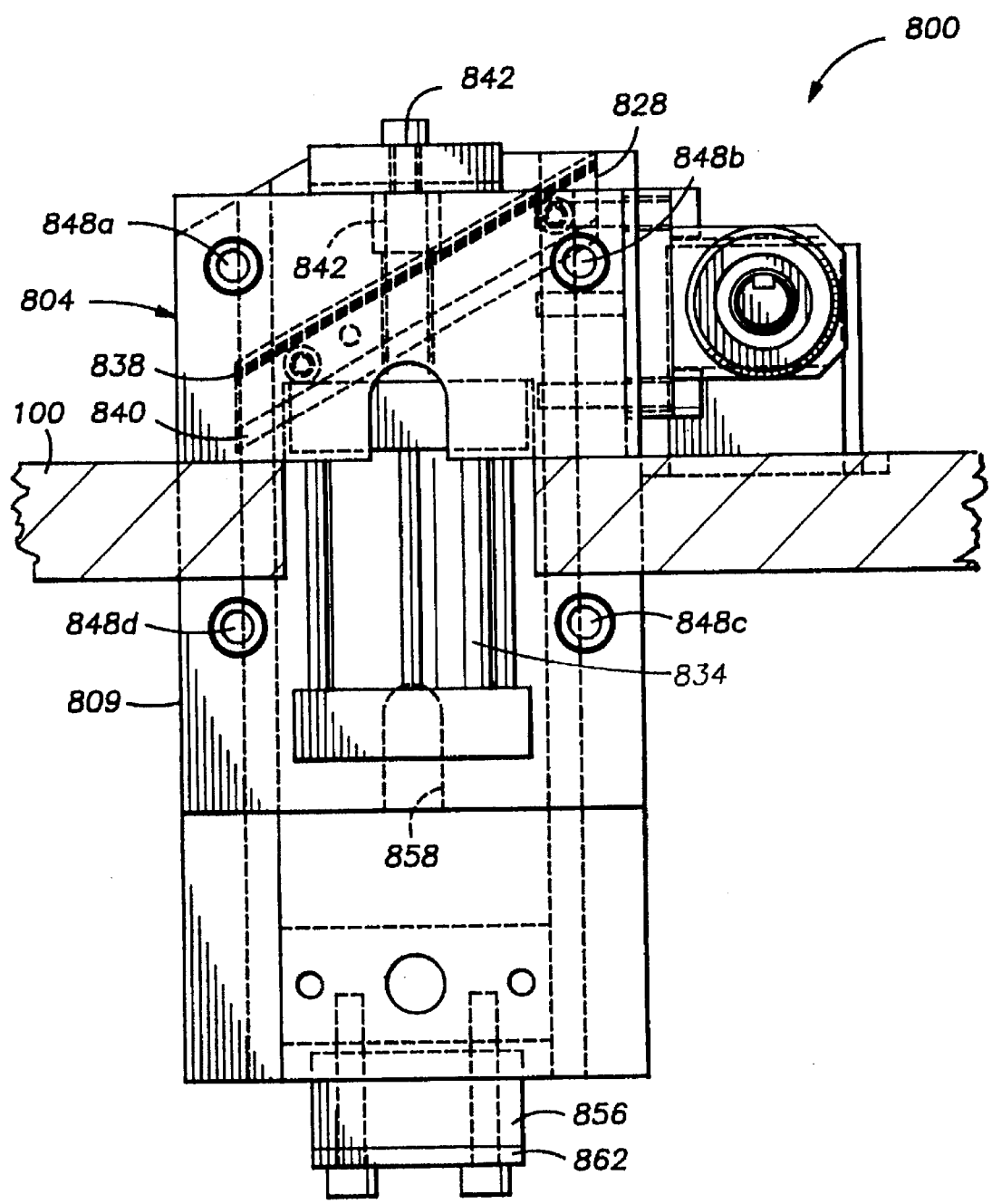
FIG. 20 depicts a front elevation of an anvil mechanism of the ROWS shown in FIG. 1.

Referring now to FIGS. 17–19, the left and right ribbon alignment guide mechanisms 700,750 engage the edges of the overlapped ribbon ends and align the ribbon edges as tension on the ribbon ends is relaxed and then reengaged. The guide mechanisms 700,750 stay in position on the overlapped ribbon ends during the welding operation and then are retracted. The guide mechanisms 700,750 are identical mirror images of one another in construction and operation. Accordingly, a description of one guide mechanism is sufficient.

The left ribbon alignment guide mechanism 700 comprises a ribbon guide assembly 702 and a track assembly 704. The ribbon guide assembly 702 is constructed substantially the same as the ribbon guide assemblies shown and described in connection with the left and right tensioner mechanisms 200,300 and the right and left arm mechanisms 400,500, except that the guide bars 706a,b on the guide mechanism 700 are generally L-shaped, with a portion 708a,b projecting forwardly from the outer end of the guide bars 706a,b. The projections 708a,b are adjusted so as to engage therebetween and thereby align the overlapped ribbon ends when the guide mechanism 700 is moved forward into position.

The track assembly 704 comprises a slide assembly 710, a slide cylinder 712, and a cylinder shaft coupling 714. The slide assembly 710 comprises a linear slide, such as a Deltron ball slide, Part No. E-4, having a fixed track 716 mounted to the mounting plate 100, a sliding track 718 slidably received on the fixed track 716, and a sliding plate 720 attached to the sliding track 718. The track assembly 704 is mounted so as to slide forwardly and rearwardly on the inward side of the guide pin mechanisms 600,650. The ribbon guide assembly 702 is affixed to the upper surface of the front end of the sliding plate 720.

The slide cylinder 712 is affixed to the mounting plate 100 at the rear end of the track assembly 704, with the cylinder shaft projecting forwardly along a line generally parallel to the direction of travel of the slide assembly 710. The cylinder shaft coupling 714 attaches the cylinder shaft to the rear upper face of the sliding plate 720. Thus, on actuation of the slide cylinder 712, the cylinder shaft extends forward, causing the sliding track 718 and sliding plate 720 to move forward with respect to the fixed track 716. Forward motion of the sliding track 718 brings the ribbon guide assembly 702 into engagement around the overlapped ribbon ends.

Anvil Mechanism

Referring now to FIGS. 20–24, the anvil mechanism 800 provides a narrow land surface adjacent to the overlapped ribbon ends which cooperates with the welder mechanism to transfer ultrasonic energy to the ribbon fabric to facilitate fusion of the ribbon ends along the land surface. The anvil mechanism 800 comprises an alignment assembly 802, a support housing 804, an anvil assembly 806, and a weld select assembly 808. The support housing comprises a generally cubic block of metal machined to include various bores as shown in the drawings and described herein and a plate 809 extending downwardly from the rearward end of the support housing 804 through a cutout in the mounting plate 100.

The support housing 804 is attached to the mounting plate 100 by means of four bolts. Three bolts 810a,b,c are received through corresponding cylindrical bores and secured to the mounting plate 100. The fourth bolt 812 is received through the mounting plate 100 and threadedly engaged within the support housing 804. The attachments with bolts 810a,b,c, 812 is such that the first three bolts 810a,b,c can be loosened to permit the support housing 804 to pivot about the fourth bolt 812 so as to adjust the alignment of the rearward face of the housing 804 relative the overlapped ribbon ends and the welder mechanism 900.

The alignment assembly 802 provides a means to make minute adjustments to the position of the support housing 804 after the first three housing bolts are loosened. The alignment assembly 802 comprises an alignment shaft 814, a shaft mount 816, a housing attachment 818, a lock nut 820, and a micrometer adjustment knob 822. The alignment shaft 814 is fixedly supported generally parallel to and spaced above the mounting plate 100 by means of the shaft mount 816. The shaft mount 816 is secured to the mounting plate by a pair of bolts 824a,b, and the shaft 814 is retained in place against rotational motion by means of a locking nut 826.

The micrometer adjustment knob 822 includes a precision threaded bore for receiving therethrough the alignment shaft 814. The portion of the alignment shaft 814 received through the adjustment knob 822 includes precision threads engaged within the corresponding threads in the adjustment knob 822. The housing attachment 818 is secured to the outward face of the support housing 804 and rotatably supports the micrometer adjustment knob 822 relative to the support housing 804. The lock nut 820, when tightened against the adjustment knob 822, locks the knob 822 against rotation on the alignment shaft 814. Thus, once the first three support housing bolts 810a,b,c have been loosened and the lock nut 820 has been loosened, the alignment of the rear face of the support housing may be fine tuned by careful rotation of the micrometer adjustment knob 822.

Referring still to FIGS. 20–24, the anvil assembly 806 comprises an anvil block 828, an anvil slide plate 830, a track plate 832, an anvil cylinder 834, and a bridge plate 836. The anvil block 828 bears the land surfaces that cooperate with the welding mechanism 900 to fuse the overlapped ribbon ends. It comprises a generally rectangular metal block disposed angularly on the rearward face of the slide plate 830. The anvil block 828 includes a first, narrow land surface 838, preferably approximately 0.010" in width, extending angularly across its length. The anvil block also includes a second, relatively wide land surface 840, preferably approximately 0.125" in width, extending parallel to and spaced below the narrow land surface 838. Both land surfaces 838,840 preferably are oriented upwardly at a 30° angle with respect to a horizontal projection through the lower, inward end of the surfaces.

Figure 22:
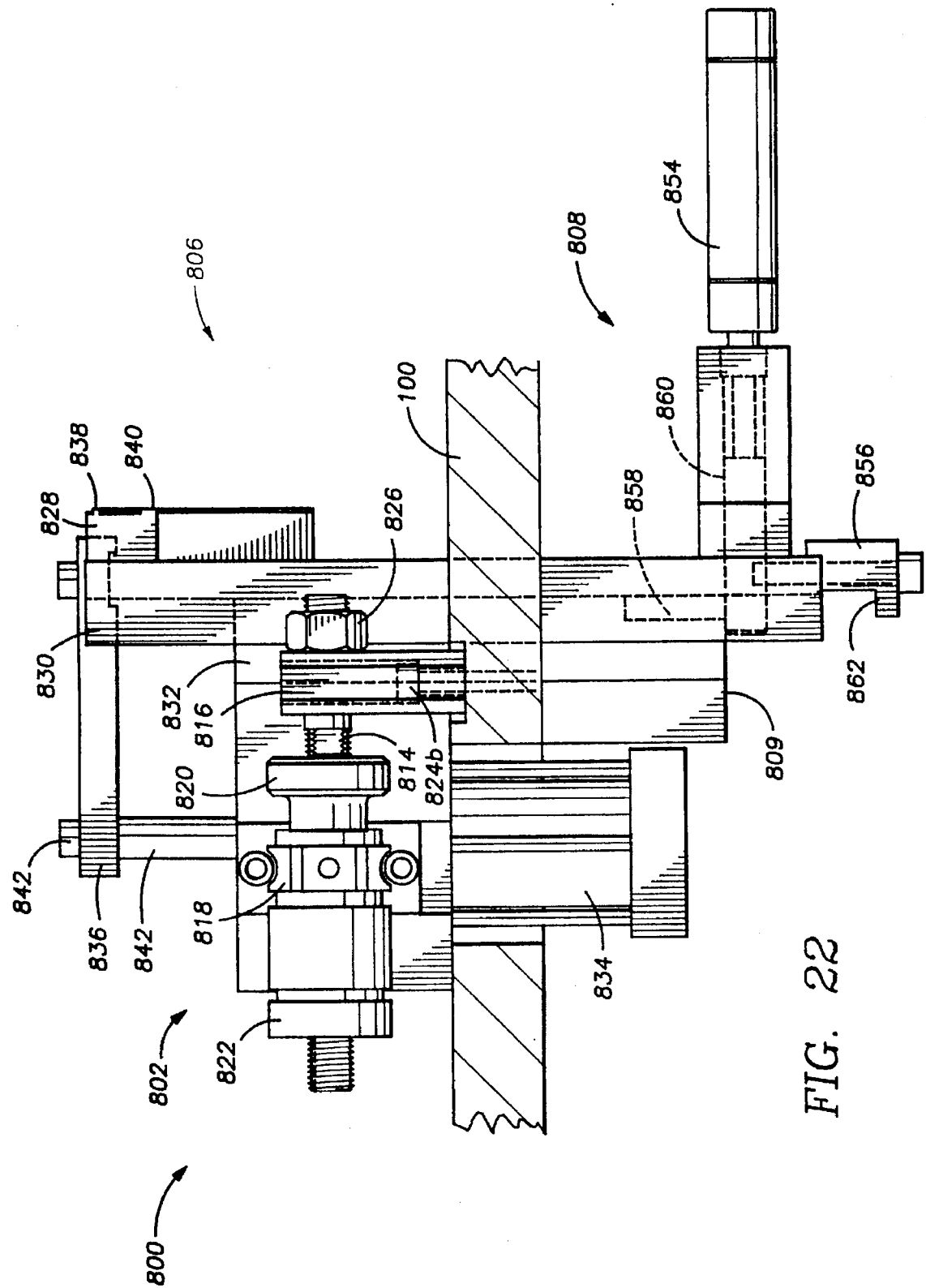
FIG. 22 depicts the anvil mechanism shown in FIG. 21 with the mechanism actuated to raise the anvil block for a welding operation.
Figure 23:
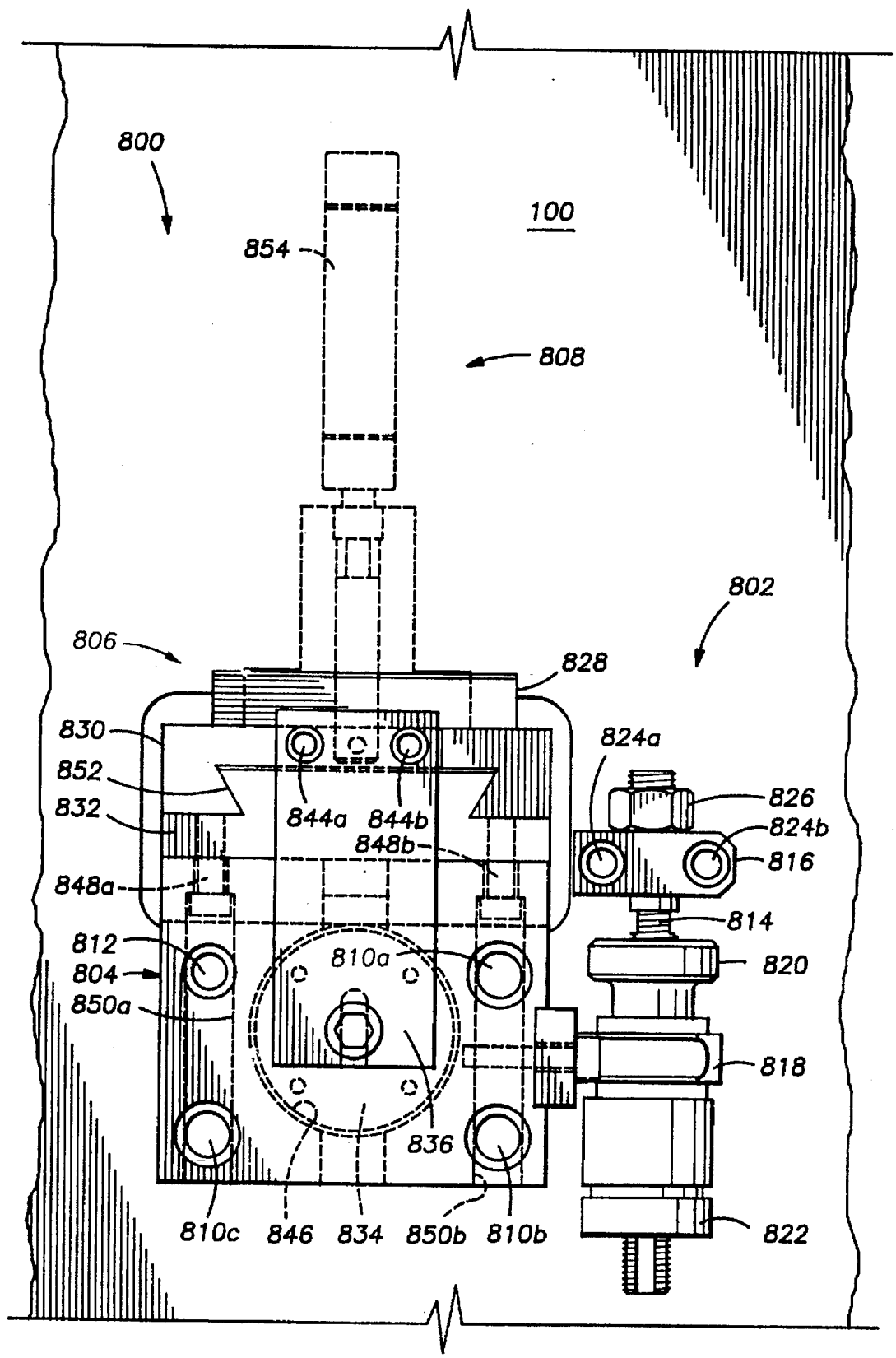
FIG. 23 depicts a top view of the anvil mechanism shown in FIG. 20.

The anvil cylinder 834 comprises a pneumatic cylinder, such as a Bimba flat cylinder, Part No. FO-04-2.5-EE1-M. The anvil cylinder 834 is received within a cylindrical bore 846 in the support housing 804, with its shaft 842 projecting upwardly through an upper bore in the support housing and into secured engagement with the bridge plate 836. The bridge plate 836 comprises a generally rectangular metal plate extending rearwardly across the top of the support housing 804 from the cylinder shaft 842 to the slide plate 830. The bridge plate 836 is secured to the slide plate 830 by means of a pair of bolts 844a,b, whereby extension of the cylinder shaft 842 raises the slide plate 830 and attached anvil block 828, as shown in FIG. 22.

The track plate 832 is secured to the rear face of the support housing 804 by means of four bolts 848a,b,c,d (FIG.

20) received through cylindrical bores 850a,b extending from the front face of the support housing 804 (or the extension plate 809 as to bolts 848c,d) toward the rear face. The track plate 832 extends from the upper end of the rear face of the support housing 804, through a cutout in the mounting plate 100, to a point below the mounting plate 100, and includes along both its inward and outward sides a groove defining a track 852 for receiving in slidable relation a portion of the slide plate 830. Thus, on actuation of the anvil cylinder 834, the cylinder shaft 842 extends upwardly, raising the bridge plate 836 and along with it the slide plate 830 and the anvil block 828, thereby positioning the anvil block for a welding operation.

The weld select assembly 808 enables the anvil mechanism to position either of two anvil surfaces on the anvil block 828, either the narrow land surface 838 or the wider land surface 840, for a welding operation. The weld select assembly 808 comprises a weld select cylinder 854, a stop plate 856, and a groove 858 in the lower rearward face of the track plate 832. When the anvil cylinder shaft 842 is fully retracted, the lower end of the slide plate 830 extends below the track plate 832 and supports on its rearward face the weld select cylinder 854. The weld select cylinder is a pneumatic cylinder, such as an SMC cylinder, Part No. NCJPB10-050-D-90L, with a stroke of approximately one-half inch, affixed generally perpendicularly of the slide plate 830 so as to extend its shaft and a shaft pin 860 positioned thereon forwardly.

The stop plate 856 is secured by a pair of bolts to the lower end of the slide plate 830. The stop plate 856 includes on the lower end thereof a forwardly extending flange 862 in position to engage the lower end of the track plate 832 when the slide plate is moved upwardly. The groove 858 comprises an inverted, U-shaped groove in the rearward face of the lower end of the track plate, aligned with the shaft pin 860.

Figure 21:
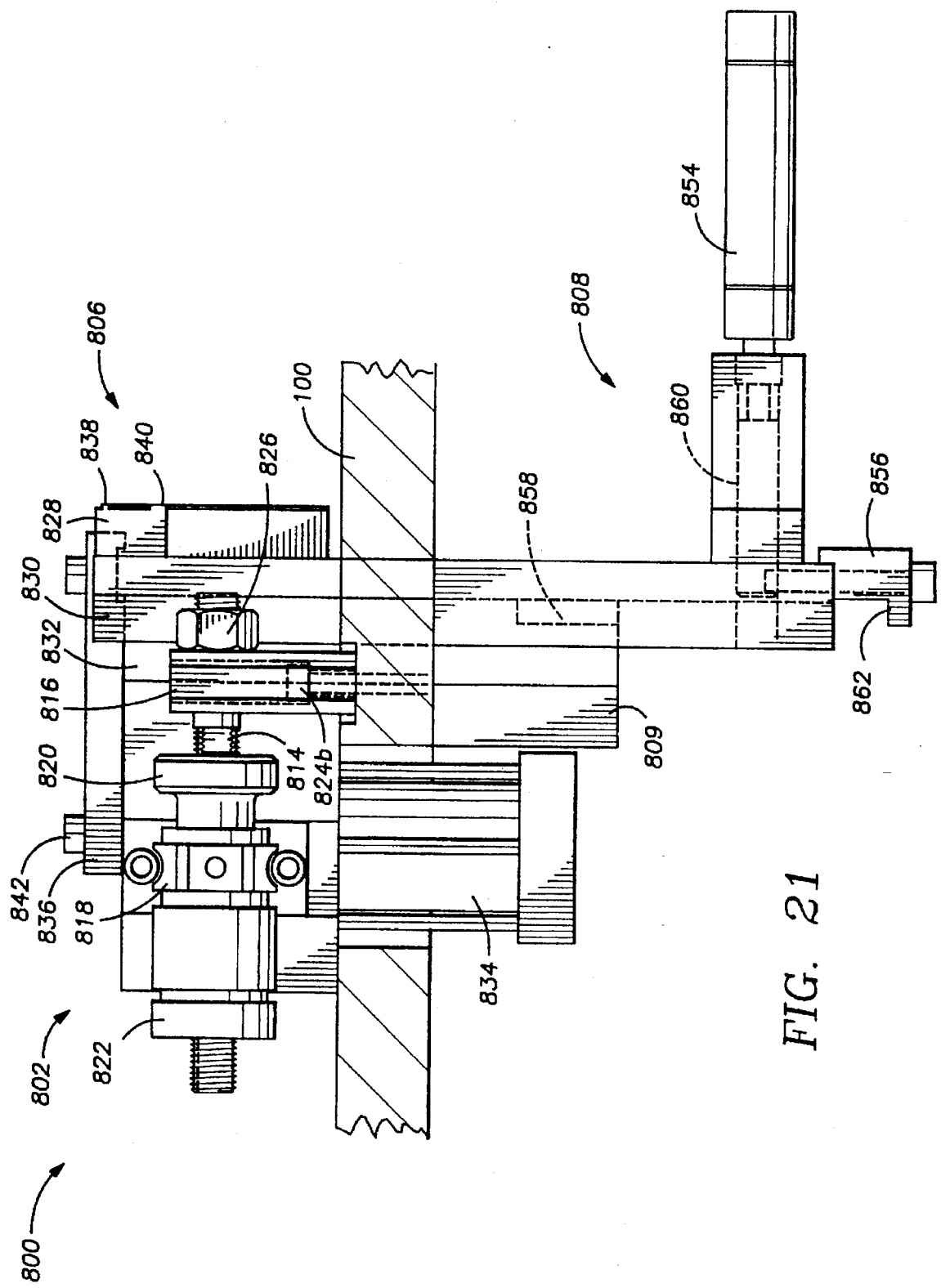
FIG. 21 depicts a right side elevation of the anvil mechanism shown in FIG. 20.

In operation, the weld select assembly 808 provides three positions. The first position is shown in FIG. 21, with the anvil cylinder shaft 842 fully retracted. The second position places the narrow land surface 838 on the anvil block 828 in position for the first welding operation. This is accomplished by extending the shaft on the weld select cylinder 854 to the position shown in FIG. 22 and extending the anvil cylinder shaft 842 until the shaft pin 860 slides within the groove 858 and engages the upper wall of the groove. The third position places the wider land surface 840 in position for the second welding operation, if one is desired. This is accomplished by retracting the shaft on the weld select cylinder 854 and extending the anvil cylinder shaft 842 until the flange 862 on the stop plate 856 engages the lower end of the track plate 832.

Welder Mechanism

Figure 24:
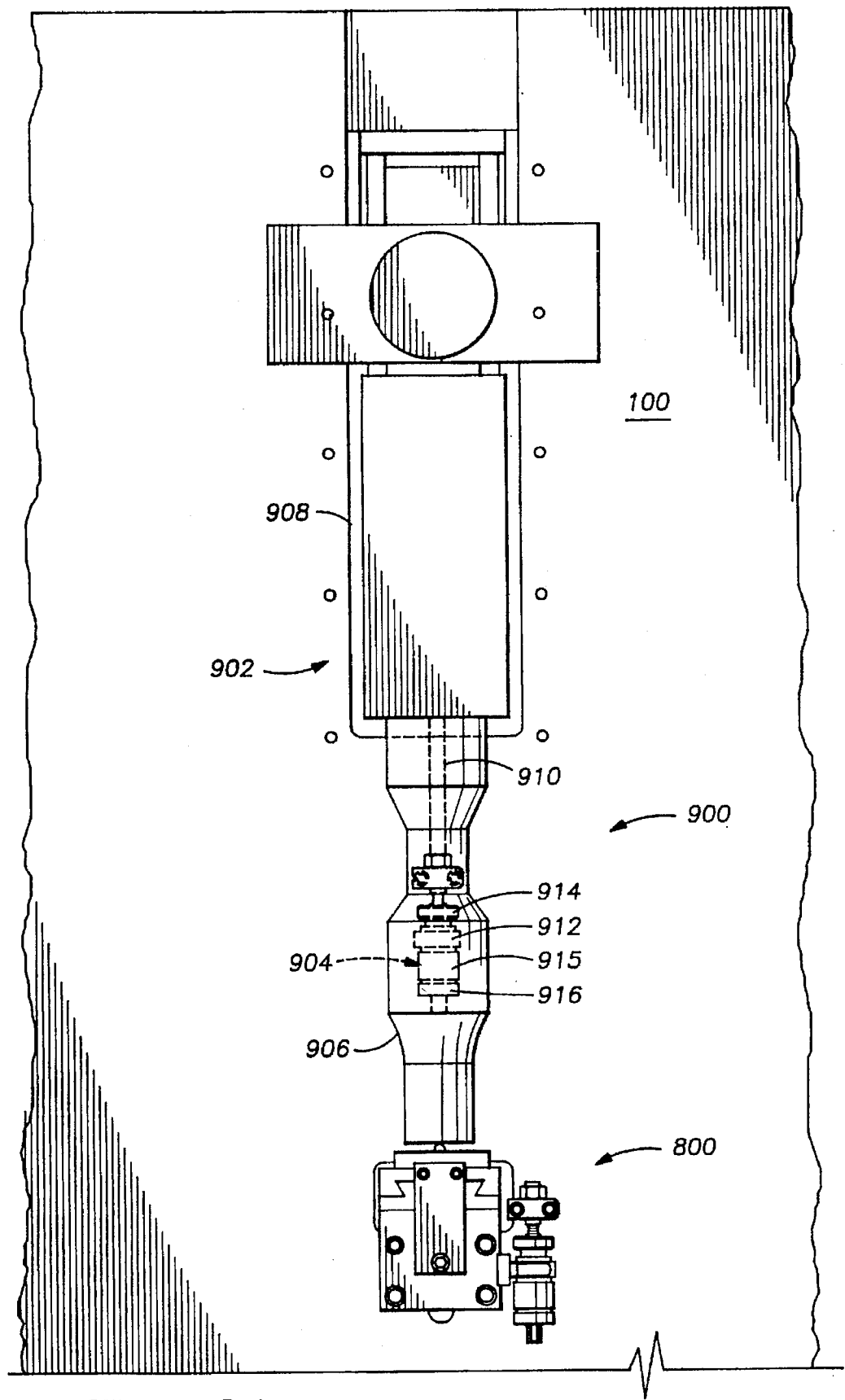
FIG. 24 depicts a top view of the welder mechanism shown in FIG. 1.

Referring now to FIG. 24, the welder mechanism 900 imparts ultrasonic energy to the overlapped ribbon ends to fuse the ribbon ends along a line defined by the anvil mechanism 800. The welder mechanism 900 comprises an ultrasonic welder 902 and a micrometer stop assembly 904. The ultrasonic welder 902 comprises a horn stack assembly 906, a power supply (not shown) for powering the horn stack assembly 906, and a pneumatic transport assembly 908. The ultrasonic welder is a commercially available package, such as a Branson Sonic Power Co. ultrasonic welder, Model No. 901AO, with horn stack assembly, power supply, and transport assembly.

The horn stack assembly 906 is slidably supported by the transport assembly 908 for motion in a plane generally parallel to the mounting plate. Thus, when the pneumatic cylinder (not shown) driving the transport assembly 908 is actuated, the welder mechanism slides forwardly toward the anvil mechanism 800 until the transport assembly contacts the micrometer stop assembly 904.

The micrometer stop assembly 904 includes a shaft 910, a shaft stand 912, a lock nut 914, a fixed barrel 915, and a micrometer adjustment knob 916. The shaft stand 912 is mounted to the mounting plate 100 directly beneath the horn stack assembly 906. (The entire stop assembly 904 should be shown in phantom in FIG. 24.) The shaft stand 912 includes a bore through which is received the shaft 910, which includes fine threads at the forward end thereof for precision adjustment and threads rearwardly of the shaft stand 912 for the lock nut 916.

The barrel 915 is fixed relative to the shaft stand and includes a radially extending key received in an axial groove in the shaft 910 to prevent rotation of the shaft 910. The knob 916 is threaded to the shaft and rotatably attached to the barrel 915. By loosening the lock nut 914, the shaft 910 can be rotated by means of the knob 916 to adjust the position at which the transport assembly 908 contacts the shaft 910. Thus, the micrometer stop assembly can be used to adjust precisely the gap between the anvil mechanism 800 and horn stack assembly 906.

The welder mechanism 900 includes an optical sensing means to indicate to the control system that the welder mechanism is in position against the micrometer stop assembly, as shown in FIG. 24. The optical sensing means may be, for example, a spring pack which, when compressed, breaks the optical beam and sends an electrical signal to the control system.

The control system is programmed to set up certain welding parameters for both a first welding operation and a second welding operation, if a second welding operation is desired. These parameters include a delay time, being the period from receipt of the signal that the welder mechanism is in position adjacent to the anvil mechanism to the energizing of the welder power supply; a welding time, being the period during which the power supply is energized; a hold time, being the period after de-energizing the power supply during which the horn stack assembly is held in place against the overlapped ribbon ends; and the after burst time, being the period during which the power supply is energized while the horn stack assembly is being withdrawn from the ribbons.

The hold time is important to enable the ribbon to cool quickly after the weld, so as to control the spread of heat outside the region of the weld. The after burst time is needed to shake the ribbon off of the horn as the horn stack assembly is withdrawn. Each of the four times described above, if a time is used, can vary from ten milliseconds to as much as several seconds, depending on the type of ribbon fabric, the type of fabric weave, the width of the ribbon, the type of ink with which the ribbon is impregnated, and other factors.

Cutter Mechanism

Figure 25:
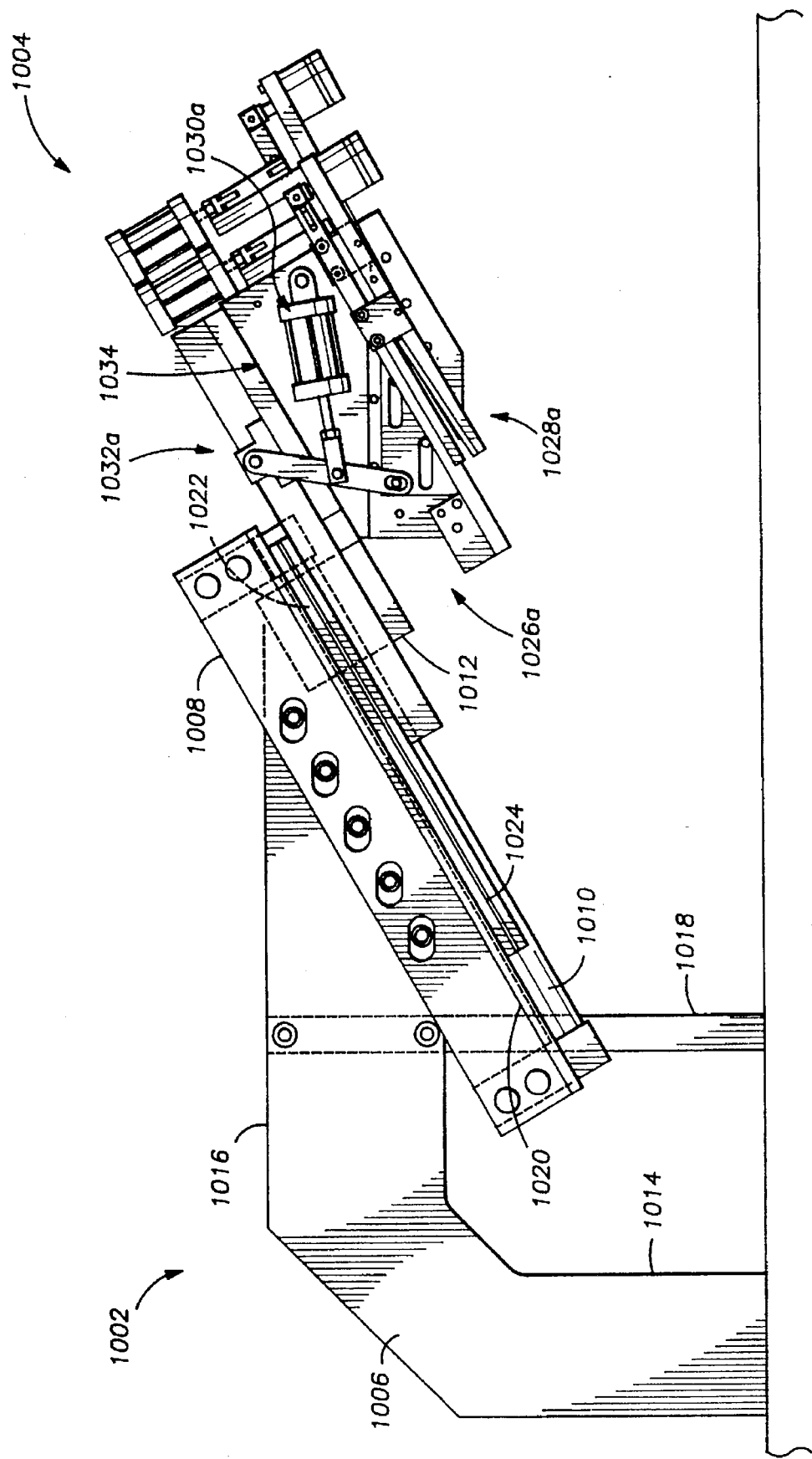
FIG. 25 depicts a front elevation of the cutter mechanism shown in FIG. 1.

Referring now to FIG. 25, the cutter mechanism 1000 severs two waste ribbon ends from opposing surfaces of the continuous ribbon loop created by the welding operation. The cutter mechanism 1000 comprises a slide assembly 1002 and a cutter assembly 1004. The slide assembly 1002 transports the cutter assembly 1004 into and out of position around the welded ribbon ends. The slide assembly 1002 comprises a support frame 1006, a slide support member 1008, a slide rail assembly 1010, and a cutter support plate 1012.

The support frame 1006 comprises a generally vertical member 1014 affixed to the left side of the mounting plate 100 and a generally horizontal member 1016 projecting inwardly from the upper end of the vertical member 1014. In addition, the support member comprises a support column 1018 projecting vertically between the mounting plate 100 and the horizontal member 1016 inwardly of the vertical member 1014.

The slide support plate 1008 comprises an elongated metal plate secured at an angle to the front face of support frame at the end of the horizontal member 1016. The slide support plate includes along its lower end a flange 1020 projecting perpendicularly toward the front of the ROWS. The flange 1020 supports on its lower face the slide rail assembly 1010.

The slide rail assembly 1010 is a pneumatically operated slide rail with a magnetically coupled piston 1022, having a ten-inch stroke, arranged to travel on a pair of rails 1024. One suitable assembly is a Micro Slide, Inc. slide rail, Part No. RW-118-10. The angled attachment of the slide support plate 1008 to the support frame 1006, with attached slide rail assembly 1010, is such that the rails 1024 on the slide rail assembly 1010 are generally parallel to the line defined by the weld bead formed in the overlapped ribbon ends during the welding operation. Preferably, this angle is 30° from the horizontal, sloping upwardly from an inward point to an outward point.

The cutter support plate 1012 is affixed to the lower face of the piston 1022 on the slide rail assembly 1010, whereby actuation of the pneumatic slide rail assembly causes the piston 1022 and cutter support plate 1012 to move downwardly and inwardly or to move upwardly and outwardly. The cutter support plate 1012 carries the cutter assembly 1004.

Figure 26:
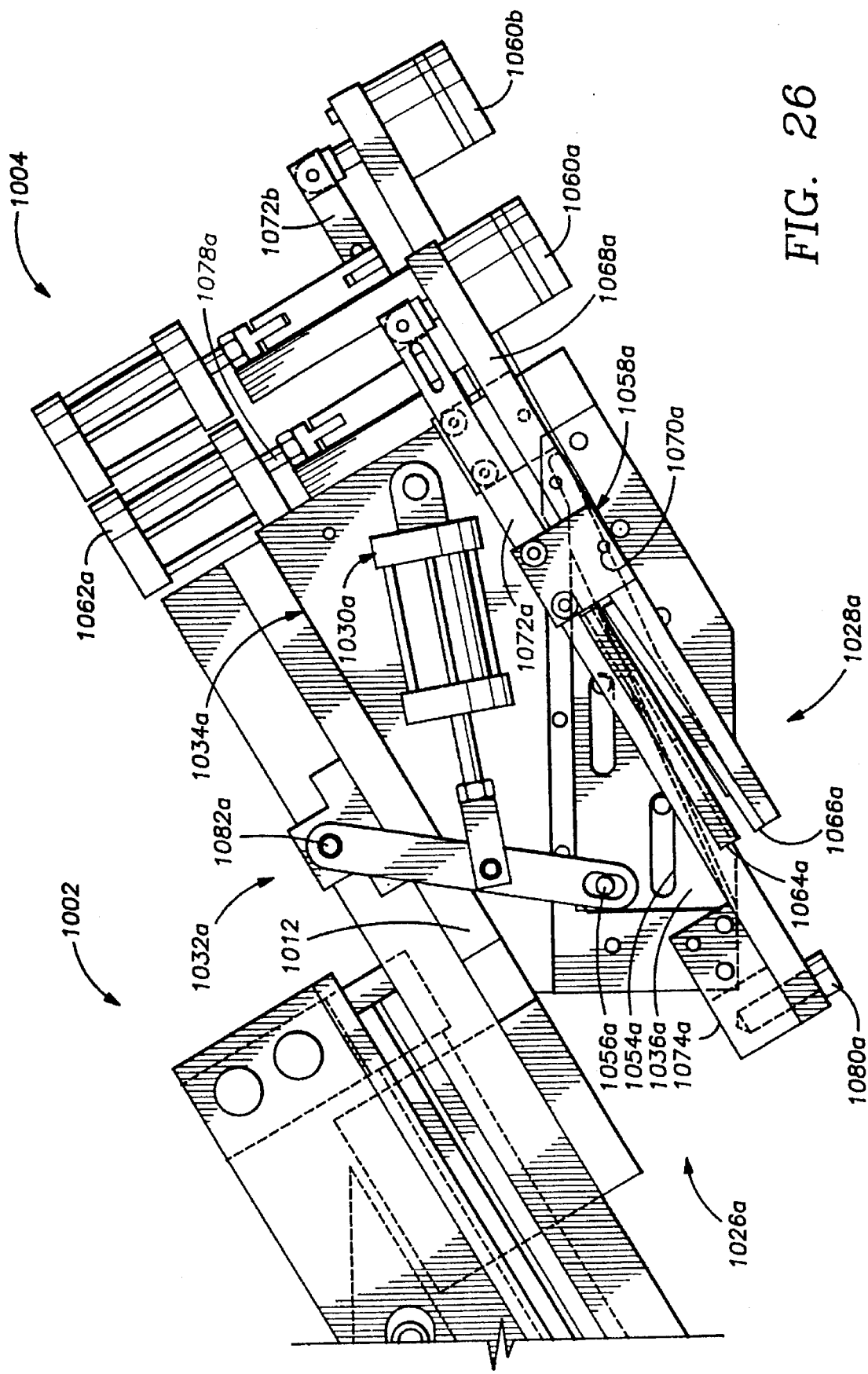
FIG. 26 depicts a front elevation of the cutter assembly of the cutter mechanism shown in FIG. 25.
Figure 27:
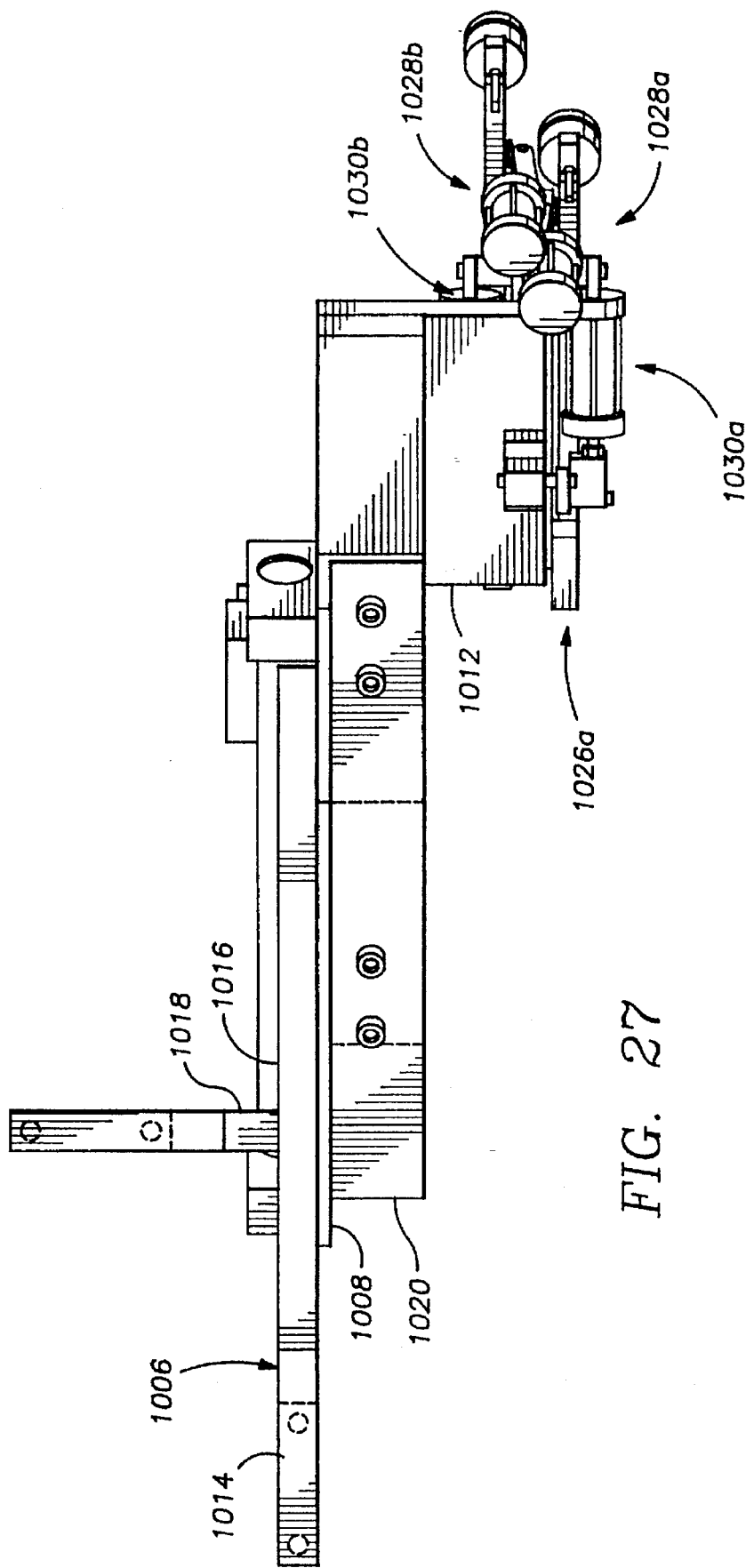
FIG. 27 depicts a top view of the cutter mechanism shown in FIG. 25.

Referring now to FIGS. 25–27, the cutter assembly 1004 executes two separate cutting operations, one for each of the two waste ribbon ends projecting from opposite sides of the welded continuous ribbon loop. The cutter assembly 1004 comprises a pair of blade assemblies 1026a,b, a pair of tensioner assemblies 1028a,b, a pair of cutter cylinders 1030a,b, and a pair of cutter actuator arms 1032a,b. The blade assemblies 1026a,b, tensioner assemblies 1028a,b, cutter cylinders 1030a,b, and actuator arms 1032a,b are substantially mirror images of one another about the line defined by the continuous ribbon loop. Accordingly, only one of each of the pairs of apparatus will be described in detail.

Figure 28:
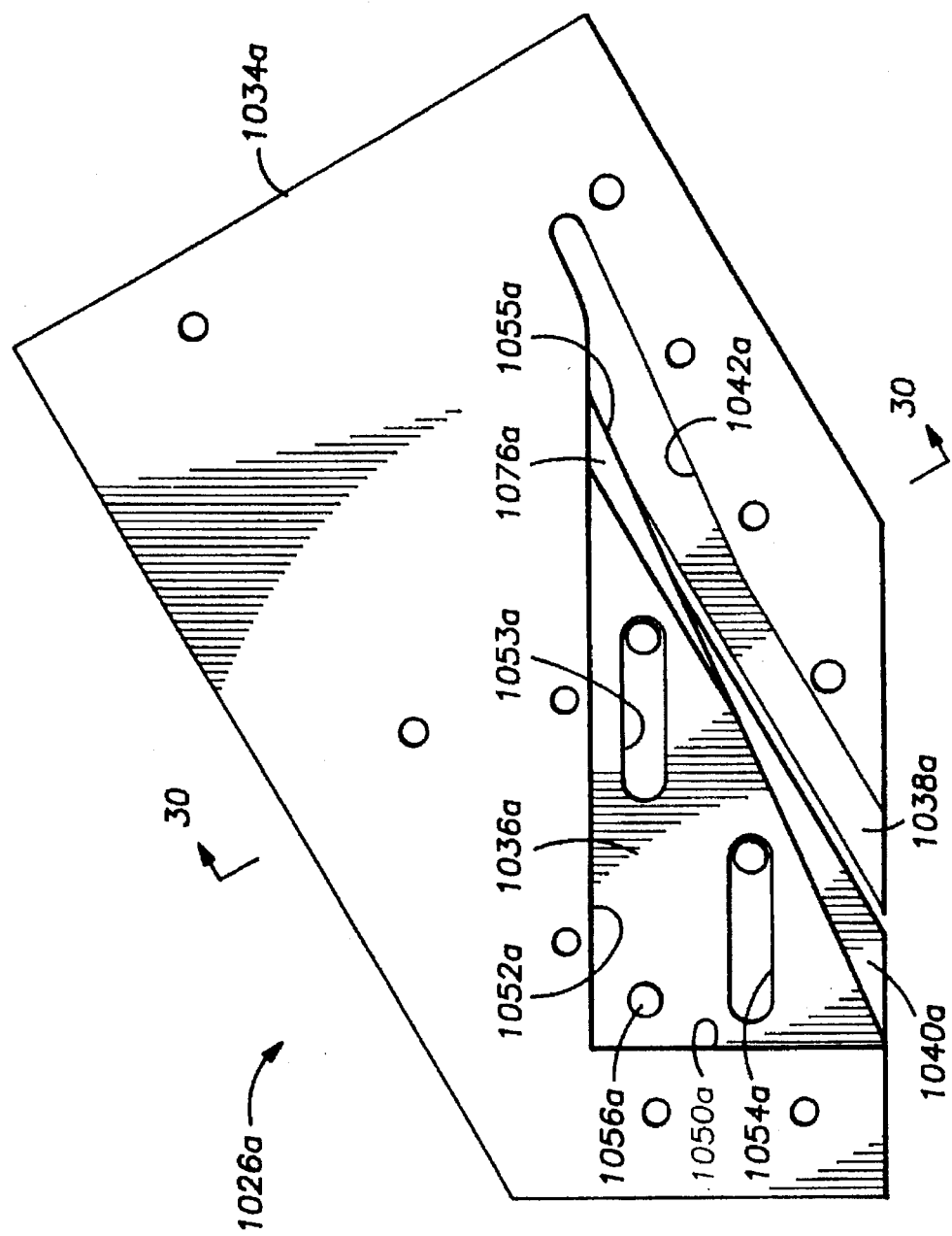
FIG. 28 depicts a front elevation of the forward cutting blade assembly of the cutter assembly shown in FIG. 26.
Figure 29:
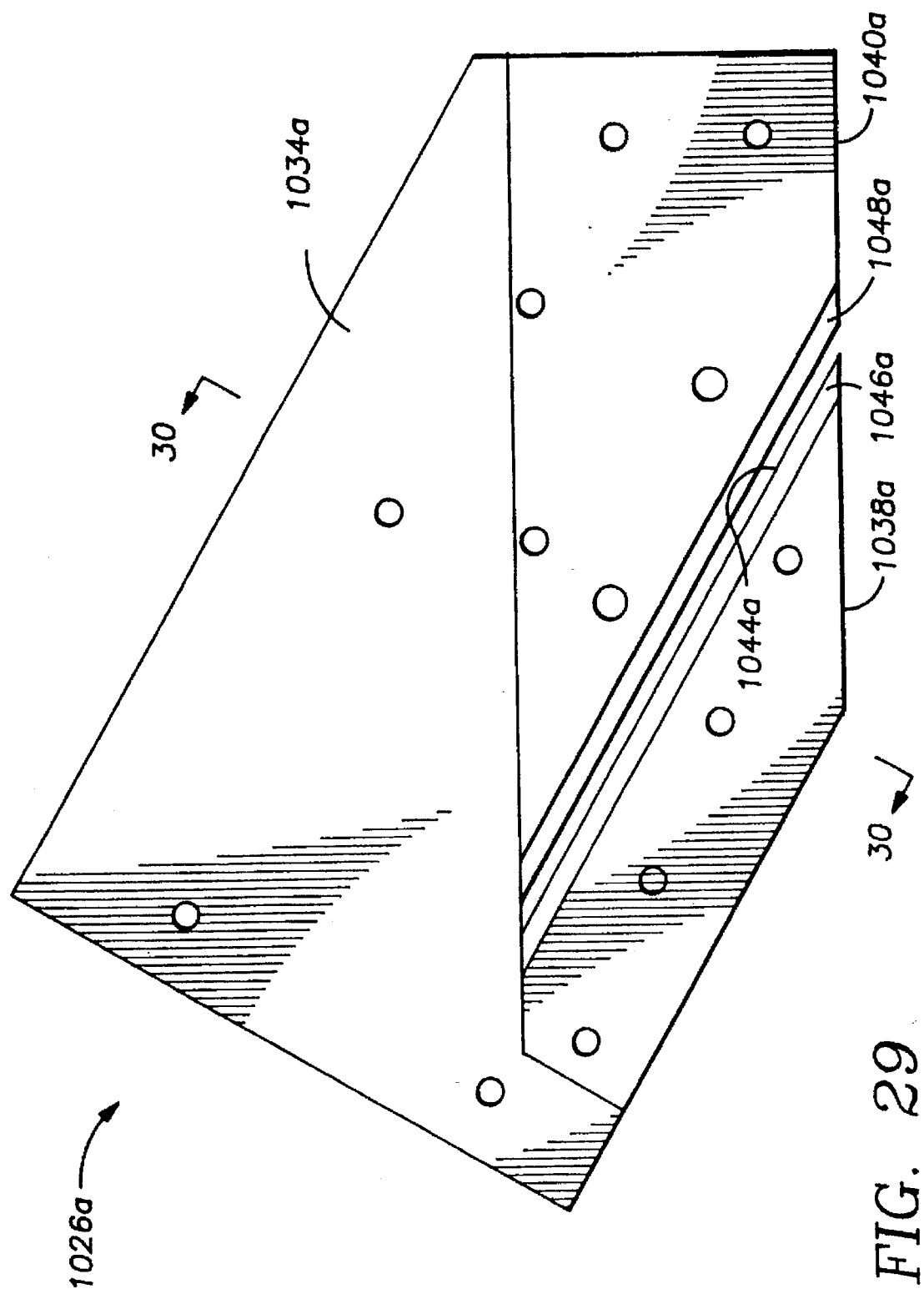
FIG. 29 depicts a rear elevation of the forward cutting blade assembly shown in FIG. 28.
Figure 30:
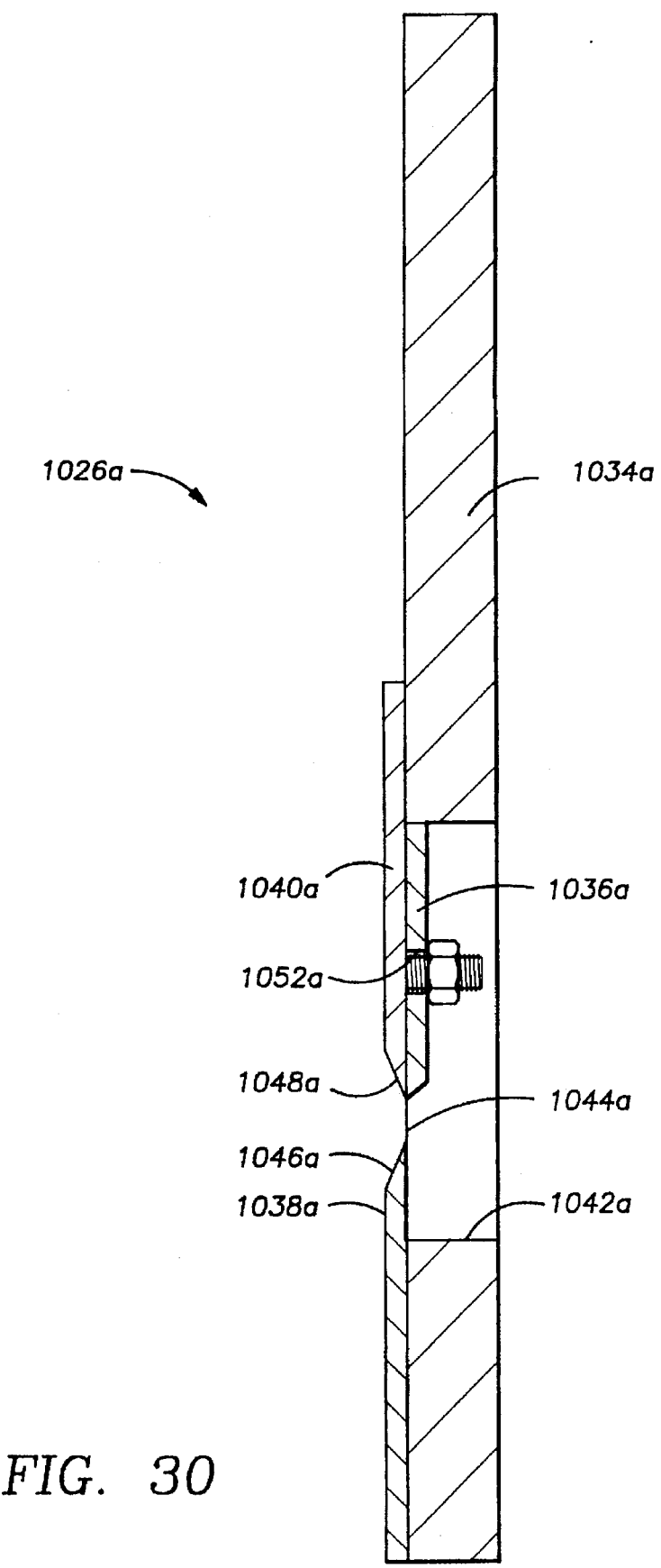
FIG. 30 depicts a cross section of the forward cutting blade assembly along a line 30—30 shown in FIGS. 28 and 29.

Referring now to FIGS. 28–32, the forward blade assembly 1026a comprises a blade support housing 1034a, an outer cutting blade 1036a, an inner cutting blade 1038a, and a blade support plate 1040a. FIG. 28 shows the forward blade assembly 1026a in front elevation. FIG. 29 shows the forward blade assembly 1026a in rear elevation. FIG. 30 shows the forward blade assembly in cross section along a line defined in FIGS. 28 and 29.

The blade support housing 1034a comprises a five-sided plate having a cutout 1042a therein for receiving the outer cutting blade 1036a. The adjectives "inner" and "outer," when used in connection with the cutting blades, refer to position of the blades relative to the plane separating the two blade support housings 1034a,b. The inner cutting blade 1038a and the blade support plate 1040a are mounted to the inside surface of the support housing 1034a, as shown in FIGS. 28 and 29, spaced apart along the cutting edge 1044a of the inner cutting blade 1038a by approximately 0.006 inch, a gap small enough to prevent the weld bead from passing through.

The blade 1038a and plate 1040a are positioned such that the space between the two members defines a line that lies in the plane of the forward waste ribbon end after it has been repositioned away from the continuous ribbon loop. When the cutter assembly is carried downward onto the repositioned ribbon ends, the weld bead is received between the two blade support housings 1034a,b and the forwardly extending waste ribbon end is received between the inner cutting blade 1038a and the blade support plate 1040a.

Both the inner blade 1038a and the support plate 1040a are chamfered along their spaced edges, as indicated, respectively, at 1046a and 1048a. The chamfered edges 1046a, 1048a enable the tensioner assembly 1028, as described in more detail below, to pull the weld bead up against the space between the inner blade 1038a and the support plate 1040a to sever the waste ribbon end within approximately 0.010" to 0.015" of the weld bead. In addition, the inner cutting blade 1038a is displaced slightly outwardly along the cutting edge 1044a, relative to the corresponding edge of the support plate 1040a, so as to maintain a load against the outer cutting blade 1036a and thereby insure a proper scissor cutting action between the two cutting blades 1036a,1038a.

The outer cutting blade 1036a is a generally triangular metal blade positioned normally against the inner wall 1050a of the cutout 1042a in the support housing 1034a and arranged to slide outwardly with respect to the ROWS along the upper wall 1052a of the cutout 1042a to sever the waste ribbon end in a scissor action with the inner cutting blade 1038a. In its retracted position, the outer blade 1036a is loaded against the inner cutting blade at the leading edge 1055a of the outer blade 1036a. This enables the inner cutting blade to be displaced slightly outwardly to impart a load against the outer blade 1036a without causing difficulty with the cutting motion of the outer blade 1036a.

Referring still to FIGS. 28–32, The outer cutting blade 1036a includes a pair of slots 1053a,1054a through which the blade 1036a is slidably supported against the outer surface of the support plate 1040a. The mating surface of the support plate 1040a preferably includes minute grooves for the purpose maintaining lubrication between the support plate 1040a and the mating surface of the outer blade 1036a. The outer blade 1036a is moved outwardly with respect to the ROWS by means of the cutter actuator arm 1032a, which connects to the outer blade 1036a at a pivot post 1056a.

Referring now to FIG. 26, the tensioner assembly 1028a comprises a tensioner arm 1058a, a clamp cylinder 1060a, and a tensioner cylinder 1062a. The tensioner arm 1058a comprises an upper jaw 1064a and a lower jaw 1066a. The clamp cylinder 1060a is connected to an outward extension 1068a of the lower jaw 1066a, with the extension 1068a pivotally attached to an outward extension 1072a of the upper jaw 1064a at 1070a.

The clamp cylinder is a pneumatic cylinder, such as a Bimba cylinder, Part No. FO-02-0.25-3F. The shaft of the clamp cylinder 1060a is pivotally attached to the upper jaw extension 1072a, which is secured to a pivot block 1074a at the inward end of the extension 1072a. The pivot block 1074a is pivotally secured to the support housing 1034a at a pivot bolt 1080a. Thus, when the clamp cylinder 1060a is actuated, the cylinder shaft extends, pivoting the lower jaw extension 1068a away from the upper jaw extension 1072a and closing the jaws 1064a,1066a on a waste ribbon end.

Referring briefly again to FIG. 28, the outer cutting blade 1036a includes a cutout 1076a in the leading end of the outward face for receiving therein the adjacent edge of the upper jaw 1064a. The cutout 1076a insures that the tensioner arm 1058a obtains a grip on the waste ribbon end as close as possible to the weld bead.

The tensioner cylinder 1062a is positioned such that the cylinder shaft is pivotally and slidably connected to the tensioner arm 1058a so as to pivot the tensioner arm 1058a away from the support housing 1034a. The tensioner cylinder is a pneumatic cylinder, such as a Bimba cylinder, Part No. FO-02-0.5-IN-M. The tensioner arm 1058a is pivotally connected to the blade support housing 1034a at the pivot bolt 1080a. Extension of the tensioner cylinder shaft 1078a causes the tensioner arm to pivot away from the blade support housing 1034a at the upper outward end of the tensioner arm 1058a.

Thus, the waste ribbon end clamped between the upper and lower jaws 1064a, 1066a, on actuation of the tensioner cylinder 1062a, is pulled and rotated simultaneously. This action pulls the weld bead into the gap between the inner blade 1038a and the support plate 1040a and then tensions the ribbon with the most tension applied to the area of the ribbon severed first. As the outer cutting blade 1036a moves along the cutting edge 1044a of the inner cutting blade 1038a, the tension cylinder continues to push the tensioner arm 1058a still further away from the blade support housing 1034a. This facilitates the cutting action by maintaining tension in the portion of the ribbon being severed.

Figure 31:
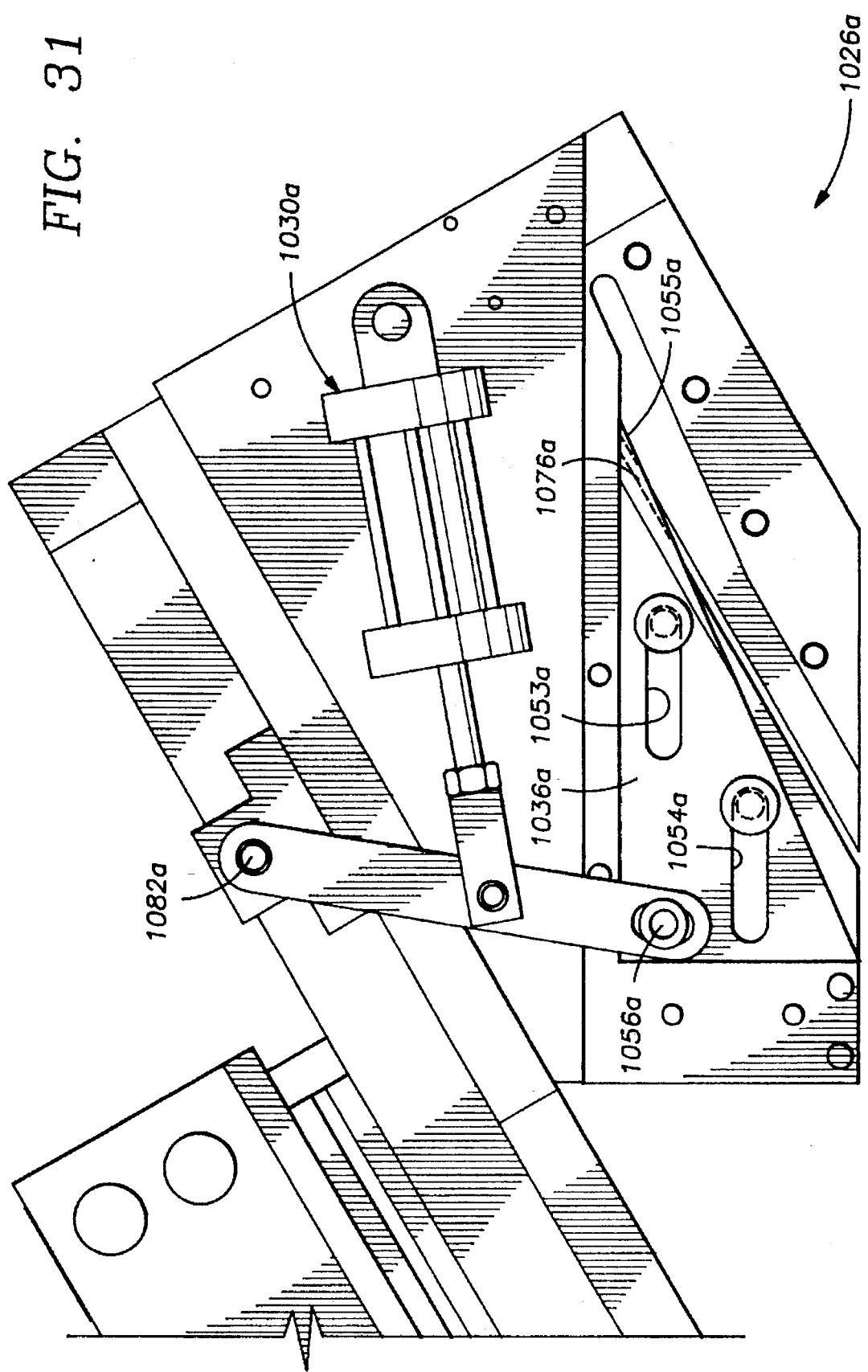
FIG. 31 depicts a front elevation of the cutting blade assembly of FIGS. 28 and 29 with the cutter actuator arm.
Figure 32:
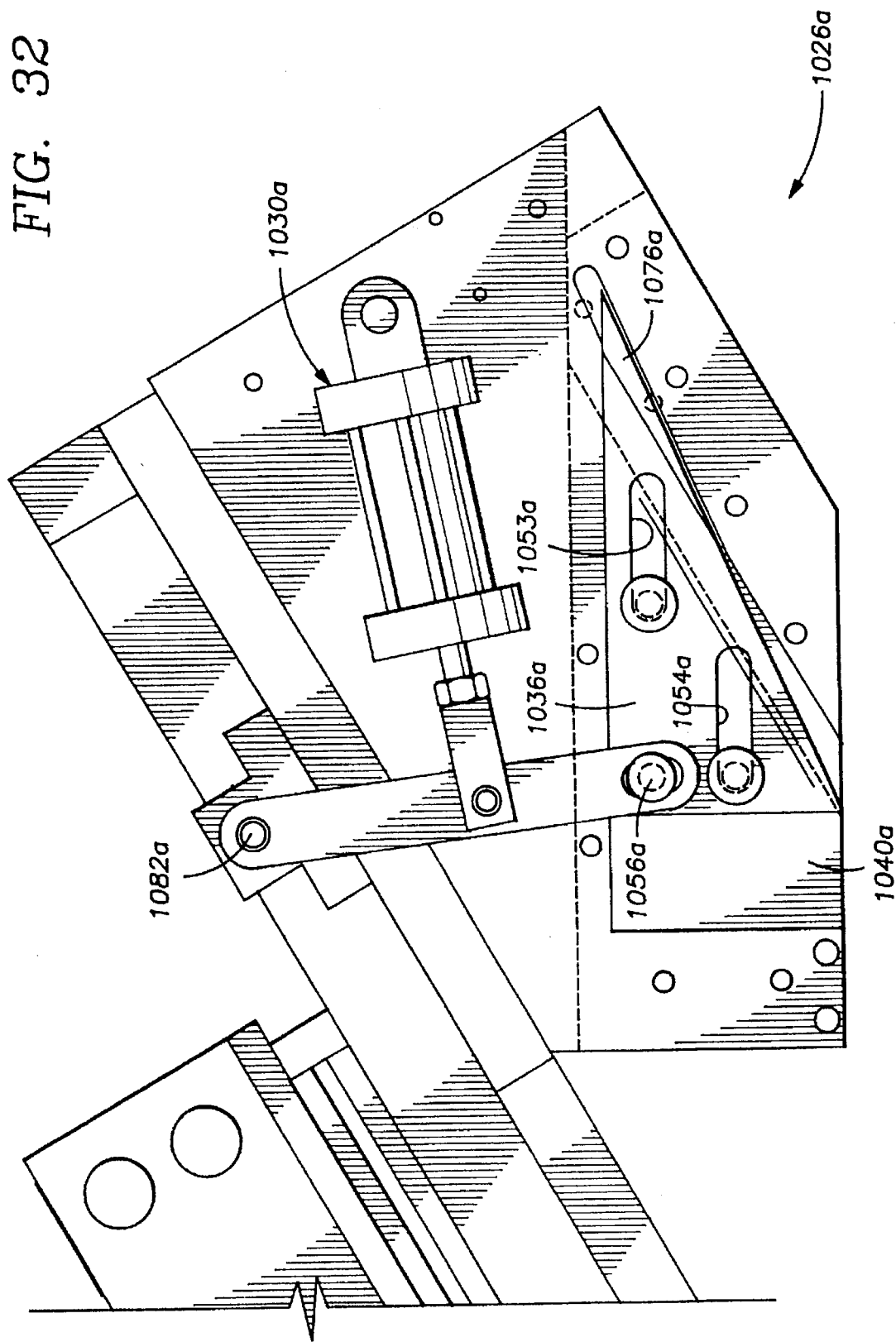
FIG. 32 depicts a front elevation of the assembly shown in FIG. 31, with the cutter mechanism actuated.

Referring now to FIGS. 31 and 32, the cutter cylinder 1030a is a pneumatic cylinder, such as a Bimba cylinder, Part No. FO-02-0.5-3F-M. The shaft of the cutter cylinder 1030a is pivotally connected to the cutter actuator arm 1032a. The cutter actuator arm 1032a is pivotally secured at its upper end 1082a to the cutter support plate 1012 and at its lower end 1056a to the outer cutting blade 1036a, whereby retraction of the cylinder shaft slides the outer cutting blade 1036a outwardly with respect to the ROWS to sever the waste ribbon end.

Control System

The control system for the ROWS preferably comprises a microprocessor-based control system programmed by one skilled in the art to carry out the sequence of operation detailed herein. As detailed herein, each of the subsystems of the ROWS, including the left and right tensioner mechanisms 200, 300, the right and left arm mechanisms 400, 500, the left and right pin guide mechanisms 600, 650, the left and right ribbon alignment guide mechanisms 700, 750, the anvil mechanism 800, the welder mechanism 900, and the cutter mechanism 1000, operates by use of pneumatic cylinders.

Figure 33A:
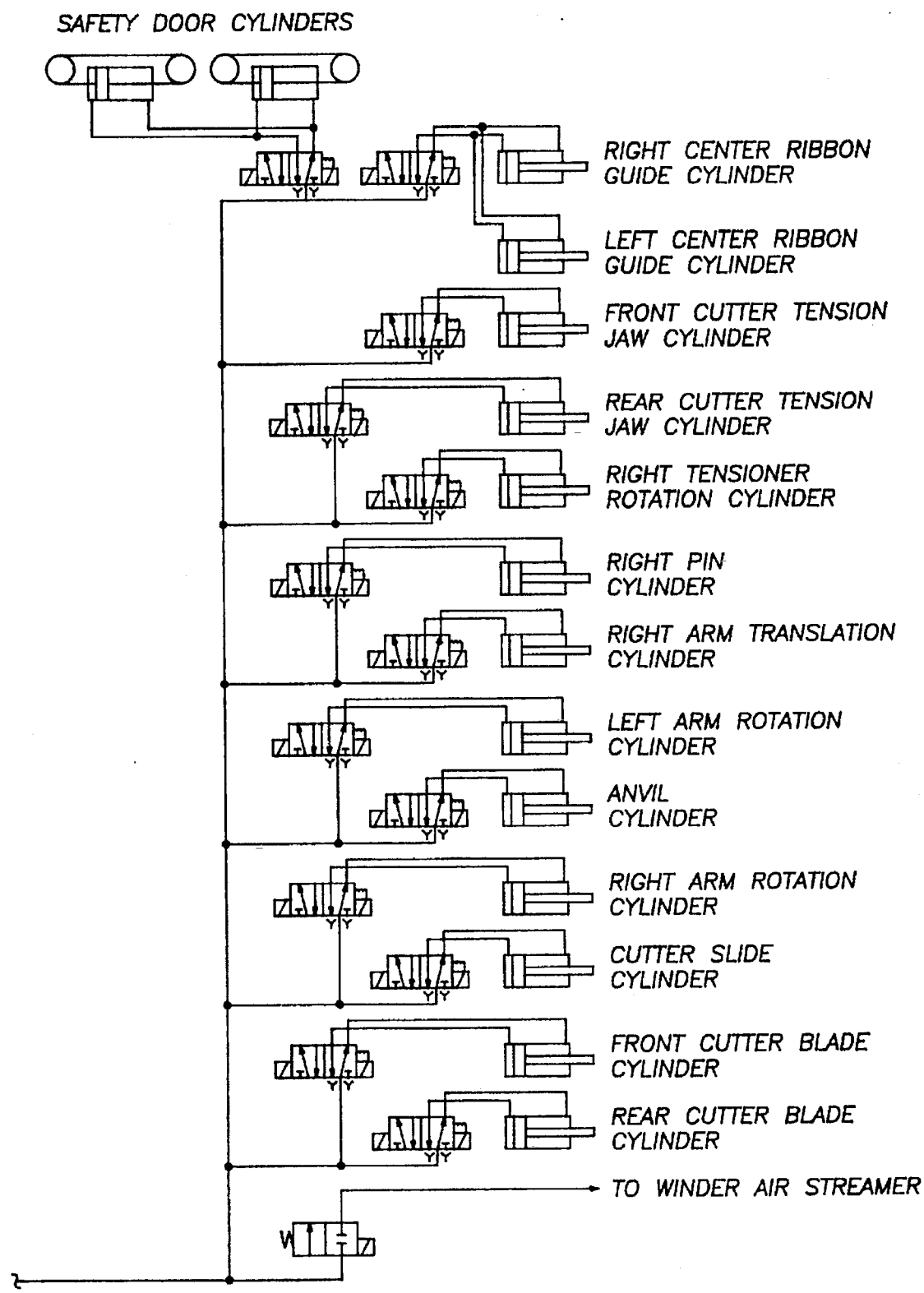
FIGS. 33A and 33B is a schematic diagram of the pneumatic system for the ROWS.
Figure 33B:
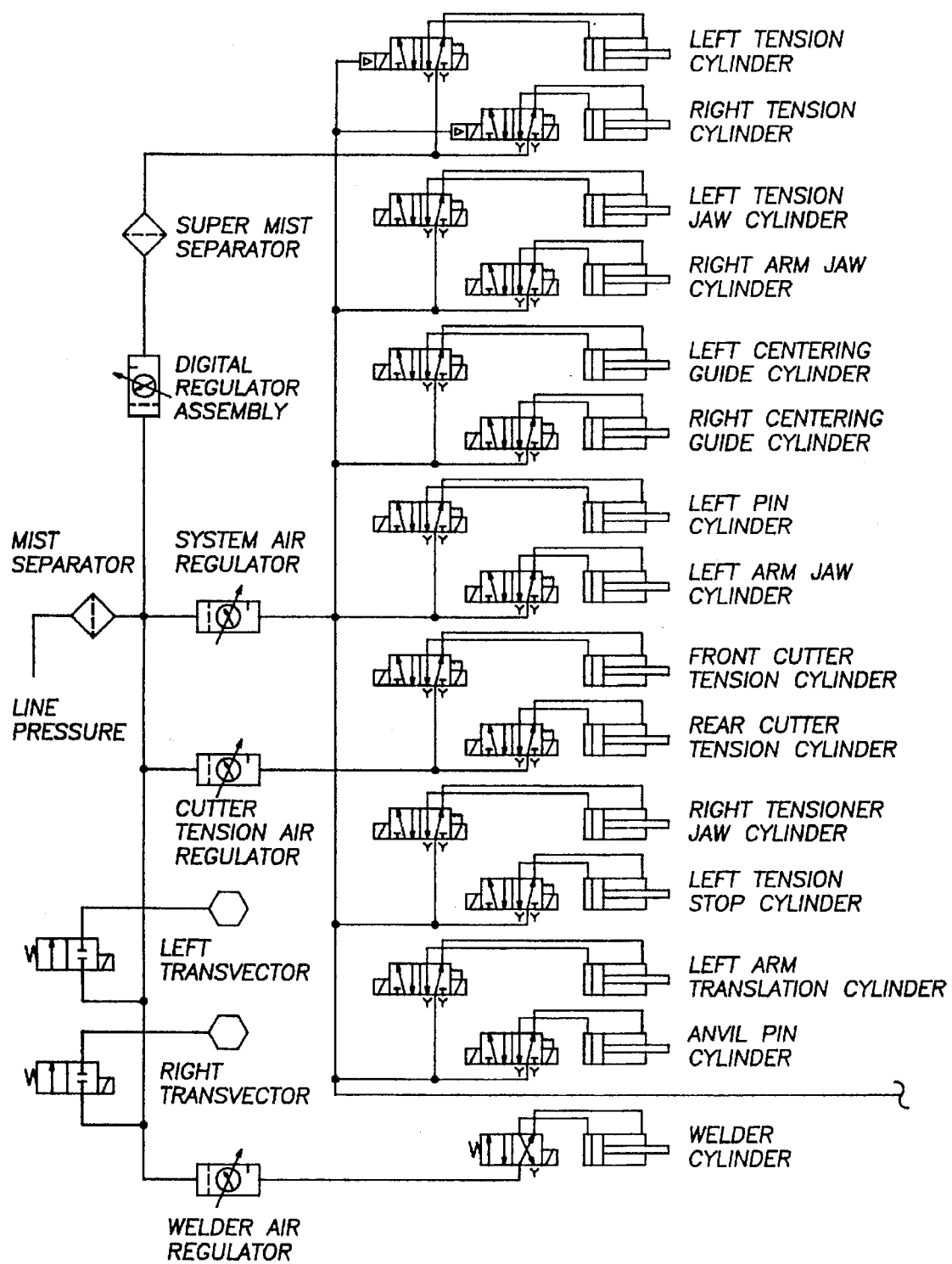

Referring now to FIGS. 33A and 33B, there is shown therein a schematic diagram of the pneumatic system used to control movement of the apparatus of the ROWS, as described above. Generally, the flow of air pressure that moves pistons within the pneumatic cylinders is controlled by opening and closing valves. The control valves are opened and closed by a solenoids, which are controlled by the microprocessor. Some air supply pressures are controlled by precision digital regulators.

The microprocessor may also receive information regarding the position of the piston in a cylinder, so as to insure that the cylinder operates as intended and, overall, that the proper sequence of operations are followed. Thus, before the microprocessor issues a command to perform a particular operation, it first checks to verify that a necessary preceding command was carried out. This helps to insure operator safety, to improve quality control, to prevent damage to the ROWS, and to provide real time diagnostics on ROWS operation.

In addition to the control and monitor of pneumatic cylinders, the control system is integrated by conventional electronic means to the welder mechanism 900. The system is programmed to permit the operator to enter certain welding parameters, such time delay prior to weld, weld duration, time delay after weld, and after burst weld duration, as set up conditions for each of two separate welding operations. Thus, the welding parameters can be optimized separately for both welds to give improved weld strength.

Sequence of Operations

Operation of the ROWS commences by clamping a left ribbon end extending from a ribbon cartridge between the left tensioner mechanism 200 and the right arm mechanism 400. Clamping is accomplished by holding the ribbon end along the line defined by the ribbon guide assemblies 206, 406 and actuating sequentially the clamp actuation switches 234 associated with both assemblies.

The operator then presses two palm buttons 102a,b simultaneously to signal the control system that the left ribbon end is clamped into position. The control system then causes the left arm mechanism 500, the left guide pin mechanism 600, and the right tensioner mechanism 300 to move upright or upward into position. In addition, the left centering guide assembly 248 lowers to release the left slide plate 204 relative to the support plate 202, and tension is applied to the left ribbon end by means of the left tensioner assembly 210. The right centering guide assembly 248' raises to position the slide plate 204' relative to the support plate 202' prior to the ribbon clamping operation.

The operator then clamps the ribbon end from the right side of the ribbon cartridge between the right tensioner mechanism 300 and the left arm mechanism 500, as described above for the left ribbon end. The operator then, a second time, presses the two palm buttons 102a,b simultaneously, thereby signalling the control system that the right ribbon end is clamped into place.

In response to the signal from the palm buttons 102a,b, the control system closes safety shields around the ROWS, the right centering guide assembly 248' retracts, thereby releasing the slide plate 204' relative to the support plate 202', and the right tensioner assembly 210' applies tension to the right ribbon end. The control system then proceeds to step the ROWS automatically through the remaining operations, as described below.

The right and left ribbon alignment guide mechanisms 700, 750 slide forward until the ribbon guide assemblies 702 engage the upper and lower edges of the overlapped ribbon ends. Then the tensioner mechanisms 200, 300 release and reapply tension to the overlapped ribbon ends, allowing the alignment guide mechanisms 700, 750 to align the edges of the overlapped ribbon ends.

Next, the anvil mechanism 800 raises the anvil block 828 to the second position, with the narrow land surface 838 aligned with the welder mechanism 900 for the welding operation. The welder mechanism 900 then moves the ultrasonic horn 906 forward into position against the overlapped ribbon ends and opposite the narrow land surface 838 on the anvil mechanism 800. The welder mechanism then activates the ultrasonic horn according to parameters preset by the microprocessor in the control system.

The ultrasonic energy imparted to the overlapped ribbon ends fuses the ribbon ends along a line defined by the narrow land surface 838 on the side of the ribbon ends opposite the welder mechanism 800. The welded ribbon ends then comprise a continuous ribbon loop and two waste ribbon ends, one on each side of the ribbon loop. After the welding operation is completed, the welder mechanism retracts the ultrasonic horn 906, and the anvil mechanism 800 lowers the anvil block 828 to the retracted position.

Next, the tension stop assembly 250 of the left tensioner mechanism 200 locks the slide plate 204 relative to the support plate 202 to prevent the position of the weld bead joining the overlapped ribbon ends from moving relative to the mounting plate 100. Then the left and right ribbon alignment guide mechanisms 700,750 retract, the right and left arm mechanisms 400,500 translate inwardly toward the weld bead, and the left and right guide pin mechanisms 600,650 retract.

The right arm mechanism 400 then rotates through a predefined arc upwardly and rearwardly and the left arm mechanism 500 rotates through a predefined arc downwardly and forwardly to reposition the two waste ribbon ends in a single plane generally perpendicular at the weld bead to the plane of the ribbon ends comprising the continuous ribbon loop.

Next, the slide assembly 1002 on the cutter mechanism 1000 lowers the cutter assembly 1004 onto the ribbon ends. The continuous ribbon loop, with its adjoining weld bead, is received between the two blade assemblies 1026a,b, the rearward waste ribbon ends is received within the gap between the rearward inner cutting blade 1038b and the rearward blade support plate 1040b, and the forward waste ribbon end is received within the gap between the forward inner cutting blade 1038a and the forward blade support plate 1040a. The forward tensioner assembly 1028a then clamps the forward waste ribbon end.

Next, the right arm mechanism 400 rotates forwardly to remove cross tension from the forward waste ribbon end. The forward tensioner assembly 1028a then pulls the waste ribbon end away from the blade support housing 1034a, moving the weld bead into the chamfers 1046a,1048a on the inner sides of the inner blade 1038a and the blade support plate 1040a and up to the gap between the inner cutting blade 1038a and the blade support plate 1040a. With continuous tension applied to the ribbon end, the cutter cylinder 1030a actuates the outer cutting blade 1036a, severing the forward waste ribbon end from the ribbon loop. The outer cutting blade 1036a then retracts and the forward tensioner assembly 1028a pivots toward the blade support housing 1034a.

The clamps on the forward tensioner assembly 1028a and the left arm mechanism 500 then open, releasing the severed waste ribbon end. At the same time, a left transvector mechanism 104 (FIG. 1) transports the waste ribbon end to a disposal site. The left transvector mechanism 104 comprises a borehole in the mounting plate 100 to which is connected a pipe. A vacuum applied to the pipe by means of the pneumatic system transports the waste ribbon end to a desired disposal point.

Next, the right arm mechanism 400 rotates back to the upward position, and the cutter mechanism 1000 severs the rearward waste ribbon end in the same manner as described in connection with the forward waste ribbon end. The rearward waste ribbon end is removed by means of a right transvector mechanism 106 (FIG. 1), which comprises a pipe positioned so as to be able to vacuum the rearward waste ribbon end as it is released from the right arm mechanism 400 and the rearward tensioner assembly 1028b on the cutter mechanism 1000. Like the left transvector mechanism 104, the right transvector mechanism 106 relies on the pneumatic system to apply a vacuum to remove the waste ribbon end to a disposal site. The cutter mechanism 1000 then moves upward away from the continuous ribbon loop.

If a second welding operation (sometimes called an "ironing" operation) is not desired, the continuous ribbon loop is released from the left and right tensioner mechanisms 200,300 and wound into the ribbon cartridge. If the second welding operation is desired, the anvil mechanism 800 moves the anvil block 828 to the third position, with the wider land surface 840 aligned with the welder mechanism 900. The welder mechanism 900 then moves forward as described in connection with the first welding operation and imparts ultrasonic energy to reweld or smooth the first weld. The control system can reprogram the welding parameters to optimize conditions for the second weld relative to the first weld.

The welder mechanism 900 then retracts, and the anvil block 828 assumes its downward position. The left and right tensioner mechanisms 200,300 release the continuous ribbon loop, and a cartridge winder, if one is used in connection with the ROWS, winds the loose ribbon into the ribbon cartridge.

Finally, all mechanisms of the ROWS reset to their initial positions. The right arm mechanism 400, the left arm mechanism 500, and the right tensioner mechanism all rotate downward, and the left and right arm mechanisms 400,500 translate outward. The left centering guide 254 on the left tensioner mechanism 200 raises to center the slide plate 204 relative to the support plate 202. The right guide pin mechanism 650 raises the right guide pin 602. The safely covers open, and the operator can remove the finished ribbon cartridge.

Second Embodiment of Cutting Mechanism

Figure 34:
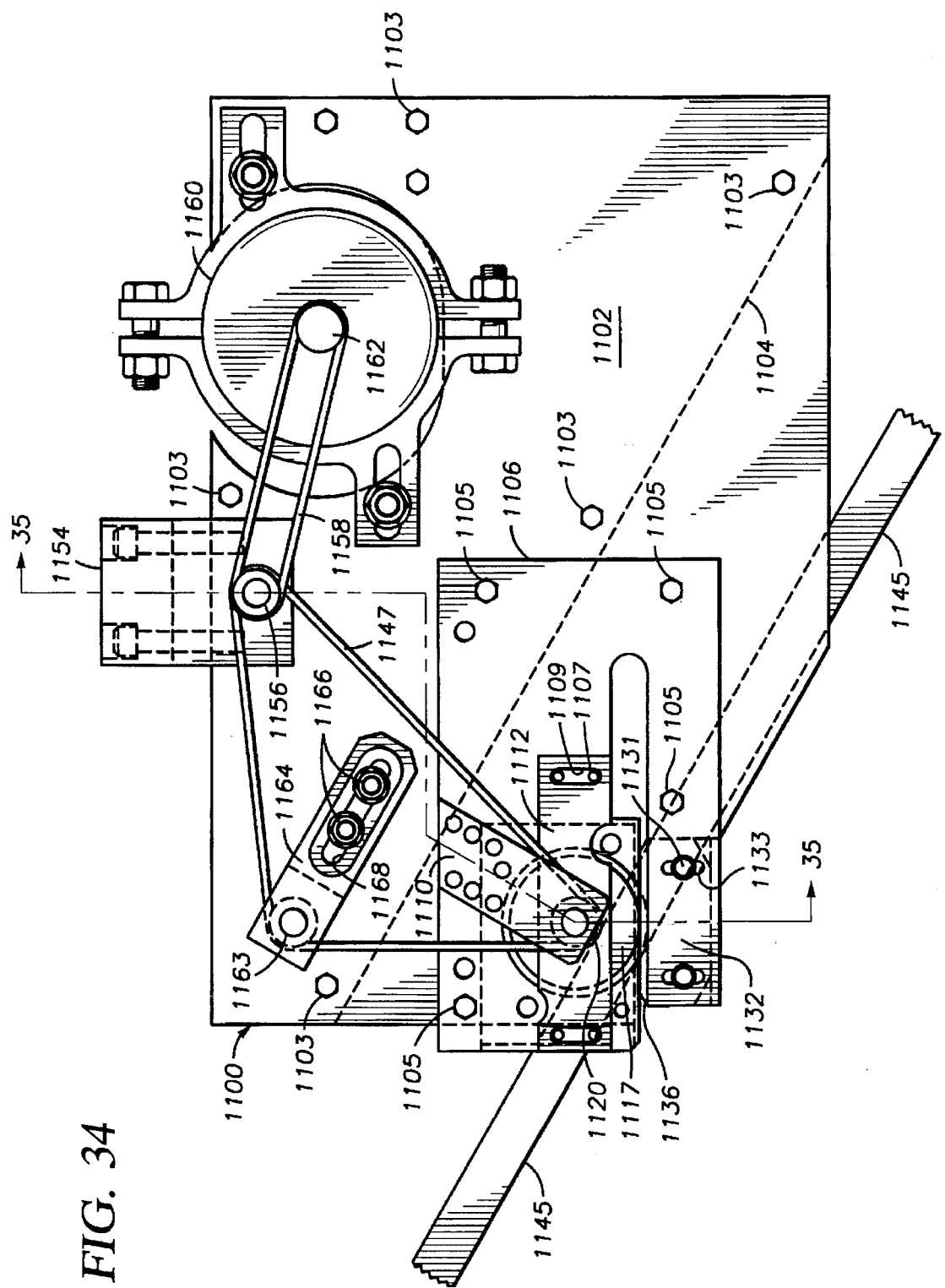
FIG. 34 is a front elevation of another embodiment of the cutter mechanism of the ROWS apparatus.
Figure 36:
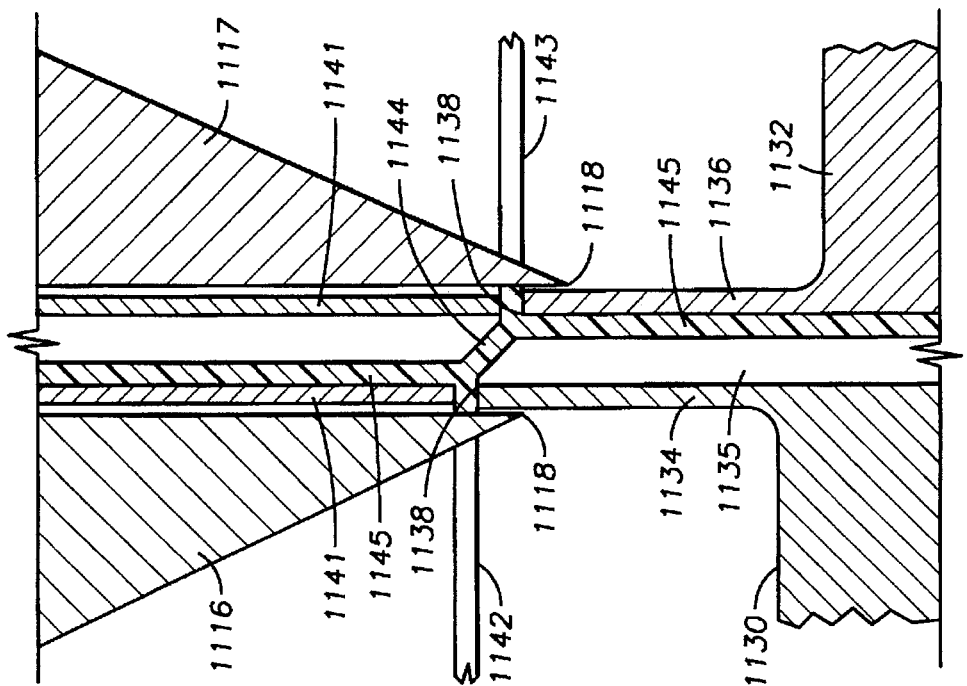
FIG. 36 is an enlarged vertical sectional view of the mechanism of FIG. 34, showing the relationship of the cutting blades.
Figure 35:
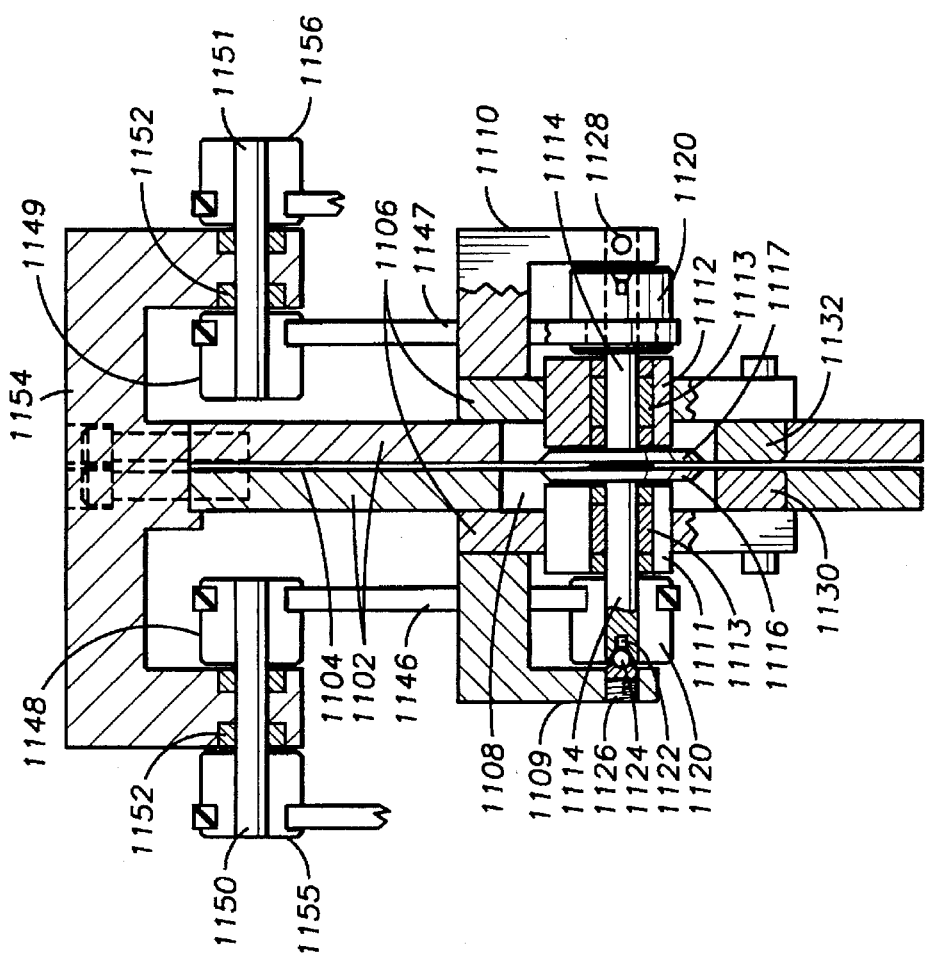
FIG. 35 is a vertical sectional view of the mechanism of FIG. 34, taken at line 35—35 of FIG. 34.

FIGS. 34, 35 and 36 depict another embodiment of a cutting mechanism in which a pair of rotating blades are used to cut off the waste ends of the ribbon after the welding operations. In this embodiment, the cutting mechanism is mounted on a cutter housing 1100 which is mounted on the cutter support plate 1012 of the slide assembly 1002. The center housing comprises a pair of plates 1102 (see FIG. 35) which are spaced apart by a spacer 1104, indicated by a broken line in FIG. 34, and a plurality of cap screws 1103. A pair of cutter assembly mounting plates 1106 are secured by bolts 1105 to enclose the two housing plates and to bridge a cutter opening 1108 formed in the housing plates. Front and rear thrust control blocks 1109, 1110 are secured to the opposite sides of the cutter assembly mounting plates. Front and rear bearing blocks 1111 and 1112 are adjustably mounted on mounting plates 1106 by means of cap screws 1107 received in slots 1109, with the bearing blocks received in aligned openings in the cutter assembly mounting plates. The bearing blocks have aligned openings therein each containing a cylindrical bearing 1113. A shaft 1114 is mounted in each bearing 1113. Circular cutter blades 1116, 1117 are mounted at the inward end of each shaft 1114, with the cutter blades spaced apart, as will be hereinafter described. The cutter blades are each provided, on their adjacent sides, with a knife edge 1118 made of a hard material, such as tungsten carbide or ceramic, which will hold a sharp edge with minimum wear. Outboard of each bearing block 1111, 1112 is mounted a driven pulley 1120, each pulley being affixed to the shaft 1114 so that rotation of the pulley will cause rotation of the shaft and the cutter blade mounted on the shaft. Each end of the shaft 1114 has a concentric countersunk hole 1122 which receives a steel ball 1124, such as a ball bearing. A set screw 1126 is threadedly received in each thrust control block 1109 and 1110 and is axially aligned with the shaft 1114 so that the balls 1124 will align with the ends of the set screws 1126. A locking set screw 1128 is threadedly received in each thrust control block substantially at right angles and with its axis intersecting the axis of set screw 1126, so that tightening the locking set screws will hold the set screws 1126 in place. Adjustment of the set screws 1126 allows accurate positioning of the rotary cutting blades.

Two ribbon guide blocks 1130, 1132 are affixed between the cutter assembly mounting plates 1106 at the lower edge of the mounting plates. The blocks are secured by cap screws 1131 received in slots 1133 so the blocks can be adjusted toward and away from the rotary cutting blades. Each block has a fixed land 1134 or 1136 extending upwardly from the facing edges of the blocks, with land 1134 extending slightly higher than land 1136. Similarly, cutter blade 1117 is mounted offset in position from cutter blade 1116 so that it extends lower, and each of the cutter blades overlaps the corresponding land 1134 or 1136. Each rotary cutter blade is placed very close to the associated land, preferably no more than 0.0001 to 0.0004 inch, so that the lands function as fixed blades, and each land is very thin, on the order of 0.004 to 0.006 inch, so as to insure that the waste ends of the ribbons are cut off as short as possible, preferably to a length of no more than about 0.010 inch. The two lands are spaced apart at 1135, and the two rotary cutter blades are spaced a slightly greater distance apart, so as to receive the lands between them. In the preferred embodiment, using the usual printer ribbon, and weld width, the gap 1135 is about 0.014 inch wide so as to allow easy passage of the ribbon between blocks 1130 and 1132, and to allow articulation of the ribbon in the configuration shown in FIG. 36 so that the waste ends 1142, 1143, which extend from the weld 1144 of ribbon 1145, can be bent at right angles to the ribbon, as shown in FIG. 36, to pass between the rotating cutter blades and the fixed lands. A blade shield and guide 1141 is carried on the opposed faces of rotary blades 1116, 1117 with a space between them slightly narrower, approximately 0.002 inch, than the space between the fixed lands. The guide blocks and the blade shield and guide serve to guide the ribbon into position, so that the weld 1144 is properly located for cutting off the waste ends.

The pulleys 1120 are driven by belts 1146, 1147 which are in turn driven through pulleys 1148, 1149 mounted on shafts 1150, 1151. The shafts are rotatably mounted by means of bearings 1152 in saddle bearing block 1154. Each shaft extends horizontally through an arm of the saddle bearing block and has a pulley 1155, 1156 mounted on its outboard end. An idler pulley 1163 is mounted on an adjustable mount 1164 on each side of the housing 1100, and is secured to a housing plate 1102 by cap screws 1166 which are received through a slot 1168, by means of which the mounts can be moved in a direction to tighten belts 1146, 1147. Pulleys 1155, 1156 are driven by belts 1157, 1158 which are in turn driven by an electric motor 1160 through a drive pulley 1162.

In operation, after the ribbon is welded and the waste ends are articulated, the cutter slide 1002 is instructed by the microprocessor to move the cutter down over the ribbon 1145 so that the ribbon is received in the space between the two fixed lands 1134, 1136, as seen in FIG. 34 and FIG. 36, and between the blade shields 1141. At the same time, the cutter electric motor is turned on. When the cutter is moved into position, the weld bead 1144 is received between the blades as shown in FIG. 36 and the waste ends are severed. The cutter is then turned off and the clamps on the forward tensioner assembly 1028a and the left arm mechanism 500 are opened, releasing the severed waste ribbon end, and the left waste transvector mechanism 104 vacuums away the waste ribbon end to a disposal site. The cutter then begins retracting upward. At the same time, the right arm clamps open and the rear waste transvector mechanism 106 vacuums away the rear waste end. The remainder of the cycle is then the same as previously described.

The rotary cutter tip speed is preferably in the range of about 1,000–1,300 feet per minute. A tip speed of about 1,150 feet per minute has been found to be very effective. At this speed, the rotary blade actually slightly melts the fabric filament ends to produce a melted shiny tip with about a 5% increase in diameter. No globules are produced on any of the cut ends. Slower speeds reduce the melting effects. With the high speed used and the hardened blade edges trimmed ends have been consistently less than 0.01 inches long, even after 5000 actual cuts.

The rotary blade shields 1141 and the fixed blades 1134, 1136 actually guide the ribbon to the cutter blades as shown in FIG. 36. This is very important to the proper functioning of the cutter since any positional deviation is automatically adjusted by these guides.

The cutter slide speed is controlled to keep the tip speed relative to approach speed at a high ratio. This prevents loading the ribbon into the cutter too fast, which could cause a ribbon jam.

While preferred embodiments of the invention has been shown and described, modifications thereof can be made by one skilled in the art without departing from the spirit of the invention.

What is claimed:

1. A method for adjoining first and second ends of a length of fabric printer ribbon to form a continuous loop, comprising the steps of:

clamping the two ribbon ends with at least a portion of the first ribbon end overlapping the second ribbon end;

fusing the two ribbon ends to form a substantially narrow weld bead extending from one edge of the overlapped ribbon ends to an opposite edge, whereby the ribbon is formed into a continuous ribbon loop with first and second waste ribbon ends extending from the weld bead;

positioning the first and second waste ribbon ends to lie substantially within a single plane that is generally perpendicular to the ribbon loop at the weld bead;

providing a cutter mechanism having spaced, opposed first and second cutting blade assemblies, each cutting blade assembly comprising an inner blade and an outer blade;

coupling the cutter mechanism and the continuous ribbon loop whereby the weld bead lies between the first and second cutting blade assemblies and each of the first and second waste ribbon ends extends through a separate gap defined by facing edges of an inner blade and an element stationary with respect to said outer blade, each gap being wider than the thickness of the ribbon but narrower than the thickness of the weld bead;

applying tension to the first waste ribbon end until the weld bead on the continuous ribbon loop is positioned substantially against the inner blade of the first cutting blade assembly;

moving the outer blade of the first cutting blade assembly relative to the inner blade so as to sever the first waste ribbon end near the weld bead;

applying tension to the second waste ribbon end until the weld bead on the continuous ribbon loop is positioned substantially against the inner blade of the second cutting blade assembly; and moving the outer blade of the second cutting blade assembly relative to the inner blade so as to sever the second waste ribbon end near the weld bead, thereby forming a continuous loop of printer ribbon without waste ribbon ends.

2. A method according to claim 1, wherein tension to the first waste ribbon is increased as the first waste ribbon end is being severed by the outer blade of the first cutting assembly; and tension to the second waste ribbon end is increased as the second waste ribbon end is being severed by the outer blade of the second cutting assembly.

3. A method for adjoining first and second ends of a length of fabric printer ribbon, comprising the steps of:

clamping the two ribbon ends with at least a portion of the first ribbon end overlapping the second ribbon end;

fusing the two ribbon ends to form a substantially narrow weld bead extending from one edge of the overlapped ribbon ends to an opposite edge, whereby the ribbon is formed into a continuous ribbon loop with first and second waste ribbon ends extending from the weld bead;

positioning the first and second waste ribbon ends away from the ribbon loop at the weld bead;

providing a cutter mechanism having spaced, opposed first and second sets of cutting blades, each set of cutting blades comprising an inner blade and an outer blade; coupling the cutter mechanism and the continuous ribbon loop whereby the weld bead lies between the first and second sets of cutting blades;

pulling the first waste ribbon end through a first gap wider than the thickness of the ribbon but narrower than the thickness of the weld bead, said first gap being defined by facing edges of the first inner blade and a first element of said cutting mechanism, until the weld bead on the continuous ribbon loop is positioned substantially against the inner blade of the first set of cutting blades;

severing the first waste ribbon end adjacent to the weld bead with the inner and outer blades of the first set of cutting blades;

pulling the second waste ribbon end through a second gap wider than the thickness of the ribbon but narrower than the thickness of the weld bead, said second gap being defined by facing edges of the second inner blade and a second element of said cutting mechanism, until the weld bead on the continuous ribbon loop is positioned substantially against the inner blade of the second set of cutting blades; and severing the second waste ribbon end adjacent to the weld bead with the inner and outer blades of the second set of cutting blades, thereby forming a continuous loop printer ribbon which is free of waste ribbon ends.

4. Apparatus for adjoining the ends of a length of printer ribbon to form a continuous ribbon loop, comprising means for damping the ribbon ends with one face of the ribbon at one ribbon end engaging the other face of the ribbon at the other end and the side edges of the ends substantially aligned with each other, means for fusing the ribbon ends together to form a substantially narrow weld bead extending from one edge of the overlapped ribbon ends to the opposite edge, whereby the ribbon is formed into a continuous ribbon loop with first and second waste ribbon ends extending from the weld bead, ribbon cutting mechanism comprising two sets of cutter blades, said sets of cutter blades each comprising first and second opposed blades, each first blade having an associated guide member, said guide members being spaced apart and positioned for guiding the continuous ribbon loop between the guide members, the second blades being spaced apart a distance not substantially greater than the width of the weld bead, the guide member of each set having an edge forming one side of a gap between the guide member and the second blade of that set, each gap being less than the thickness of the weld bead, means for placing the continuous ribbon loop between the guide members, means for pulling each of the waste ribbon ends away from the continuous ribbon loop through one of the gaps, and means for applying a tensile force to the first waste ribbon end and an opposed tensile force to the second waste ribbon end after the waste ends are pulled away from the continuous ribbon loop.

5. Apparatus as defined by claim 4 wherein the means for applying the tensile force to the first waste ribbon end and the opposed tensile force to the second waste ribbon end applies the tensile forces in a direction to position the waste ribbon ends substantially in the same plane substantially at right angles to the ribbon loop at the weld bead.

6. Apparatus for adjoining first and second ends of a length of fabric printer ribbon, comprising:

means for clamping the two ribbon ends with at least a portion of the first ribbon end overlapping the second ribbon end;

means for fusing the two ribbon ends to form a substantially narrow weld bead extending from one edge of the overlapped ribbon ends to an opposite edge, whereby the ribbon is formed into a continuous ribbon loop with first and second waste ribbon ends extending from the weld bead;

means for positioning the first and second waste ribbon ends away from the continuous ribbon loop at the weld bead;

means for cutting the waste ribbon ends, said cutting means comprising spaced, opposed first and second cutting blade assemblies, each cutting blade assembly comprising an inner blade and an outer blade;

means for coupling said cutting means and the continuous ribbon loop whereby the weld bead lies between said first and second cutting blade assemblies;

means for tensioning the first and second waste ribbon ends to draw the weld bead on the continuous ribbon loop against the inner blades of each of said first and second cutting blade assemblies, respectively;

said first and second cutting blade assemblies being substantial mirror images of one another about a center plane separating said assemblies, each said assembly having an inner side and an outer side;

the inner blade of each assembly being on the inner side of the assembly;

each assembly including a support plate on its inner side, each support plate lying in substantially the same plane as the inner blade of the same assembly;

the support plate and inner blade of each assembly having opposed edges defining therebetween a narrow gap;

each gap being wider than the thickness of the ribbon and narrower than the thickness of the weld bead; and the outer blade of each assembly being on the outer side of the assembly, the outer blade of each assembly having a cutting edge slidably engageable with an edge of the inner blade of the same assembly, whereby tension applied to each waste ribbon end pulls the waste end through said gap and pulls the weld bead into but not completely through said gap, whereupon the outer blade of one assembly can be moved relative to the inner blade of the same assembly to sever the waste ribbon end close to the weld bead.

7. Apparatus according to claim 6 wherein said positioning means comprises means for positioning the first and second waste ribbon ends in a plane generally perpendicular to the plane of the ribbon loop at the weld bead.

8. Apparatus according to claim 6 wherein said coupling means comprises means for moving said cutting means about the weld bead, whereby the weld bead lies between said first and second cutting blade assemblies and the first and second waste ribbon ends extend through said gaps in said first and second cutting blade assemblies, respectively.

9. Apparatus according to claim 6 wherein said tensioning means comprises:

first and second means for grasping the first and second waste ribbon ends, respectively; and first and second means for moving said first and second grasping means relative to said cutting blade assemblies to apply tension to the waste ribbon ends, the tension being distributed non-uniformly along the width of the waste ribbon end, with greatest tension at the edge of the waste ribbon end first severed.

10. Apparatus according to claim 9 wherein said first and second moving means move as said first and second cutting blade assemblies sever the first and second waste ribbon ends, respectively, so as to maintain tension in the waste ribbon end at the point of the cut.

11. Apparatus for adjoining the ends of a length of printer ribbon to form a continuous ribbon loop, comprising means for clamping the ribbon ends with one face of the ribbon at one ribbon end engaging the other face of the ribbon at the other ribbon end and the side edges of the ribbon ends substantially aligned with each other, means for fusing the ribbon ends together to form a weld bead extending from one edge of the engaged ribbon ends to the opposite edge of the engaged ribbon ends, said weld bead having a width longitudinally of the ribbon ends which is relatively narrow with respect to the length of the engaged ends, whereby the ribbon is formed into a continuous ribbon loop with first and second waste ribbon ends extending from the weld bead, and a cutter assembly for cutting the waste ribbon ends from the continuous ribbon loop, comprising cutter mounting means, a pair of spaced-apart ribbon guide blocks on said cutter mounting means positioned to provide a space between the blocks to receive the continuous ribbon loop and to accommodate the width of the weld bead, each guide block terminating in a narrow land, an edge of each land forming one side of a waste end gap, a pair of spaced-apart rotary blades mounted on said cutter mounting means, said rotary blades having substantially parallel axes and opposed faces forming a space between the rotary blades wide enough for the blades to encompass the two lands, means for moving the cutter assembly into cutting relationship with the waste ribbon ends, a ribbon guide carried on the opposed face of each rotary blade, the ribbon guides being spaced to provide a space between the guides to receive the continuous ribbon loop, one edge of each ribbon guide forming the other side of a waste end gap, each said gap having a width greater than the thickness of the ribbon but less than necessary to allow the weld bead to pass through the gap, means for pulling the waste ribbon ends away from the continuous ribbon loop and extending them transversely of the lands, and means for applying opposed tensile forces to the first and second waste ribbon ends, whereby the continuous ribbon loop is pulled against one land on one side of the weld bead and against the other land on the other side of the weld bead.

12. Apparatus for adjoining the ends of a length of printer ribbon to form a continuous ribbon loop, comprising a set of clamps positioned for clamping the ribbon ends with one face of the ribbon at one ribbon end engaging the other face of the ribbon at the other end and the side edges of the ends substantially aligned with each other, an ultrasonic horn positioned for fusing the ribbon ends together to form a substantially narrow weld bead extending from one edge of the overlapped ribbon ends to the opposite edge, whereby the ribbon is formed into a continuous ribbon loop with first and second waste ribbon ends extending from the weld bead, ribbon cutting mechanism comprising two sets of cutter blades, said sets of cutter blades each comprising a first blade and a second blade, said cutting mechanism being movable into cutting relationship with the waste ribbon ends, each first blade including a guide member for guiding the continuous ribbon loop between the first blades, the second blades being spaced apart a distance not substantially greater than the width of the weld bead, each of said guide members having an edge forming one side of a gap between the guide member and the associated second blade, said gap being less than the thickness of the weld bead and greater than the thickness of the waste ribbon ends, so that one waste ribbon end may be received through each gap, and a pair of tensioning devices adapted to apply tension to the waste ribbon ends.

* * * * *